(12) United States Patent
Strong et al.

(10) Patent No.: US 8,453,253 B2
(45) Date of Patent: May 28, 2013

(54) CONTROLLER DEVICE

(75) Inventors: Matthew B. Strong, Pleasant Grove, UT (US); Paul J. Hepworth, South Jordan, UT (US); Mark L. Gray, West Jordan, UT (US); Andrew J. Olsen, Riverton, UT (US); Tim Pruss, Midvale, UT (US)

(73) Assignee: Provo Craft and Novelty, Inc., South Jordan, UT (US)

( * ) Notice: Subject to any disclaimer, the term of this patent is extended or adjusted under 35 U.S.C. 154(b) by 250 days.

(21) Appl. No.: 12/709,822

(22) Filed: Feb. 22, 2010

(65) Prior Publication Data

US 2010/0217427 A1     Aug. 26, 2010

Related U.S. Application Data

(60) Provisional application No. 61/154,757, filed on Feb. 23, 2009, provisional application No. 61/177,300, filed on May 12, 2009, provisional application No. 61/178,074, filed on May 14, 2009, provisional application No. 61/223,698, filed on Jul. 7, 2009, provisional application No. 61/228,958, filed on Jul. 27, 2009, provisional application No. 61/229,265, filed on Jul. 28, 2009, provisional application No. 61/237,218, filed on Aug. 26, 2009, provisional application No. 61/297,563, filed on Jan. 22, 2010.

(51) Int. Cl.
*G06F 7/04*      (2006.01)
*G06F 21/00*     (2006.01)
*G06F 21/62*     (2006.01)

(52) U.S. Cl.
CPC ............ *G06F 21/00* (2013.01); *G06F 21/6218* (2013.01)
USPC ...................... 726/27; 726/2; 726/26; 726/30

(58) Field of Classification Search
USPC .......................................... 726/2, 26, 27, 30
See application file for complete search history.

(56) References Cited

U.S. PATENT DOCUMENTS

| | | | |
|---|---|---|---|
| 4,854,205 A | 8/1989 | Anderka | |
| 4,982,437 A | 1/1991 | Loriot | |
| 6,237,240 B1 | 5/2001 | Nelson et al. | |
| 6,434,444 B2 | 8/2002 | Herman, Jr. | |
| 6,785,025 B1 | 8/2004 | Dawe et al. | |
| 6,906,643 B2 | 6/2005 | Samadani et al. | |
| 7,054,708 B1 | 5/2006 | Aamodt et al. | |

(Continued)

FOREIGN PATENT DOCUMENTS

| CN | 1103274 A | 6/1995 |
|---|---|---|
| DE | 10239792 A1 | 4/2003 |

(Continued)

OTHER PUBLICATIONS

U.S. Appl. No. 60/517,550.

(Continued)

*Primary Examiner* — Peter Shaw
(74) *Attorney, Agent, or Firm* — Honigman Miller Schwartz and Cohn LLP

(57) ABSTRACT

A method of operating a controller device of an electronic cutting machine. The method includes writing a controller device identifier to memory of the cartridge, writing a cartridge identifier to memory of the controller device, and permitting communication between the controller device and the cartridge.

18 Claims, 56 Drawing Sheets

U.S. PATENT DOCUMENTS

| | | |
|---|---|---|
| 7,056,410 B2 | 6/2006 | Kuller et al. |
| 7,149,599 B2 | 12/2006 | Arai et al. |
| 7,269,471 B2 | 9/2007 | Kadono |
| 7,385,724 B2 | 6/2008 | Brown |
| 7,403,211 B2 | 7/2008 | Sheasby et al. |
| 2003/0120375 A1 | 6/2003 | Arai et al. |
| 2003/0134615 A1 | 7/2003 | Takeuchi |
| 2004/0160462 A1 | 8/2004 | Sheasby et al. |
| 2005/0044485 A1 | 2/2005 | Mondry et al. |
| 2005/0097081 A1 | 5/2005 | Sellen et al. |
| 2005/0143855 A1 | 6/2005 | Arai et al. |
| 2005/0162445 A1 | 7/2005 | Sheasby et al. |
| 2005/0166159 A1 | 7/2005 | Mondry et al. |
| 2006/0117922 A1 | 6/2006 | Causse et al. |
| 2006/0200267 A1 | 9/2006 | Aamodt et al. |
| 2006/0287109 A1* | 12/2006 | Mercado et al. ............... 463/43 |
| 2007/0056414 A1 | 3/2007 | Saeterbo et al. |
| 2007/0105076 A1 | 5/2007 | Causse et al. |
| 2007/0227332 A1 | 10/2007 | Causse et al. |
| 2008/0117455 A1 | 5/2008 | Tomono et al. |
| 2008/0120071 A1 | 5/2008 | Minatogawa et al. |
| 2008/0134853 A2 | 6/2008 | Causse et al. |
| 2008/0282859 A2 | 11/2008 | Causse et al. |
| 2009/0050003 A1 | 2/2009 | Dubois, III |
| 2009/0158182 A1 | 6/2009 | McCurdy et al. |
| 2009/0158183 A1 | 6/2009 | McCurdy et al. |

FOREIGN PATENT DOCUMENTS

| | | |
|---|---|---|
| EP | 0509102 A1 | 10/1992 |
| WO | WO-2005017780 A1 | 2/1924 |
| WO | WO-2006055408 A2 | 5/2006 |
| WO | WO-2007090189 A2 | 8/2007 |
| WO | WO-2008013727 A2 | 1/2008 |
| WO | WO-2008036290 A2 | 3/2008 |
| WO | WO-2008142935 A1 | 11/2008 |
| WO | WO-2009042804 A1 | 4/2009 |
| WO | WO-2009042808 A1 | 4/2009 |

OTHER PUBLICATIONS

U.S. Appl. No. 60/627,179.

* cited by examiner

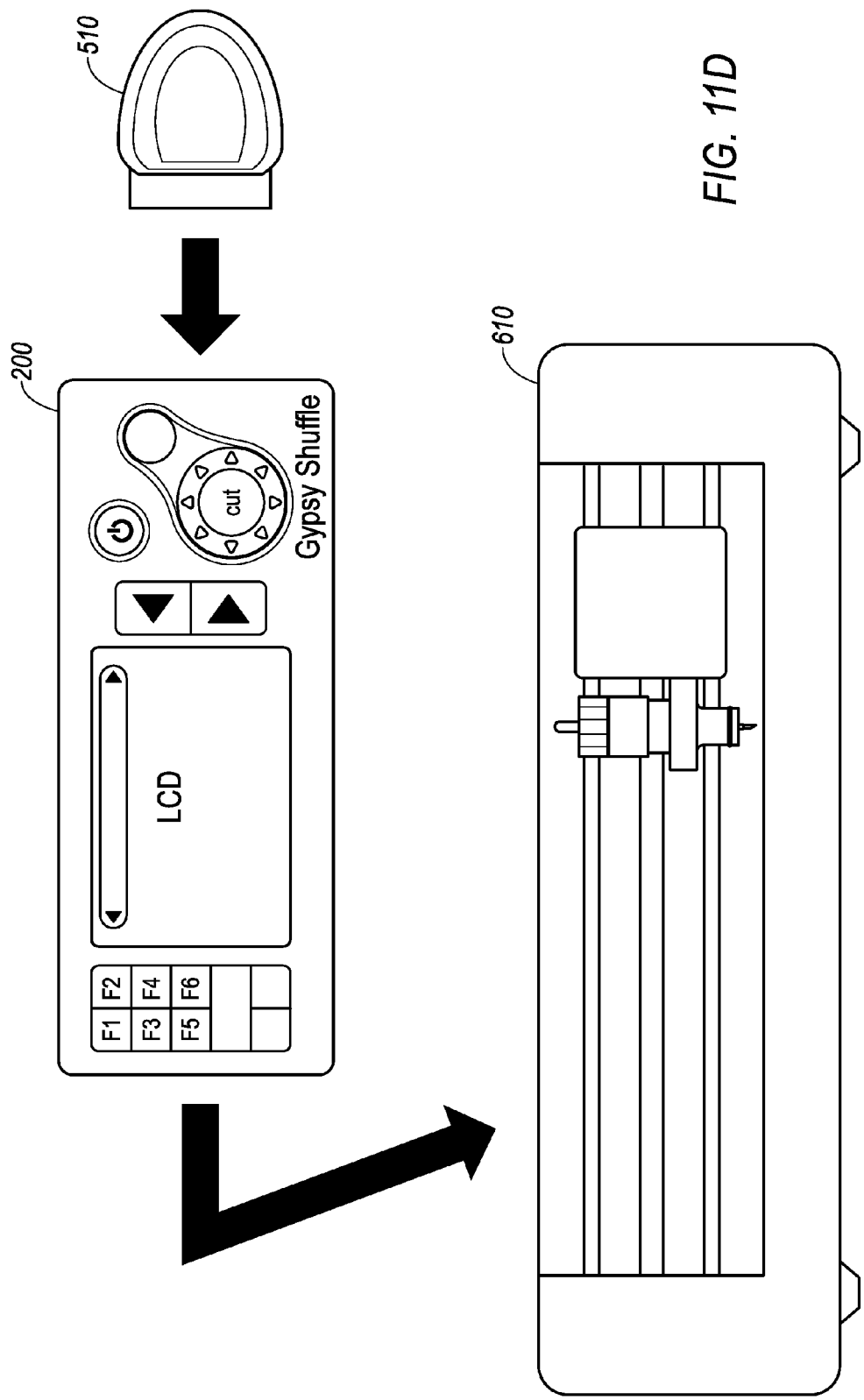

CONTROLLER DEVICE

CROSS REFERENCE TO RELATED APPLICATIONS

This U.S. patent application claims priority under 35 U.S.C. §119(e) to U.S. Provisional Application 61/154,757, filed on Feb. 23, 2009; U.S. Provisional Application 61/177,300, filed on May 12, 2009; U.S. Provisional Application 61/223,698, filed on Jul. 7, 2009; U.S. Provisional Application 61/228,958, filed on Jul. 27, 2009; U.S. Provisional Application 61/229,265, filed on Jul. 28, 2009; U.S. Provisional Application 61/297,563, filed on Jan. 22, 2010; U.S. Provisional Patent 61/178,074, filed on May 14, 2009; and U.S. Provisional Patent Application 61/237,218, filed on Aug. 26, 2009. The disclosures of these prior applications are considered part of the disclosure of this application and are hereby incorporated by reference in their entireties.

TECHNICAL FIELD

The disclosure relates to a controller device for interfacing with and/or controlling an external resource, such as an electronic cutting machine.

BACKGROUND

The scrapbooking industry has provided consumers with various tools, such as mechanical cutting and embossing tools, as well as electronic cutting machines. These tools and machines may be used to create designs for personalizing books and journals, such as may be desired to memorialize events and memories.

However, the scrapbooking tools available are typically large and cumbersome, and not easily portable. Moreover, digital scrapbooking software may be found for personal computers, but may not be available for portable use. Thus, when digital scrapbooking is desired, the consumer may be tied to a personal computer or laptop. Such a system does not allow for easily portable operation and may further require computer operating skills.

Thus, there is a need for a simple and portable device allowing for the scrapbooking design. Moreover, there is a need for the device to interface with an electronic cutting machine to realize the designs by cutting out the constituent components, such as paper cutouts. Additionally, the digital content used to create the designs should be compatible with the electronic cutting machine, and other devices, such as printers, as well as general scrapbooking software systems (such as those operated using a personal computer). Moreover, there is a need to provide the digital content in a secure manner so as to allow for unfettered use by the owner but providing security against unauthorized duplication.

SUMMARY

In one aspect, the disclosure provides a method of operating a controller device of an electronic cutting machine. The method includes writing a controller device identifier to memory of the cartridge, writing a cartridge identifier to memory of the controller device, and permitting communication between the controller device and the cartridge.

Implementations of the disclosure may include one or more of the following features. In some implementations, the method includes accessing the memory of the controller device for installation of the content (e.g., glyphs) associated with the cartridge and storing to the controller device memory any uninstalled content associated with the cartridge. Writing the cartridge identifier to the memory of the controller device may include writing the controller device identifier to a licensing list stored in the memory of the controller device. The method may include preventing additional controller device identifiers from being stored to the memory of the cartridge. In some examples, the cartridge identifier comprises a cartridge serial number and the controller device identifier comprises a controller device serial number.

In some implementations, a method of operating a controller device for an electronic cutting machine includes accessing content from at least one of memory of a cartridge in communication with the controller device and content memory of the controller device, accessing security information stored in cypto memory of the controller device, the cypto memory configured as write-once and read-many, decrypting a license file stored in license memory of the controller device using the security information, the license file comprising at least one cartridge identifier, and permitting usage of accessed content having an associated cartridge identifier in the license file. In some examples, the method includes comparing each cartridge identifier associated with the accessed content with each cartridge identifier of the license file and/or accessing a content usage right from the license file associated with the permitted content.

In some implementations, the method includes initiating a cutting operation on the controller device for cutting a design on the electronic cutting machine, the design including content associated with at least one cartridge. The content associated with the at least one cartridge may include at least one glyph. The method may include allowing execution of the cutting operation after verifying cartridge ownership.

In some implementations, verifying cartridge ownership includes identifying each cartridge associated with the content of the design, obtaining the cartridge identifier for each identified cartridge, searching the memory of the controller device for the cartridge identifier of each identified cartridge, and allowing execution of the cutting operation after each cartridge identifier of each identified cartridge is located in the memory of the controller device. Identifying each cartridge associated with the content of the design may include using content metadata of the design. The content metadata provides a cartridge identifier for each corresponding portion of the design. The cartridge identifier may be obtained from memory of the controller device and/or an external source in communication with the controller device. Examples of external sources include, but are not limited to, a memory device, a rich internet application (RIA) or software application, and an electronic cutting machine. The method may include offering purchase of a usage right of each identified cartridge having a cartridge identifier absent from the memory of the controller device. Execution of the cutting operation may be allowed after selling a usage right for each identified cartridge having a cartridge identifier absent from the memory of the controller device.

In some implementations, the method includes operations for un-pairing a paired cartridge. In such instances, the method includes removing the controller device identifier from the memory of the cartridge and removing the cartridge identifier from the memory of the controller device.

Another aspect of the disclosure provides a method of operating a controller device for an electronic cutting machine. The method includes initiating a cutting operation on the controller device for cutting a design on the electronic cutting machine, where the design includes content associated with at least one cartridge. The method also includes identifying each cartridge associated with the content of the design, obtaining a cartridge identifier for each identified cartridge, searching memory of the controller device for the cartridge identifier of each identified cartridge, and allowing execution of the cutting operation after each cartridge identifier of each identified cartridge is located in the memory of the controller device.

Implementations of this aspect of the disclosure may include one or more of the following features. In some implementations, identifying each cartridge associated with the content of the design includes using content metadata of the design. The content metadata provides a cartridge identifier for each corresponding portion of the design. The cartridge identifier may be obtained from memory of the controller device and/or an external source in communication with the controller device. The content associated with the cartridge may comprise at least one glyph.

In some implementations, the method includes offering purchase of a usage right of each identified cartridge having a cartridge identifier absent from the memory of the controller device. Execution of the cutting operation may be allowed after selling a usage right for each identified cartridge having a cartridge identifier absent from the memory of the controller device.

An aspect of the disclosure provides a system for controlling an electronic cutting machine. The system comprises a cartridge having an interfacing connector and memory and a controller device. The controller device comprises a cartridge connector for establishing an electrical connection with the interfacing connector, memory, and a processor executing a controller application. The controller application writes a controller device identifier to the memory of the connected cartridge, writes a cartridge identifier to the memory of the controller device, and permits usage on the controller device of content associated with the cartridge.

Implementations of this aspect of the disclosure may include one or more of the following features. In some implementations, the controller application accesses the memory of the controller device for installation of the content associated with the cartridge and stores to the controller device memory any uninstalled content associated with the cartridge. The controller application may write the controller device identifier to a licensing list stored in the memory of the controller device. In some implementations, the controller application prevents additional controller device identifiers from being stored to the memory of the cartridge. In some examples, the cartridge identifier comprises a cartridge serial number and the controller device identifier comprises a controller device serial number.

The controller application, in some implementations, initiates a cutting operation on the controller device for cutting a design on the electronic cutting machine, the design including content associated with at least one cartridge. In some examples, the content associated with the cartridge comprises at least one glyph. The controller application executes the cutting operation after verifying cartridge ownership. Verifying cartridge ownership includes identifying each cartridge associated with the content of the design, obtaining the cartridge identifier for each identified cartridge, searching the memory of the controller device for the cartridge identifier of each identified cartridge, and allowing execution of the cutting operation after each cartridge identifier of each identified cartridge is located in the memory of the controller device. In some implementations, the controller application uses content metadata of the design for identifying each cartridge associated with the content of the design. The content metadata provides a cartridge identifier for each corresponding portion of the design. The controller application may obtain the cartridge identifier from memory of the controller device and/or an external source in communication with the controller device. Examples of external sources include, but are not limited to, a memory device, a rich internet application (RIA) or software application, and an electronic cutting machine. In some implementations, the controller application offers purchase of a usage right of each identified cartridge having a cartridge identifier absent from the memory of the controller device. The controller application may allow execution of the cutting operation after selling a usage right for each identified cartridge having a cartridge identifier absent from the memory of the controller device.

In yet another aspect, the disclosure provides a system for controlling an electronic cutting machine. The system includes a cartridge having an interfacing connector and memory and a controller device. The controller device includes a cartridge connector for establishing an electrical connection with the interfacing connector, memory, and a processor executing a controller application. The processor is in communication with the cartridge connector and the controller device memory. The controller application receives a cutting operation for cutting a design on the electronic cutting machine. The design includes content associated with at least one cartridge. The controller application also identifies each cartridge associated with the content of the design, obtains a cartridge identifier for each identified cartridge, searches memory of the controller device for the cartridge identifier of each identified cartridge, and allows execution of the cutting operation after each cartridge identifier of each identified cartridge is located in the memory of the controller device.

In some implementations, the controller application uses content metadata of the design for identifying each cartridge associated with the content (e.g., glyphs) of the design. The content metadata provides a cartridge identifier for each corresponding portion of the design. The cartridge identifier may be obtained from memory of the controller device and/or an external source in communication with the controller device. Examples of external sources include, but are not limited to, a memory device, a rich internet application (RIA) or software application, and an electronic cutting machine. In some implementations, the controller application offers purchase of a usage right of each identified cartridge having a cartridge identifier absent from the memory of the controller device. The controller application may allow execution of the cutting operation after selling a usage right for each identified cartridge having a cartridge identifier absent from the memory of the controller device.

The controller device may be configured to receive an instruction to un-pair a paired cartridge. During an un-pairing operation, the controller application removes the controller device identifier from the memory of the cartridge and removes the cartridge identifier from the memory of the controller device.

Another aspect of the disclosure provides a method of validating a cartridge for use with a controller device. The method includes reading a cartridge identifier from at least one of memory of the cartridge and memory of the controller device, obtaining known content associated with the cartridge based on the cartridge identifier, reading actual content from memory of the cartridge, comparing the known content with the actual content, and permitting communication between the controller device and the cartridge when the known content matches the actual content.

Implementations of this aspect of the disclosure may include one or more of the following features. In some implementations, comparing the known content with the actual content includes comparing at least one Bézier curve of the known content with a corresponding at least one Bézier curve of the actual content. The method may include allowing usage of content associated with the cartridge with the controller device when the known content matches the actual content. Moreover, the method may include accessing the memory of the controller device for installation of the content associated with the cartridge and storing to the controller device memory any uninstalled allowed content associated with the cartridge. The known content may be obtained from at least one of memory of the controller device and an external source in communication with the controller device. The known content and the actual content may each comprise a glyph.

In some implementations, the method includes executing a cutting operation of a design on an electronic cutting machine in communication with the controller device, where the design comprises allowed cartridge content. The method may include establishing communication between the cartridge and the controller device. The controller device reads a cartridge identifier from memory of the cartridge.

In some implementations, the method includes establishing communication between the controller device and an external resource. The external resource receives a resource operation for executing a design on the external resource, where the design includes content associated with the cartridge. The external resource also obtains the cartridge identifier for the cartridge, searches the memory of the controller device for the cartridge identifier, and allows execution of the resource operation after the cartridge identifier is located in the memory of the controller device. The method may include checking existence of communication between the controller device and the external resource. The external resource terminates execution of any resource operations upon cessation of communication between the controller device and the external resource.

The method may include may include operations for pairing and un-pairing the cartridge with the controller device. For pairing, the method may include writing a controller device identifier to the memory of the cartridge and writing the cartridge identifier to the memory of the controller device. The method may include preventing additional controller device identifiers from being stored to the memory of the cartridge. For un-pairing, the method may include removing the controller device identifier from the memory of the cartridge and removing the cartridge identifier from the memory of the controller device.

In some implementations, the method includes offering purchase of a usage right of the cartridge when the known content differs from the actual content. Execution of a cutting operation may be allowed after selling a usage right for the cartridge when the known content differs from the actual content.

In another aspect, the disclosure provides a method of using a controller device for an electronic cutting machine. The method includes associating at least one of cutting operations and printing operations with glyphs, retrieving the glyphs from at least one of memory of a cartridge in communication with the controller device and memory of the controller device, arranging the glyphs in a screen overlay, and rendering the screen overlay on a screen of the controller device.

Implementations of this aspect of the disclosure may include one or more of the following features. In some implementations, the method includes storing the glyph arrangement in memory of the controller. The method may include receiving at least one glyph selection corresponding to a glyph displayed on the controller device screen and executing an operation on the controller device corresponding to the glyph selection and/or receiving positioning input of the selected at least one glyph for arrangement of the selected glyph on a virtual mat displayed on the controller device screen. The executed operation may include at least one of a cutting operation, a printing operation, and a controller device operation. The method may include storing glyph renderings and/or an arrangement of glyph renderings to memory of the controller device.

In some implementations, the method includes accessing the memory of the controller device for a stored glyph rendering and/or an arrangement of glyph renderings, retrieving the stored glyph rendering and/or an arrangement of glyph renderings, and displaying the stored glyph rendering and/or an arrangement of glyph renderings to the controller device screen. The screen overlay may comprise the arrangement of glyph renderings.

In some implementations, the method includes mapping a glyph boundary of each glyph of the screen overlay to pixels of the controller device screen for identifying selection of each glyph. The controller device screen may include a touch screen configured to receive touch inputs thereupon.

In yet another aspect, the disclosure provides a controller device for an electronic cutting machine that includes a screen, a processor, and device memory in communication with the processor. The process is in communication with the screen and executes a program for interfacing with the controller device. The program associates at least one of cutting operations and printing operations with glyphs, retrieves the glyphs from at least one of memory of a cartridge in communication with the controller device and the device memory, arranges the glyphs in a screen overlay, and renders the screen overlay on the screen.

Implementations of this aspect of the disclosure may include one or more of the following features. In some implementations, the program executing on the processor stores the glyph arrangement in the device memory. The program may receive at least one glyph selection corresponding to a glyph displayed on the screen and execute an operation on the controller device corresponding to the glyph selection and/or receive positioning input of the selected at least one glyph for arrangement of the selected glyph on a virtual mat displayed on the screen. The executed operation may include at least one of a cutting operation, a printing operation, and a controller device operation.

In some implementations, the program executing on the processor stores glyph renderings and/or an arrangement of glyph renderings to the device memory. The program can access the device memory for a stored glyph rendering and/or arrangement of glyph renderings, retrieves the stored glyph rendering and/or arrangement of glyph renderings, and displays the stored glyph rendering and/or arrangement of glyph renderings to the screen. In some examples, the screen overlay comprises the arrangement of glyph renderings.

The program executing on the processor may map a glyph boundary of each glyph of the screen overlay to pixels of the screen for identifying selection of each glyph. The screen may comprise a touch screen configured to receive touch inputs thereupon Another aspect of the disclosure provides a method of using a controller device for an electronic cutting machine. The method includes associating at least one of cutting operations and printing operations with glyphs, retrieving the glyphs from at least one of memory of a cartridge in communication with the controller device and memory of the controller device, arranging the glyphs in a screen overlay, and rendering the screen overlay on a screen of the controller device.

Implementations of this aspect of the disclosure may include one or more of the following features. In some implementations, the method includes storing the glyph arrangement in memory of the controller. The method may include receiving at least one glyph selection corresponding to a glyph displayed on the controller device screen and executing an operation on the controller device corresponding to the glyph selection. The executed operation may include at least one of a cutting operation, a printing operation, and a controller device operation.

In some implementations, the method includes receiving a glyph selection corresponding to at least one glyph displayed on the controller device screen and receiving positioning input of the selected at least one glyph for arrangement of the selected glyph on a virtual mat displayed on the controller device screen. The method may include storing glyph renderings and/or an arrangement of glyph renderings to memory of the controller device. The method may include accessing the memory of the controller device for a stored glyph rendering and/or arrangement of glyph renderings, retrieving the stored glyph rendering and/or arrangement of glyph renderings, and displaying the stored glyph rendering and/or arrangement of glyph renderings to the controller device screen. Furthermore, the screen overlay may comprise the arrangement of glyph renderings. In some examples, the method includes mapping a glyph boundary of each glyph of the screen overlay to pixels of the controller device screen for identifying selection of each glyph. The controller device screen may comprise a touch screen configured to receive touch inputs thereupon.

In yet another aspect, the disclosure provides a controller device for an electronic cutting machine that includes a screen and a processor in communication with the screen and device memory. The processor executes a program for interfacing with the controller device. The program associates at least one of cutting operations and printing operations with glyphs, retrieves the glyphs from at least one of memory of a cartridge in communication with the controller device and the device memory, arranges the glyphs in a screen overlay, and renders the screen overlay on the screen.

Implementations of this aspect of the disclosure may include one or more of the following features. In some implementations, the program stores the glyph arrangement in the device memory. The program may receive at least one glyph selection corresponding to a glyph displayed on the screen and executes an operation on the controller device corresponding to the glyph selection. The executed operation can include at least one of a cutting operation, a printing operation, and a controller device operation. In some examples, the program receives a glyph selection corresponding to at least one glyph displayed on the screen and receives positioning input of the selected at least one glyph for arrangement of the selected glyph on a virtual mat displayed on the screen.

In some implementations, the program stores glyph renderings and/or an arrangement of glyph renderings to the device memory. The program may access the device memory for a stored glyph rendering and/or arrangement of glyph renderings, retrieve the stored glyph rendering and/or arrangement of glyph renderings, and display the stored glyph rendering and/or arrangement of glyph renderings to the screen. Furthermore, the screen overlay may comprise the arrangement of glyph renderings. In some examples, program maps a glyph boundary of each glyph of the screen overlay to pixels of the screen (e.g., a touch screen configured to receive touch inputs thereupon) for identifying selection of each glyph.

Another aspect of the disclosure provides a method of using a controller device for an electronic cutting machine that includes receiving a selection of a glyph displayed in an overly view displayed on a screen of the controller device, displaying the selected glyph in a selected glyph region of the overlay view and displaying the selected glyph on a virtual mat displayable on the screen of the controller device. The overly view comprises an arrangement of glyphs.

In some implementations, the method includes arranging an order of any glyphs in the selected glyph region according to an order of corresponding placement on the virtual mat. In additional implementations, combinable with any others, the method includes arranging an order of any glyphs in the selected glyph region on the virtual mat according to a corresponding order of the glyphs in the selected glyph region. The method may include arranging an order of any glyphs in the selected glyph region according to an attribute of each glyph. The glyph attribute may be selected from the group consisting of name, size, shape, date saved, associated cartridge, and any combination thereof. In some examples, the method includes receiving a selection of glyphs in the selected glyph region, receiving a grouping command, and grouping the selection of glyphs into a single group glyph for display in the selected glyph region.

Another aspect of the disclosure provides a method of using a controller device for an electronic cutting machine that includes receiving a content search string, accessing content from at least one of memory of a cartridge in communication with the controller device and memory of the controller device, and displaying on a screen of the controller device a results list having for each content search result, a content name and a cartridge name associated with the content search result. In some implementations, the method includes receiving a search results selection and displaying an overlay on a screen of the controller device, the overlay comprising an arrangement of content glyphs associated with the cartridge of the corresponding search results selection, the overlay displaying a content glyph with an indication of selection that corresponds to the search results selection.

The details of one or more implementations of the disclosure are set forth in the accompanying drawings and the description below. Other aspects, features, and advantages will be apparent from the description and drawings, and from the claims.

DESCRIPTION OF THE DRAWINGS

The disclosure will now be described, by way of example, with reference to the accompanying drawings, in which:

FIG. 11D is a schematic view of a controller connecting to a controllable machine to control the machine.

Like reference symbols in the various drawings indicate like elements.

DETAILED DESCRIPTION

Figure 1:
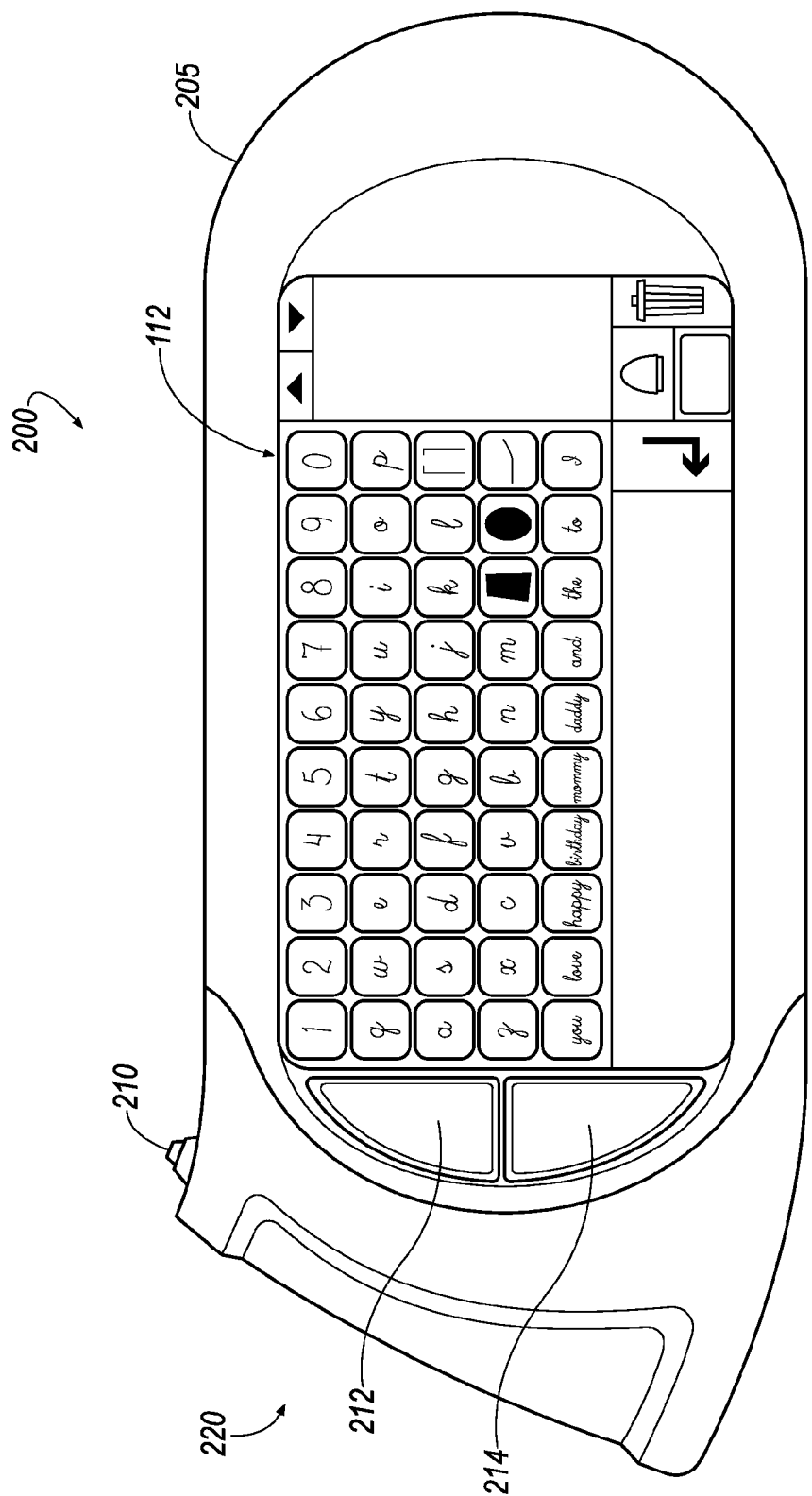
FIG. 1 is a top view of an exemplary controller device.

The figures illustrate implementations of a controller device for use with a peripheral device and/or a personal computer. Based on the foregoing, it is to be generally understood that the nomenclature used herein is simply for convenience and the terms used to describe implementations of the disclosure should be given the broadest meaning by one of ordinary skill in the art.

In general, the benefits of using a controller device include, but not exclusively, that a personal computer is not required to control a peripheral device and/or to create designs, that the controller may store content (e.g., glyphs), overlays, manuals, pre-made projects, user-made projects, and that it allows for the storage, modification, and printing of digital photographs. The peripherals may include an electronic cutting machine, a printer, and/or an electronic printing and cutting machine. For examples of electronic cutting machines, U.S. patent application Ser. No. 11/457,415, filed Jul. 13, 2006, to Workman et al., entitled "Electronic Paper Cutting Apparatus" and U.S. patent application Ser. No. 12/020,545, filed Jan. 27, 2008, to Johnson et al., entitled "Cutting Apparatus" are incorporated by reference herein in their entireties.

The controller provides for a number of features including mass storage that allows users to store content in one place. For example, a user of a CRICUT® electronic cutting machine (by Provo Craft & Novelty of Spanish Fork, Utah) may load all of his/her cartridges onto the controller so that he/she would no longer have a need to carry physical cartridges, manuals and overlays with him/her. The controller also provides a mobile application solution as a portable device, which allows the user to use programs on the controller that enable the manipulation of content, while connected or disconnected from a machine controllable by the controller. The user then has the ability to manipulate content with the stand-alone controller. It is also desired that when the controller is connected to a personal computer that the user may be provided with a more robust interface and the power of a mouse and keyboard for ease of use. The controller also provides users a new way of controlling their peripheral products. For example, the controller may be connected directly to a CRICUT® electronic cutting machine and then be used to control the peripheral directly.

Application Software may run on the controller device that may be used for user-design, storage, and controlling the peripherals to perform their functions. The controller device may be used as a standalone device, as connected to a personal computer, as connected to at least one peripheral, or in combination of a connection with a personal computer and at least one peripheral. The connectivity may be through the controller device and/or the peripheral(s).

For example, when the controller device is connected to a personal computer running a design program and the personal computer is connected to a CRICUT® machine, the design program may act as an electronic juke box (e.g., an electronic storage unit for multiple cartridges, allowing the user access to the stored content without the need to physically install and remove cartridges) for content to be printed and/or cut on the connected machine. The controller may also be used as an authentication system that provides the personal computer program with a list of cartridges that the owner is permitted to access and use to execute machine operations, such as cutting and/or printing.

In another example, the controller device may be connected to a personal computer and the software can communicate with the controller to act as an activation dongle. This unlocking dongle function may be temporary so that when the controller is unplugged from the personal computer, the program will revert back to a trial version. Moreover, the software for the controller may be designed in a manner so as to localize the software for different languages.

FIG. 1 illustrates an exemplary controller device 200 that includes a housing 205, a screen 112 (e.g., a touch-enabled (resistive or capacitive) touch screen and/or a pen-enabled screen (electromagnetic resonance)) supported by the housing 205, a stylus 210 (showed in the stored position) received by the housing 205, user buttons 212, 214 disposed on the housing 205, and a user hand grip 220 disposed on or defined by the housing 205. The user hand grip 220 may allow the user to hold the controller 200 when in use. The user may operate the controller 200 with the stylus 210 to make selections, motions, or designs on the touch screen 112, and the user buttons 212, 214 may further allow selections, dragging, dropping, etc. An additional user button 310 (see FIG. 3C) may allow for both left and right hand selection, in addition to input by the stylus 210 to the touch screen 112.

In some implementations, the user buttons 212, 214, 310 may provide at least three states of device usage. A first state of usage includes no user buttons 212, 214, 310 pressed during usage (e.g., during a user selection on the screen 112). A second state of usage includes one of the user buttons 212, 214, 310 pressed during usage, and a third state of usage includes two of the user buttons 212, 214, 310 pressed during usage. Each usage state may be associated with a screen overlay rendered and/or displayed to the screen 112. For example, the first usage state may correspond to a general usage state, whereby a keypad or general control overlay is displayed. The second usage state may correspond to an altered state, such as a shift-key or Alt-key state, whereby a keypad overlay in a shift-key state or Alt-key is displayed. This allows the user to make shift-key or Alt-key selections without having to first select a shift or Alt key. The third usage state may correspond to a view state, whereby a user can move between views. For example, in the third usage state, the user can toggle between a designer view 3200 (FIG. 32) providing a virtual mat 2800 for creation and arrangement of a design 2805 comprising one more glyphs 2810 and a keypad view 3100 (FIG. 31) for selection of content (e.g., glyphs 2810) to place on the virtual mat 2800.

In general, the controller device 200 may provide software allowing the user to create new designs, review designs, and cut/print designs on peripherals. Moreover, the controller device 200 may allow for secure storage of digital content (e.g., comprising one or more glyphs). The digital content may include, for example, artwork used to create cut and/or printed designs. The digital content may be displayed and manipulated using the touch screen 112. That is to say, the user may interact with the controller device 200 using the touch screen 112, as well as the user buttons 212, 214, to create designs as well as control peripherals such as electronic cutting machines, printers, and the like.

The controller device 200 may be used to transport digital content securely. For example, where digital content is sold to a consumer, the consumer may enable the controller device 200 to store and provide the content for use on demand. Moreover, the controller device 200 may enable the digital content for a variety of platforms. In some examples, the platform may include the CRICUT® electronic cutting machine. When the controller device 200 is communicating with the CRICUT® electronic cutting machine, all of the digital content owned by the user may be available for use by the CRICUT® electronic cutting machine. In this way, the controller device 200 may function as a digital content storage device, where the user need not transport cartridges for all of the user's digital content. Alternatively, the controller device 200 may also allow for digital content delivery via a network interface, such as the Internet. The digital content may be purchased and/or downloaded by the user to the controller device 200, which then allows use of the digital content.

The controller device 200 allows for various functions including designing, reviewing, and modification of scrapbooking designs. The controller device 200 provides a platform to store, use, and review digital content. In addition, the controller device 200 provides a platform for interacting with other design systems, as well as community interactions (e.g., uploading-publishing to blogs and other community websites, as well as downloading designs from the same).

Cloud computing allows users to use applications without installation and provides access to their personal files at any computer or computing device with internet access. In general, cloud computing is virtualized third-party hosting, for example, where a user's server runs inside a virtual container which can be moved from one physical server to another without interruption of service. Such a container is also capable of spanning multiple physical machines, giving it potentially limitless resources. This allows for much more efficient computing by centralizing storage, memory, processing and bandwidth. In some implementations, the controller device 200 (or software executable on a processor 240 (see FIG. 11A) of the controller device 200) is a cloud client that relies on cloud computing for application delivery, or is specifically designed for delivery of cloud services (e.g., content, design applications, etc.). The controller device 200 may execute rich internet applications (RIA) received through cloud computing. The RIA may provide design creation tools and capabilities. Moreover, the user may receive applications or content on demand to the user's own controller device 200 or other computing devices by accessing a subscription service. While in communication with or executing an RIA, the controller device 200 may access information, such as machine, cartridge or content specific information from a cloud source (e.g., data storage in the cloud).

In some implementations, the RIA receives credit card information from the user to authenticate the user's log in. The RIA may require connection or communication with the controller device 200 to authentication of the user. In some examples, the RIA tracks the browsing and usage of content for creating designs and delivers content (e.g., visually) to the user based on past usage of similar content (e.g., by category, keyword, etc.) and/or statistical analysis. Content may also be delivered to the user based on promotional activities or incentives.

As shown, the controller device 200 is configured to be a handheld device where the user may hold the device at user hand grip 220, and the user may use the stylus 210 or his/her fingers to interact with touch screen 112. Moreover, when the user's left hand is gripping hand grip 220, the user may employ his/her left thumb to operate the user buttons 212, 214. At the same time, the user may be cooperatively employing the stylus 210 to modify a design. An example of two-handed operations may include stretching a glyph. The glyph may be represented on the touch screen 112 as a shape. If, for example, the user button 212 was configured as a soft-key for a "stretch" function, the user may push the user button 212 with his/her left thumb while stretching the glyph with the stylus in his/her right hand. In this way, the controller device 200 may be used for two-handed inputs.

Figure 2:
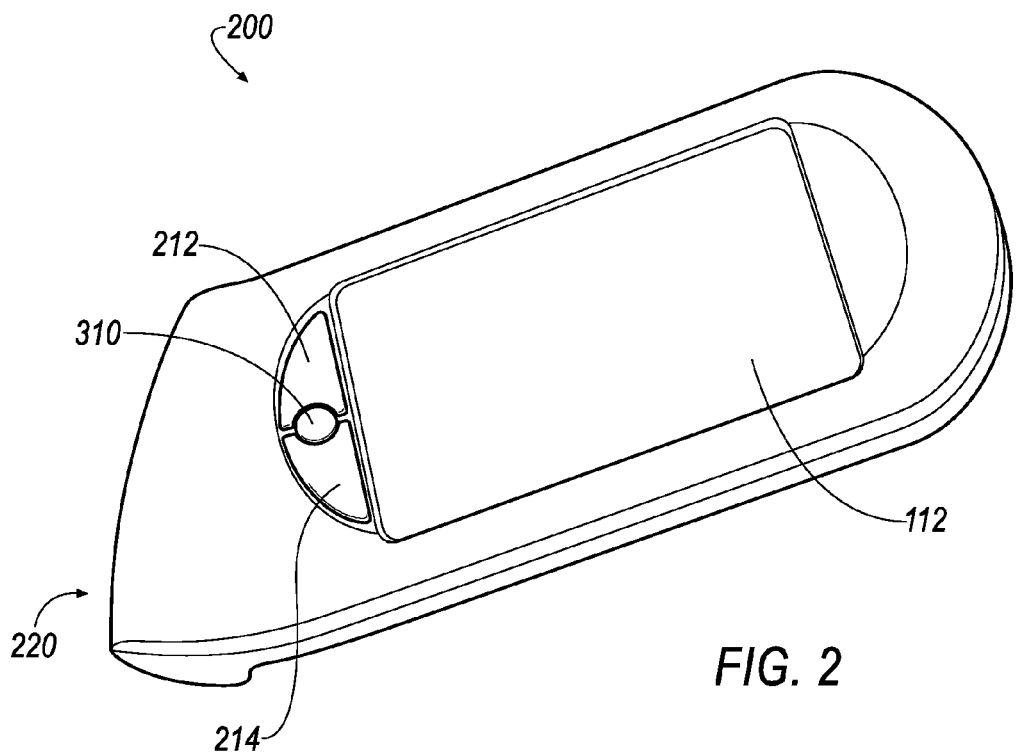
FIG. 2 is a perspective view of an alternative exemplary controller device.

FIG. 2 is an alternative example of a controller device 200 including the touch screen 112, the user buttons 212, 214, a central user button 310, and the hand grip 220. The controller device 200 may allow for portable carrying and handheld use. The central button 310 may be used as a selection key, for example, while the user buttons 212, 214 may be used for feature keys (e.g., shift, zoom, pan, or size).

Figure 3A:
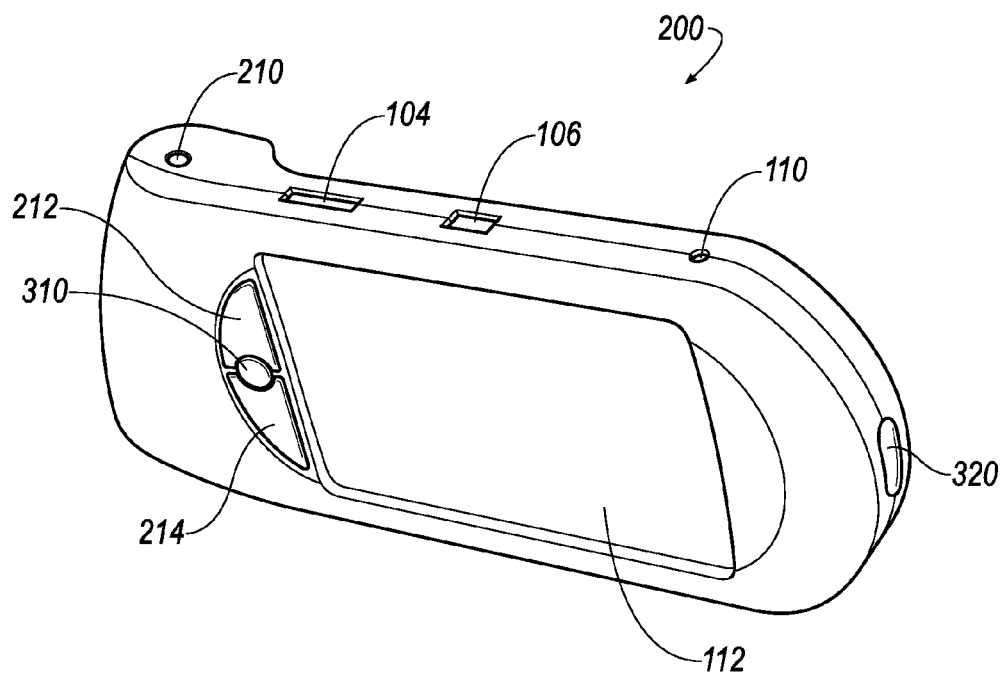
FIG. 3A is a top perspective view of the controller device of FIG. 1.

FIG. 3A is a top perspective view of the controller device 200 shown in FIG. 1. The controller device 200 further includes a stylus 210 (received by a receptacle of the controller device 200), a cartridge connector 104, a USB-B port 106, a power connector 110, and a user selector button 320. The user selector button 320 may be configured for user inputs or an on/off button depending on the state of controller 100.

Figure 3B:
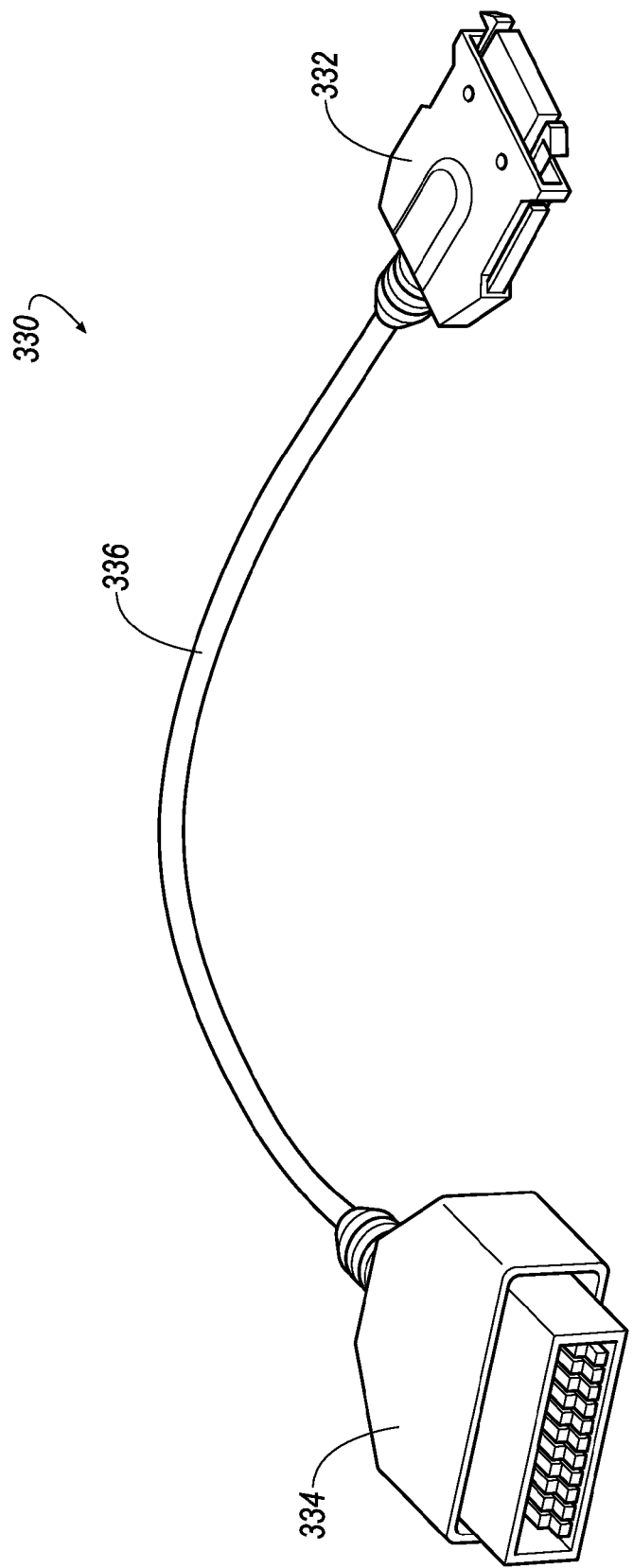
FIG. 3B is a perspective view of an exemplary cartridge cable.
Figure 3C:
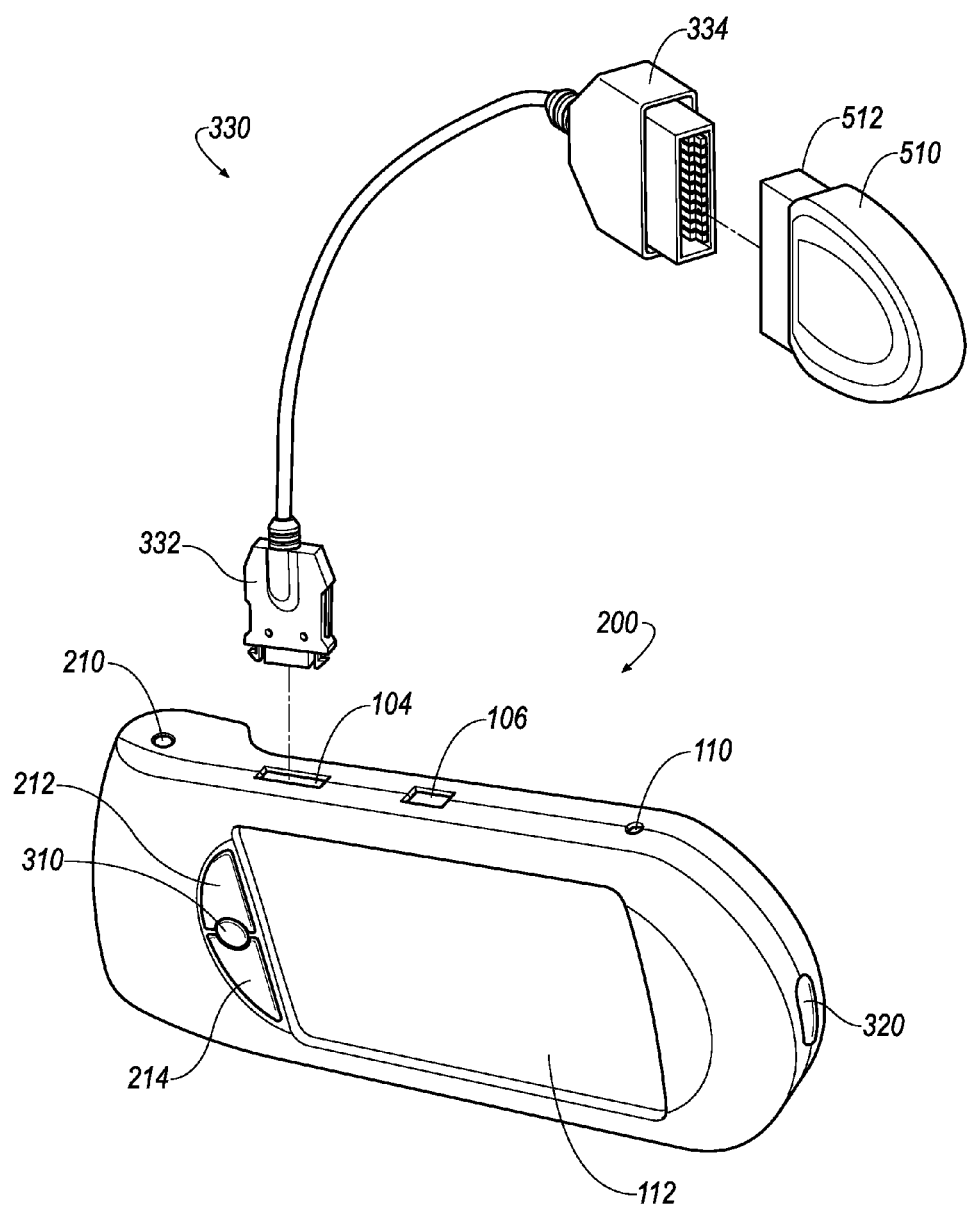
FIG. 3C is a perspective view of a cartridge cable connecting a cartridge to a controller device.
Figure 5:
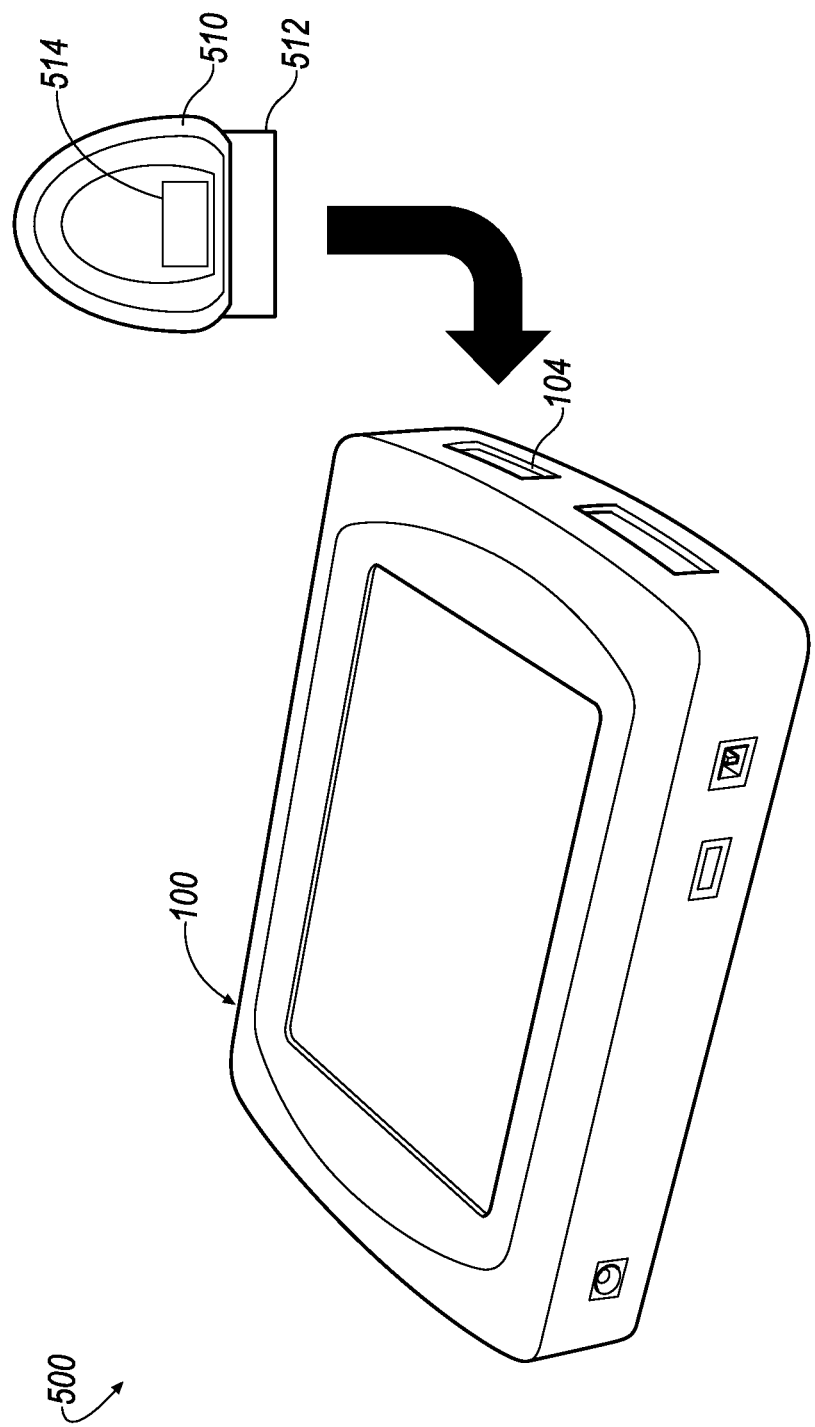
FIG. 5 is a perspective view of a controller device interfacing with a cartridge.

FIG. 3B is an example of a cartridge adapter 330 for use with the controller device 200. A cartridge connector 334 may be configured to connect with a variety of cartridges, or a single type of cartridge. An electrical cable connects the cartridge connector 334 with a standard controller connector 332. The controller connector 332 is configured to connect with the controller device 200 at a standard port, e.g., cartridge connector 104 (see FIG. 3A). In general, the cartridge connector 104 may be configured to receive an interfacing connector 512 of a cartridge 510 (see FIG. 5). Thus, in an example such as shown in FIG. 5, the cartridge 510 may be plugged directly into a controller device 100. Alternatively, as shown in FIG. 3C, the cartridge adapter 330 may be used to adapt the standard cartridge connector 104 to various types of cartridges 510. The controller device 200 using a standard cartridge connector 104 and a cartridge adapter 330 may allow for older legacy cartridges with various interfacing connectors 512 to connect with controller device 200, as well as provide an upgrade path to newer cartridge formats (e.g., newer cartridge connectors and electronics) by providing a new cartridge adapter 330 with a new cartridge connector 334. In this way, the cartridge adapter 330 allows for future growth and use of the controller device 200 as cartridges evolve.

Figure 4:
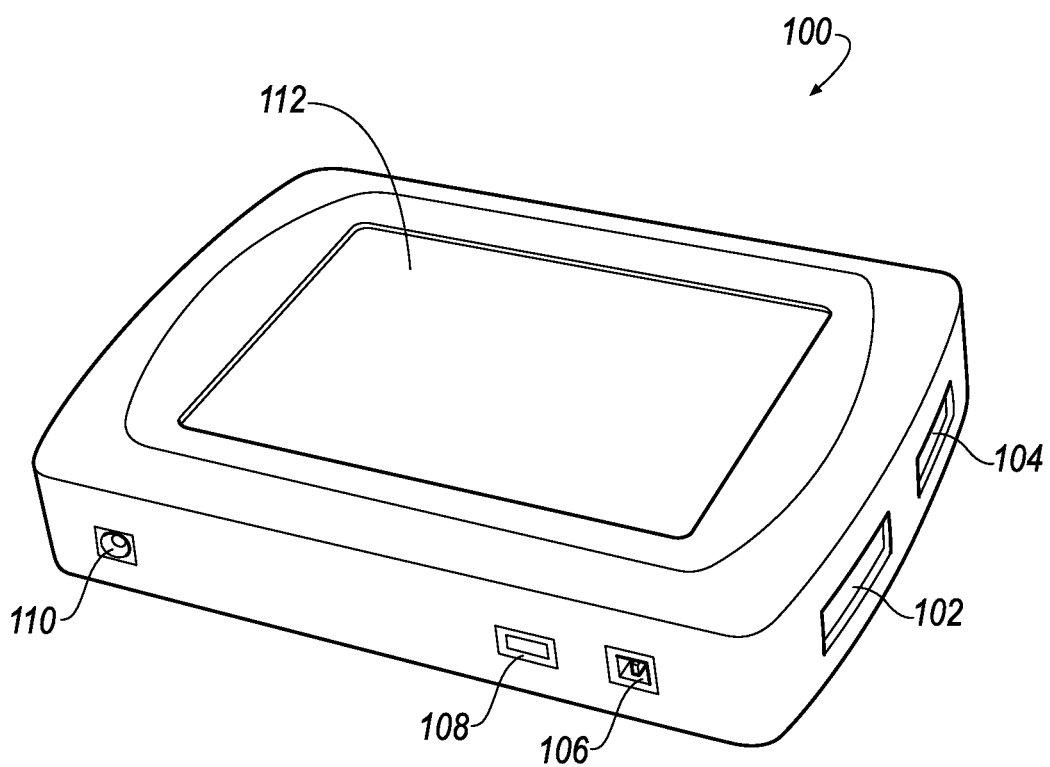
FIG. 4 is a perspective view of a controller device.

FIG. 4 is a perspective view of a portable controller device 100 that may be used to control various peripheral devices, such as an electronic cutting machine, a printer, and/or an electronic printing and cutting machine. The controller device 100 includes a touch screen 112, a power connector 110, a USB-A port 108, a USB-B port 106, an upgraded cartridge connector 102, and a cartridge connector 104. The power connector 110 may be used for providing power when an internal battery (not shown) is dead and for charging the battery. The cartridge connector 104 may be used, for example for connecting existing cartridges (e.g., cartridges for use with the CRICUT® electronic cutting machine) to the controller device 100. The upgraded cartridge connector 102 may have a different connector format, and may be used to connect newer or future planned cartridges to the controller device 100.

The controller device 100 may be used as a standalone device, or in combination with a peripheral device or computer. For example, when the controller device 100 is used as a standalone device, it may be transported for use as a portable designing device. The user may carry the controller device 100 with them and work on projects on-the-go. The user interface (e.g., provided on the touch screen 112) may allow for designing layouts, photo cropping and arrangement, etc. The USB connectors 106, 108 may be used to connect the portable controller 100 to a personal computer and to a peripheral, alone or in combination.

FIG. 5 is an example 500 of the controller device 100 interfacing with a cartridge 510. The user may plug the interfacing connector 512 of the cartridge 510 into the cartridge connector 104 of the controller device 100 to provide the cartridge functionality to the controller device 100. For example, the controller device 100 may upload information from the cartridge 100 for storage internally (e.g., in memory 514 of the cartridge 510). Alternatively, controller device 100 may program the cartridge 510 with content (e.g., by writing content to the memory 514 of the cartridge 510). In other examples, the controller device 100 may validate the user by using the cartridge serial number read from the cartridge 500. The controller device 100 may also be configured to use the content from the cartridge 510, and/or store the content locally on the controller device 100 for use by the user at his/her convenience for design, and for controlling a peripheral device (e.g., an electronic cutting machine, a printer, and/or an electronic printing and cutting machine).

Figure 6:
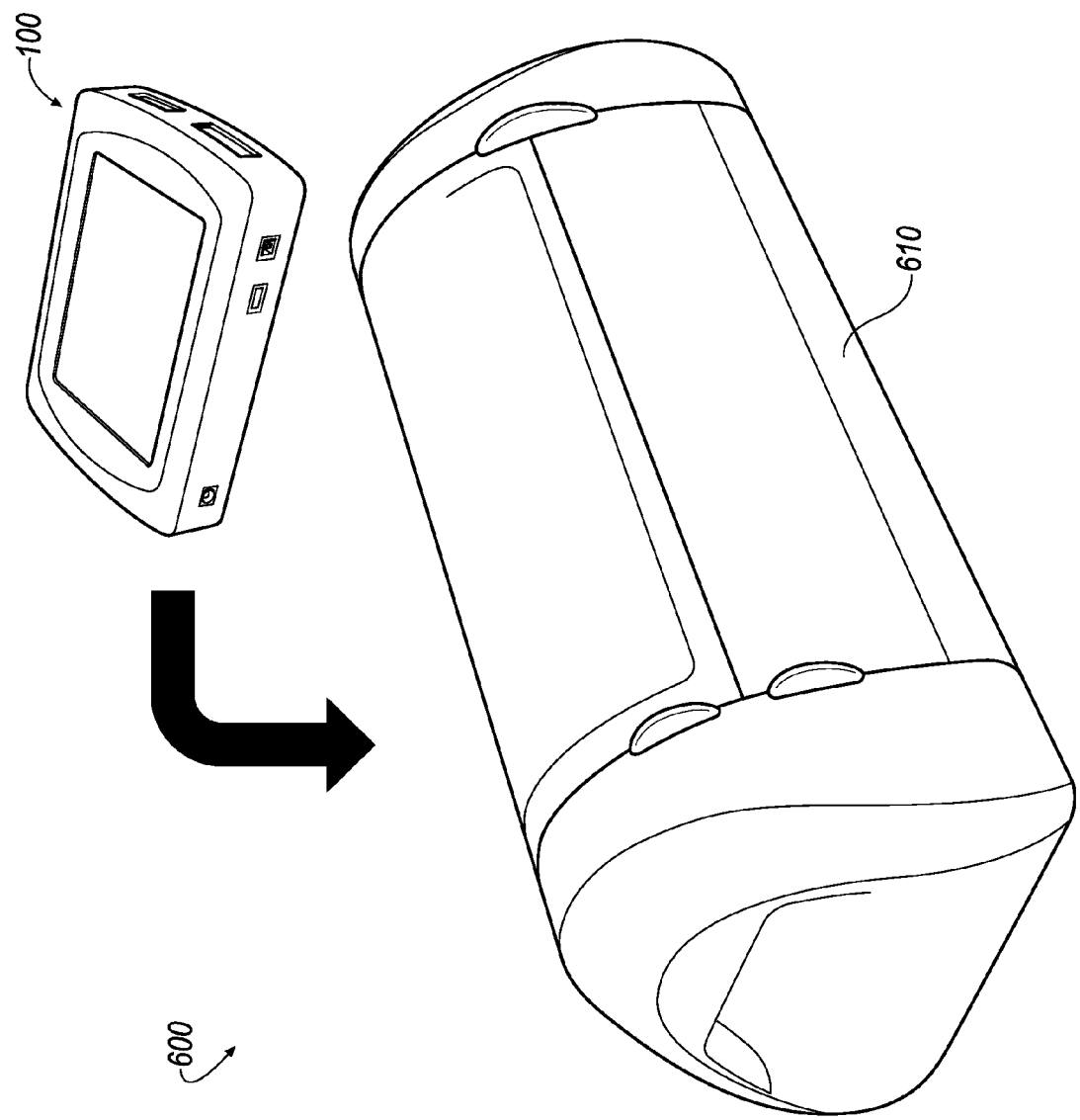
FIG. 6 is a perspective view of a controller device interfacing with an electronic cutter.

FIG. 6 is an example 600 of the controller device 100 interfacing with an electronic cutter 610. The controller device 100 may identify the electronic cutter 610 via a communication interface, or it may be manually identified by the user via the controller device 100. The controller device 100 may then issue commands to the electronic cutter 610 to control the cutting of shapes. When, for example, the electronic cutter 610 is configured as a printer & cutter, the controller device 100 may issue commands to print and cut the desired shapes.

Figure 7:
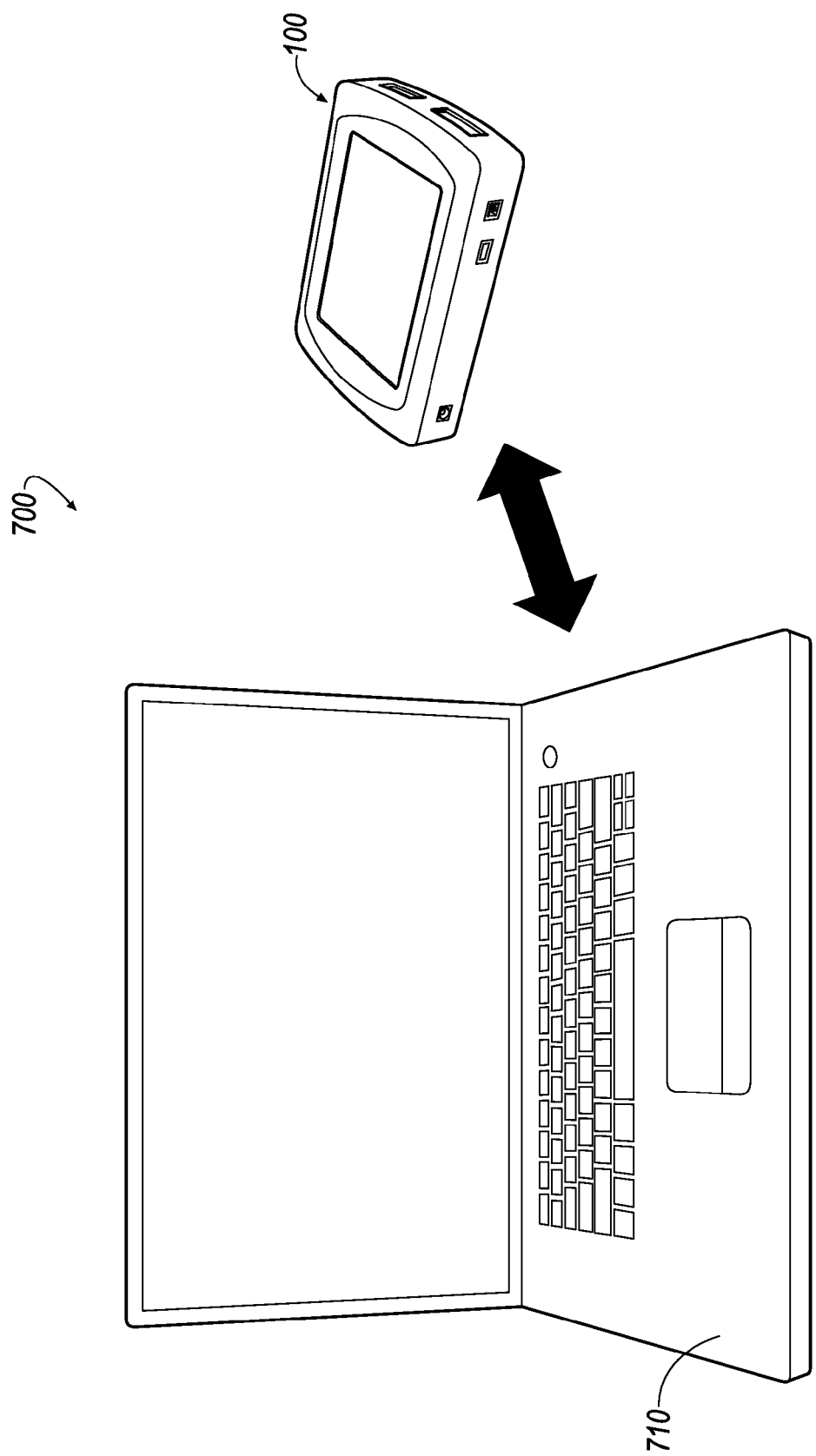
FIG. 7 is a perspective view of a controller device interfacing with a personal computer.

FIG. 7 is an example 700 of the controller device 100 interfacing with a personal computer 710. The controller device 100 may communicate with the personal computer 710 via a network (e.g., wireless, Ethernet, Bluetooth, etc.) or local interface (e.g., universal serial bus (USB)). Communication between the personal computer 710 and the controller device 100 may provide upload and download of data (e.g., designs and information) therebetween. This may include provisioning the controller device 100 with content or licenses for using content. Moreover, the communication may enable the controller device 100 to share design information with the personal computer 710 for synchronization of designs. This may be helpful, for example, when a user portably creates or modifies a design with the controller device 100, and then desires to synchronize the changes with the personal computer 710.

Figure 8:
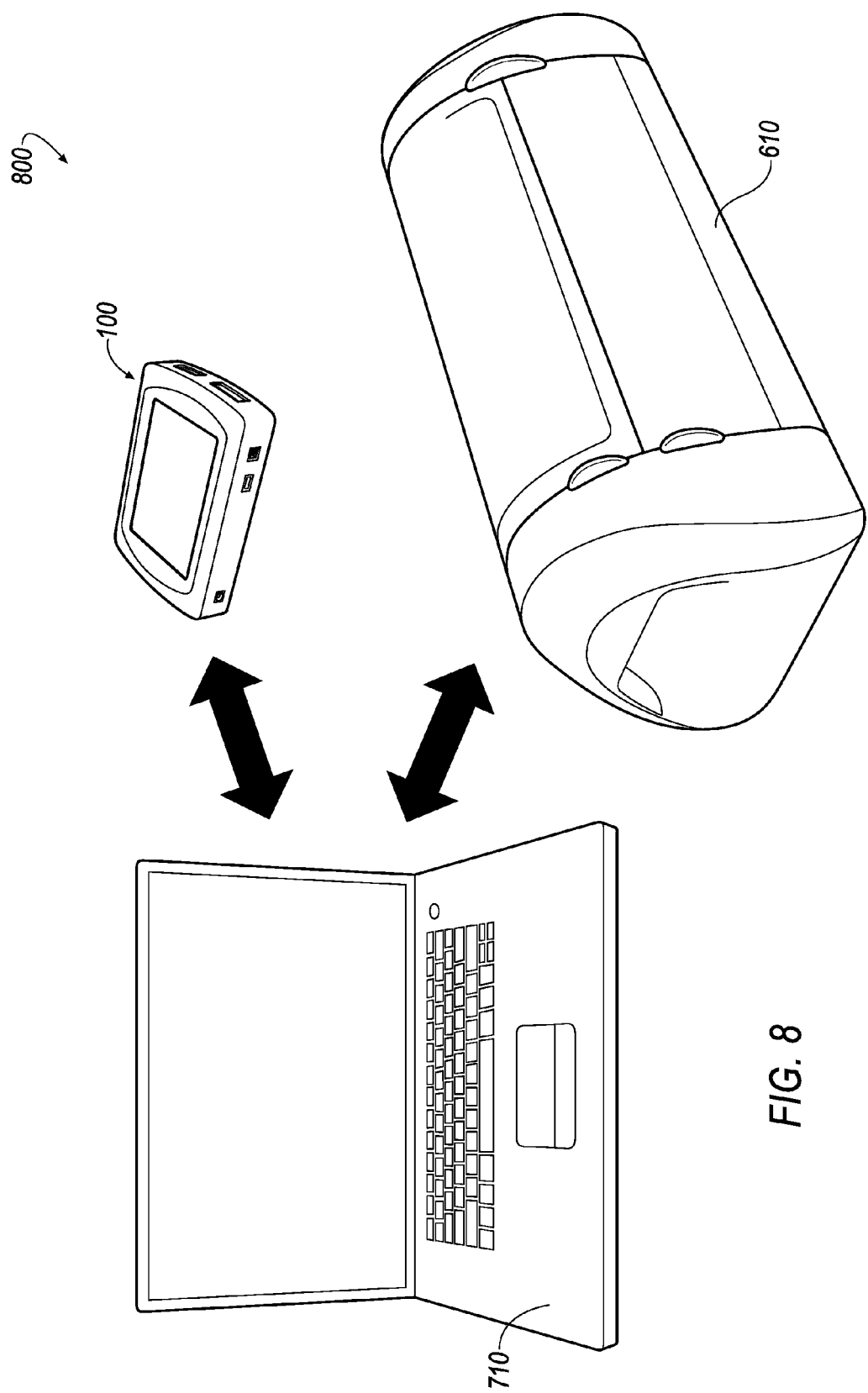
FIG. 8 is a schematic view of a controller device interfacing with a personal computer and an electronic cutter.

FIG. 8 is an example 800 of the controller device 100 interfacing with a personal computer 710 and an electronic cutting machine 610. In some examples, the controller device 100 receives information from the personal computer 710 and the electronic cutting machine 610. This may be where a design is stored on the personal computer 710, but the control of the peripheral (electronic cutting machine 610) is performed by the controller device 100.

Additional features of the controller device 100 may include interoperability, cartridge pairing, rendering/keypad, designing, output, finding images, security and upgrading.

Figure 9:
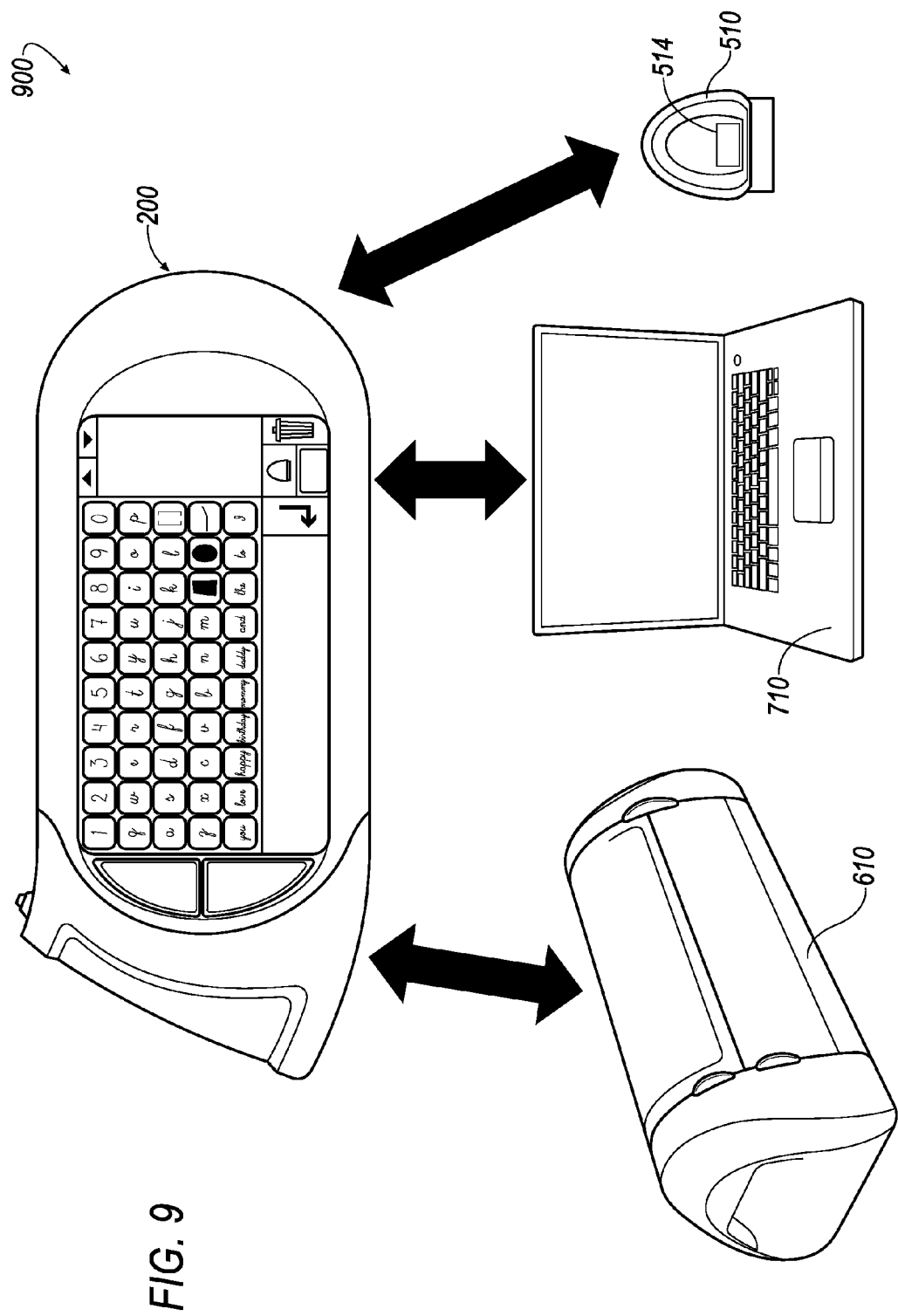
FIG. 9 is a schematic view of a controller device interfacing with one or more of an electronic cutter, a personal computer, and a cartridge.

FIG. 9 is an example 900 of a controller device 200 interfacing with the electronic cutting machine 610, the personal computer 710, and the cartridge 510. In general, the controller device 200 may interface each of these devices to store, control, and/or authorize use of digital content. The digital content may be provided by a physical cartridge 510, or it may be downloaded (for example, from the Internet, as by cloud computing). The controller device 200 provides a multi-purpose portable device that enables the user to create designs, review designs, share designs, cut designs (e.g., using the electronic cutting machine 610) and control other peripherals.

In general, the cartridge 510 may store digital content. The digital content may include glyphs, such as shapes letters, shadow effects, etc. In some examples, the cartridge 510 stores one or more libraries of information that may be encrypted. The cartridge 510 may also store information (e.g., in an extensible markup language (XML) file or data structure) that maps the glyphs to a keypad (e.g., displayed on the screen 112 of the controller device 200) for user selection of the glyphs.

The personal computer 710 may be used to operate design software such as CRICUT DESIGNSTUDIO® (by Provo Craft & Novelty, Inc. of Spanish Fork, Utah). The files that describe designs created on the controller device 200 may also be compatible with CRICUT DESIGNSTUDIO®, or the like, and vice versa. The electronic cutting machine 610 may be connected using, for example, a USB interface or a wireless interface. In general, the controller device 200 provides a portable command center for the design and use of digital content.

Interoperability allows the controller device 200 to interact with various other systems and apparatuses. For example, the controller device 200 can interface with a design software application, such as CRICUT DESIGNSTUDIO®, executable on a processor of the computer 710 or as a rich internet application (RIA), to share designs and content. The controller device 200 may include a listing of authorized cartridges 510 and/or content. These cartridges 510 and/or content may be licensed by the user and that license information and/or authorization may be stored in the controller device 200. If the controller device 200 is placed in communication with the design software application, the design software application may query the controller device 200 to obtain authorization for use. If certain content is authorized for use, the design software application may allow use of the content by the authorized user. In this way, the controller device 200 functions as a portable "juke box" for all of the user's content and may provide other devices and/or systems with the authorization to use the content. Thus, the controller device 200 may function as a content dongle. The design software application may detect the presence of the controller device 200 and automatically detect which content and/or cartridges 510 the user is authorized to cut with. In some instances, the design software application retains no rights to otherwise use the content without the controller device 200 present and providing authorization for content usage.

In some implementations, the user connects the electronic cutting machine 610 (e.g., CRICUT®) to a computer 710 for the purposes of cutting on the electronic cutting machine 610 using the design software application. If the controller device 200 is not present, the user may need to physically connect each desired cartridge 510 to the electronic cutting machine 610 before cutting any content from the cartridge 510. When prompted by the design software application, the user may connect the cartridges 510 one at a time to the electronic cutting machine 610 for authorization. For example, if design software application wants to cut a design that uses images from three different cartridges 510, the user will have to insert those cartridges 510 one at a time. In another example, if a jukebox machine, such as the CRICUT JUKEBOX® by Provo Craft & Novelty of Spanish Fork, Utah, is connected to the electronic cutting machine 610 and the cartridges 510 in question are connected to the jukebox machine (or the content of the cartridges is stored on the jukebox machine), the design software application will automatically detect the cartridges 510 (or their respective content) and cut a design selected from the content. In some examples, each jukebox machine may be limited to a certain number of cartridges (e.g., six cartridge capacity). In such instances, multiple jukebox machines may be connected together (electrically or by a wireless connection) to the electronic cutting machine. Alternatively, if the controller device 200 is connected to the personal computer 710 executing the design software application, the controller device 200 automatically detects which cartridges 510 the controller device 200 is authorized to access and use through controller device software (e.g., CRICUT® Application by Provo Craft & Novelty of Spanish Fork, Utah) executed on a processor 240 (FIG. 11A) of the controller device 200, and in turn allows design software application to access and use the authorized content of the cartridge(s) 510 for operating the electronic cutting machine 610 (e.g., to cut shapes selected from the authorized content in media, such as paper).

In some implementations, one or more cartridges 510 are paired to the controller device 510 through the controller device application running on the controller device 200. During the pairing process, the serial number of the controller device 200 may be written to the memory 514 of the cartridge 510. The cartridge 510 continues to function as it did before the serial number was written to the cartridge 510. However, the serial number on the cartridge 510 prevents the cartridge 510 from being paired to a different controller device 200 in the future. This may be used to prevent the unauthorized duplication of cartridges 510 on multiple controller devices 200. Users may be advised to keep their cartridges 510 for the purposes of backup in case their controller device 200 is lost, stolen or damaged.

Figure 10:
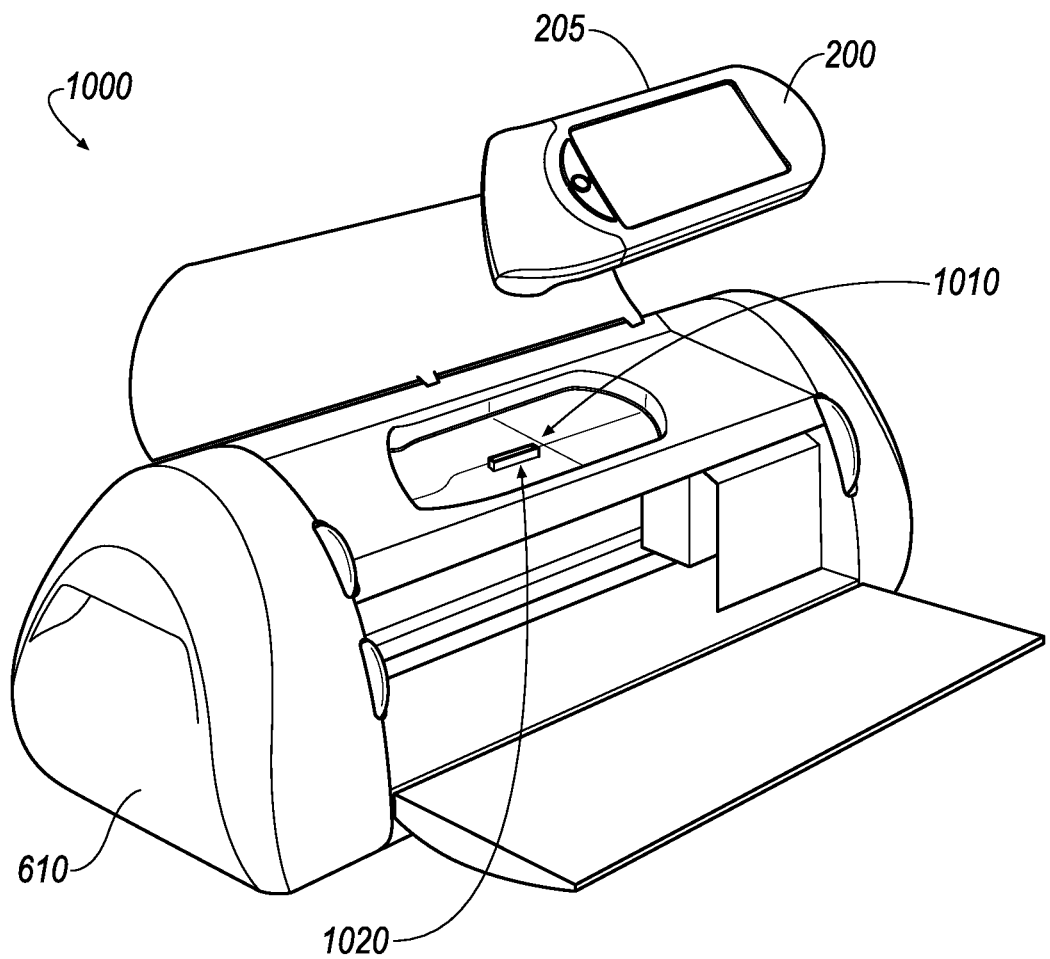
FIG. 10 is a perspective view of a snap-in controller in a removed position for use with an electronic cutting machine.
Figure 11A:
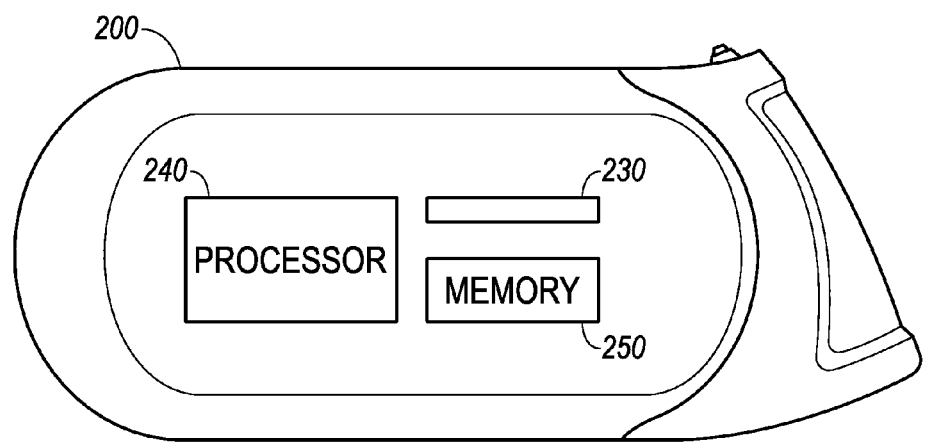
FIG. 11A is a bottom perspective view of a snap-in controller.

FIG. 10 is an example 1000 of a snap-in type controller device 200 in a removed position for use with the electronic cutting machine 610. A receiving space 1010 defined by or configured on the electronic cutting machine 610 accepts or receives the controller device 200. The controller device 200 may snap into a received position by an interference fit, housing detents, or by some other physical connection. In other examples, the controller device 200 does not necessarily snap-into a position, but otherwise establishes a connection with the electronic cutting machine 610. A connector 1020 may be provided near the receiving space 1010 that the controller device 200 contacts during engagement with the electronic cutting machine 610. In some examples, the controller device 200 includes a corresponding connector or contact pad 230 (as shown in FIG. 11A) configured to receive or be received by the connector 1020 of the electronic cutting machine 610. The connectors 230, 1020 of the controller device 200 and the electronic cutter 610, respectively, may have a specific interface configuration for providing power and data communications, while in other examples, the connectors 230, 1020 may comply with industry standards, such as a universal serial bus (USB) connector. Using the connector 1020, the controller device 200 may communicate with the electronic cutter 610 to provide instructions for cutting. Alternatively, the controller 200 may communicate wirelessly (e.g., Bluetooth or Wi-Fi) with the electronic cutter 610. When the controller device 200 is separated from the electronic cutter 610, the controller device 200 may be used as a portable device. The receiving space 1010 may be configured to receive features defined by the controller housing 205, for example, to guide or align the connector 230 for engagement with the corresponding connector 1020 of the electronic cutting machine 610.

Figure 11B:
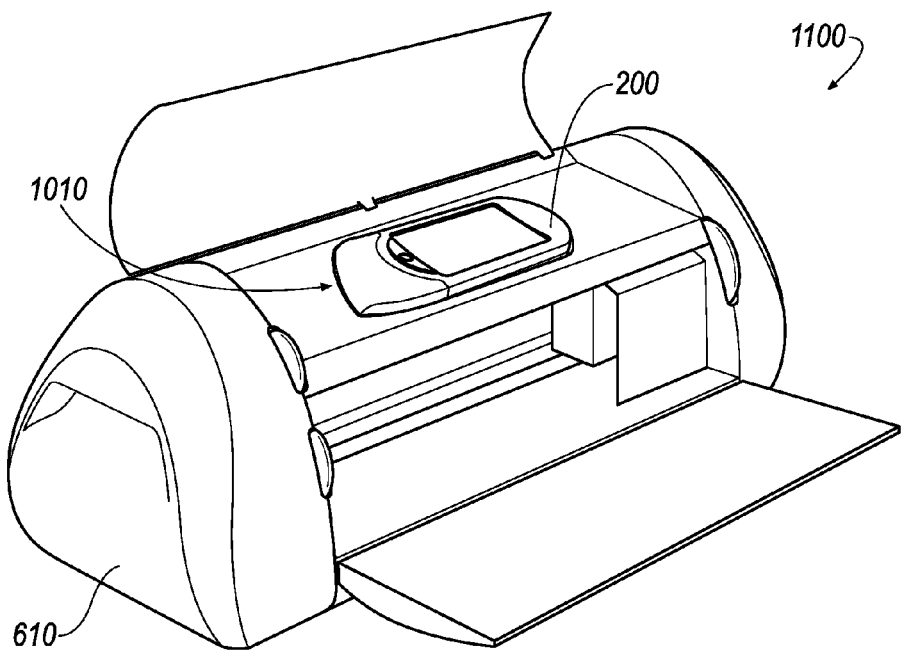
FIG. 11B is a perspective view of a snap-in controller in an attached position for use with an electronic cutting machine.

FIG. 11B illustrates an example 1100 of the snap-in type controller device 200 in an attached position for use with the electronic cutting machine 610. The electronic cutting machine 610 may be embodied as a stand-alone machine capable of operation with or without the controller device 200. For example, in a stand-alone configuration, the electronic cutting machine 610 is used as a peripheral device to a personal computer, etc. The stand-alone configuration typically includes all of the control hardware and firmware to operate the electronic cutting machine 610 provided that external commands are given. Alternatively, the electronic cutting machine 610 may include a user interface and/or cartridge connector for direct use with or without a personal computer.

In some implementations, the electronic cutting machine 610 has certain processing capabilities removed so that the controller device 200 may be needed to operate the electronic cutting machine 610. The controller device 200 can be an independent device for creating designs (e.g., via designer application software executing on the processor 240) and is modularly received by the electronic cutting machine 610 and other peripheral machines or devices for implementing the designs (e.g., via cutting, printing, etc.). The controller device 200 operates as a master controller of the connected machines. For example, the electronic cutting machine 610 includes low-level devices (such as stepper motors and solenoids) and corresponding drivers, but may lack intelligence features, such as a processor. When the controller device 200 is received by the electronic cutting machine 610 (e.g., in the receiving space 1010), the connector 1020 establishes communications with the corresponding connector 230 of the controller device 200 to allow a processor 240 (FIG. 11A) of controller device 200 to control the electronic cutting machine 610 directly at a low level (e.g., at a motor driver level). In this way, the electronic cutting machine 610 may be reduced in cost and the high-powered processor, design capabilities, and digital content storage may be housed within the controller device 200 to allow reduced cost and more efficient use of resources. As a result, the electronic cutting machine 610 can receive a modular unit, such as the controller device 200, for receiving processing capabilities to drive or control one or more components of the electronic cutter 610, such as motors and drivers. For example, by providing the digital content storage within the controller device 200, the need to carry and/or manually plug in a large number of cartridges 510 is eliminated. Since the controller device 200 may include all of the user's digital content, only the controller device 200 is needed to interface with electronic cutting machine 610. Moreover, where the high-powered processing is centralized with the snap-in controller 200, the cost of the electronic cutting machine 610 may be reduced.

Figure 11C:
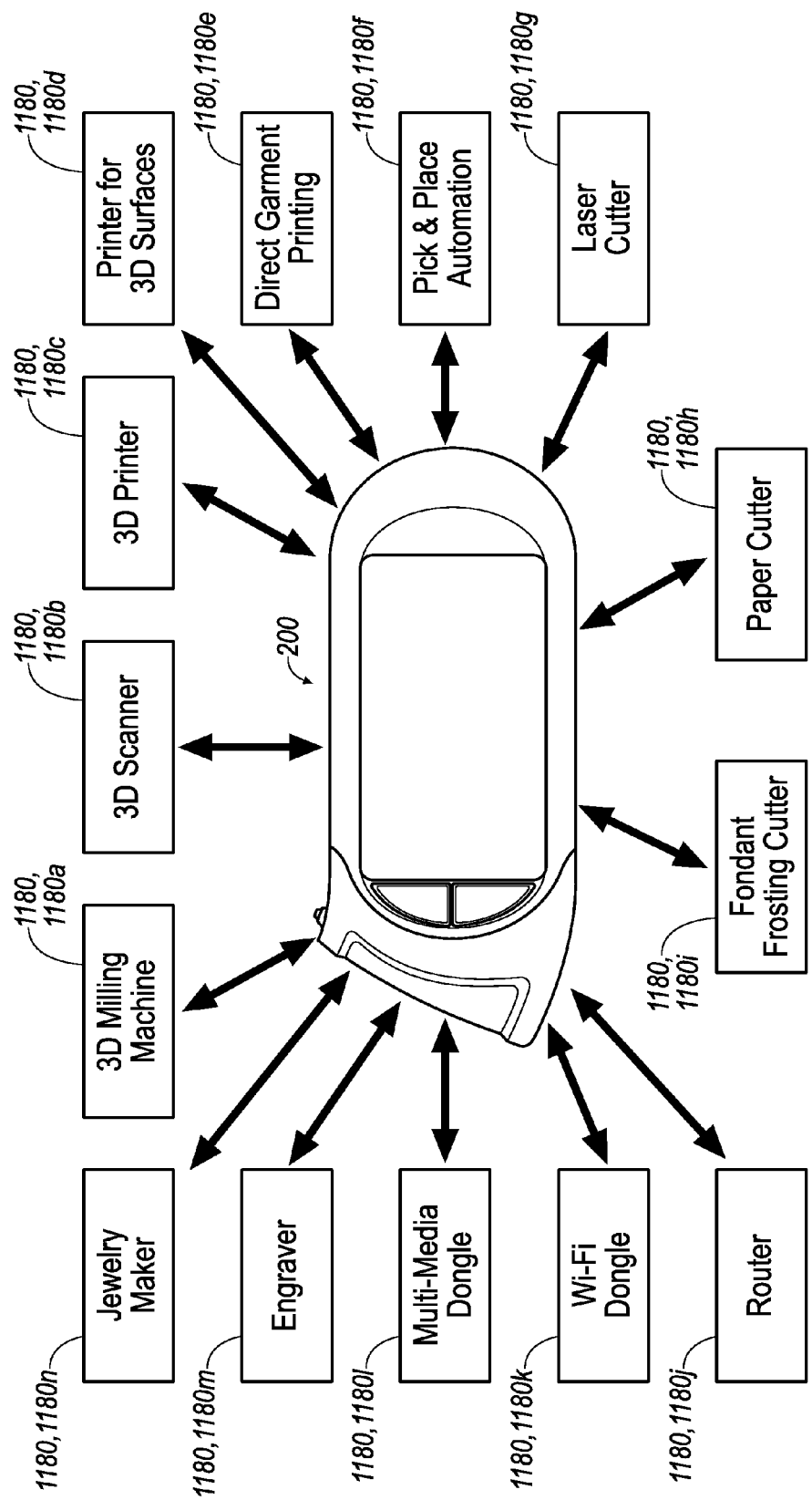
FIG. 11C is a schematic view of a snap-in controller as modular interface to multiple devices.

Referring to FIG. 11C, in some implementations, the controller device 200 provides a modular interface for multiple devices or machines. The controller device 200 may be connectable (e.g., via a wireless network or direct electrical communication, such as a USB connection) to one or more external resources or devices 1180 that rely on the controller device 200 to drive those devices. Exemplary devices include, but are not limited to, three dimensional (3D) milling machines 1180a, 3D scanners 1180b, 3D printers 1180c, printers 1180d configured for printing on 3D surfaces, direct to garment printing machines 1180e, pick and place automation and gantries 1180f, laser cutters 1180g, paper cutters 1180h (such as the CRICUT® electronic cutting machine by Provo Craft & Novelty, Inc. of Spanish Fork, Utah), Fondant frosting cutters 1180i, routers 1180j, Wi-Fi dongles 1180k, multimedia dongles 1180l, engravers 1180m, and jewelry makers 1180n. In some implementations, the controller device 200 recognizes the type of connected machine or device and provides an appropriate user interface for controlling and/or communicating with the connected machine or device. By connecting to multiple machines or devices 1180, the controller device 200 may provide cross-machine or cross-platform sharing of content.

Referring to FIG. 11D, in some implementations, while providing processing capability for connectable devices, such as the electronic cutting machine 610, the controller device 200 includes only enough memory 250 (FIG. 11A) for storing and displaying information from a cartridge 510 (e.g., FIG. 5) on the screen 112, for example, so that a user can select a glyph without an overlay or manual. In the example shown, the controller device 200 connects to a controllable machine, such as the electronic cutting machine 610, to control the connected machine. In some examples, the controller device 200 does not include a power source (e.g., battery), but rather obtains power from a device (such as the electronic cutting machine 610) receiving the controller device 200. In some examples, the controller device 200 requires a connected cartridge 510 to drive the electronic cutting machine 610, while in other examples, a cartridge 510 is not necessary.

Figure 11E:
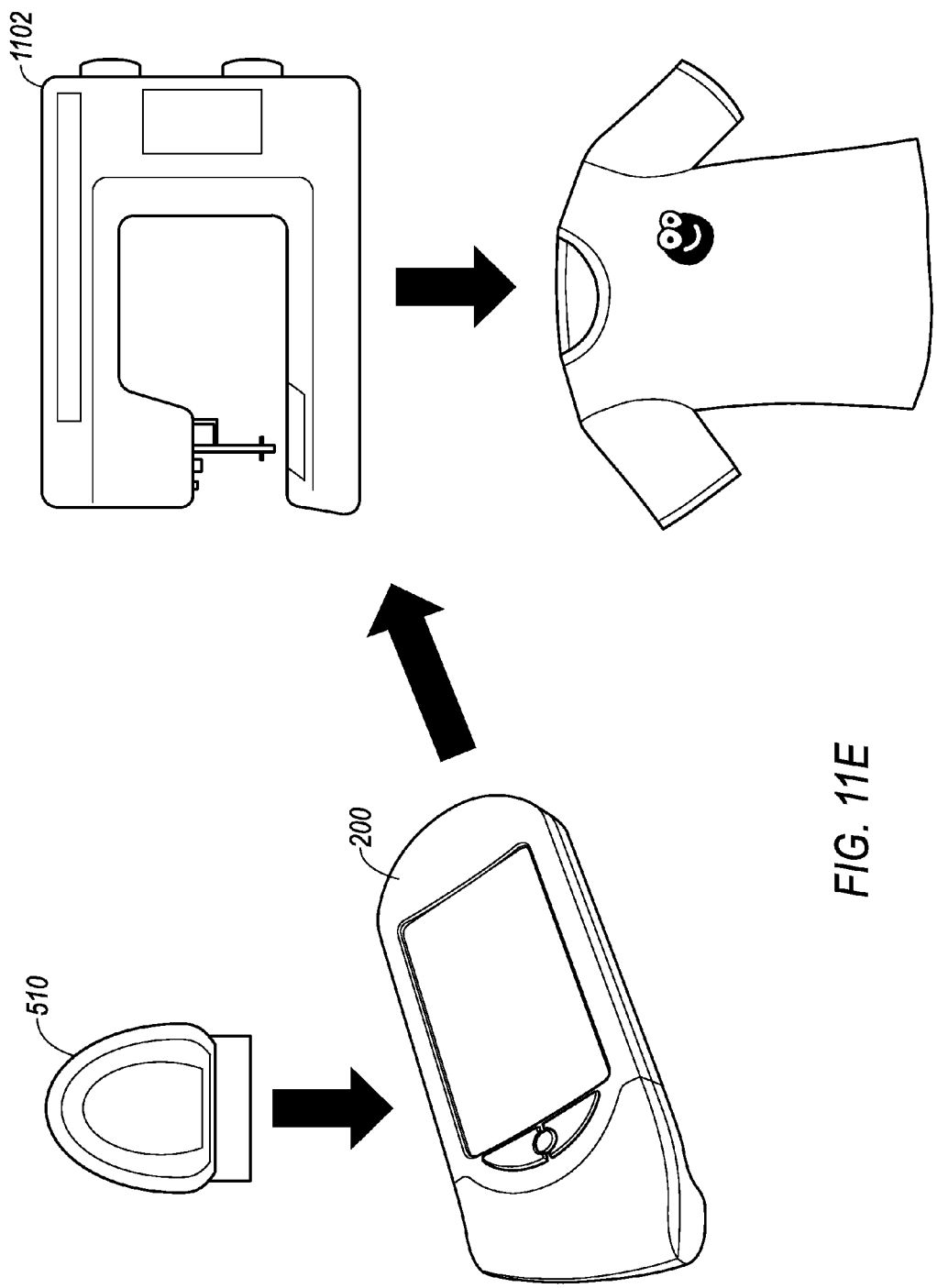
FIG. 11E is a schematic view of a controller connecting to an embroidery machine to control the embroidery machine.

FIG. 11E illustrates an example of the controller device 200 being received by an embroidery machine 1102 (e.g., in a receptacle defined by the embroidery machine 1102 having a connector for establishing electrical communication with the received controller device 200). In some implementations, the embroidery machine 1102 only relies on the controller device 200 to receive data, such artwork or stitch patterns, that is read and/or stored in memory by the embroidery machine 1102 to execute one or more embroidery operations. In other implementations, the embroidery machine 1102 relies on the controller device 200 to control one or more components of the embroidery machine 1102, such as motors and/or corresponding drivers, ancillary or auxiliary processors, etc, to run the embroidery machine 1102 and execute one or more embroidery operations.

Figure 11F:
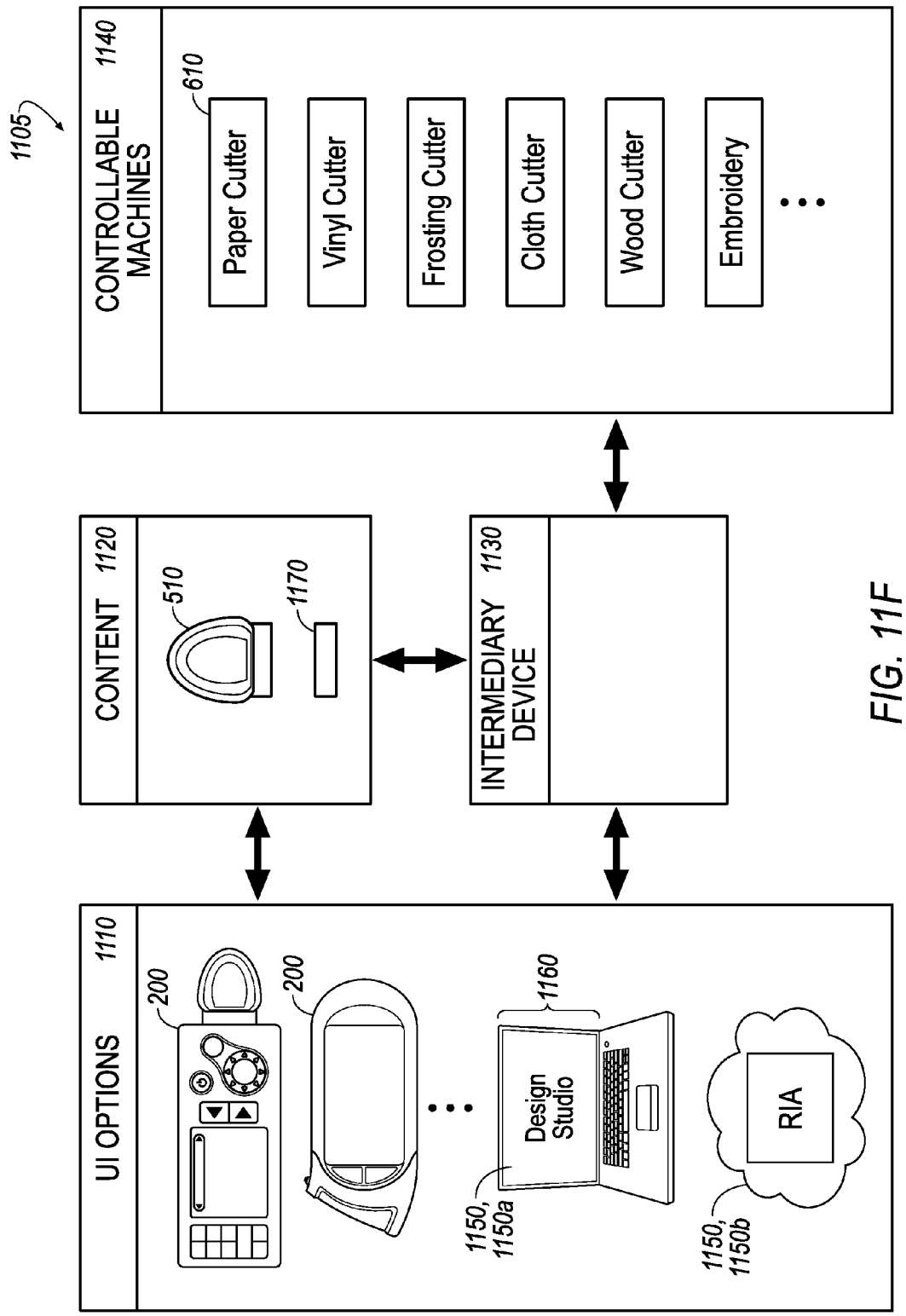
FIG. 11F is a schematic view of an interoperable system having one or more user interfaces, one or more content devices, an intermediary device, and one or more controllable machines.

Referring to FIG. 11F, in some implementations, an interoperable system 1105 includes one or more user interfaces 1110, one or more content devices 1120, an intermediary device 1130, and one or more controllable machines 1140. In some examples, the user interfaces 1110 include the controller device 200 (snap-in or otherwise connectable (e.g., wireless) to machines), portable devices (e.g., hand-held personal digital assistant (PDA), USB dongle, memory storage device, etc.) or executable user interfaces 1150 (e.g., rich internet applications (RIA) 1150*a* or software design studios 1150*b*) executable on a processor, such as a computer 1160. The computer 1160 and/or RIA 1150*a* may be in communication with the Internet or a local network for obtaining content and/or executable files (e.g., for creating designs with content). The user interfaces 1110 are modular components of the interoperable system 1105, as are the content devices 1120, intermediary device 1130, and controllable machines 1140. The content device 1120 may be a cartridge 510 or other memory device, such as a USB dongle 1170 that provides content (such as artwork, cutting patterns, etc.) which is received by one of the user interface devices, such as the controller device 200 or the personal computer 1160, or the intermediary device 1130. The intermediary device 1130 communicates with one or more of the controllable machines 1140, such as the electronic cutting machine 610 and/or other cutting machines tailored to cutting specific types of media (e.g., paper, vinyl, frosting, cloth, wood, embroidery, etc.). In some examples, the intermediary device 1130 is one of the controllable machines, such as the electronic cutting machine 610.

Figure 12:
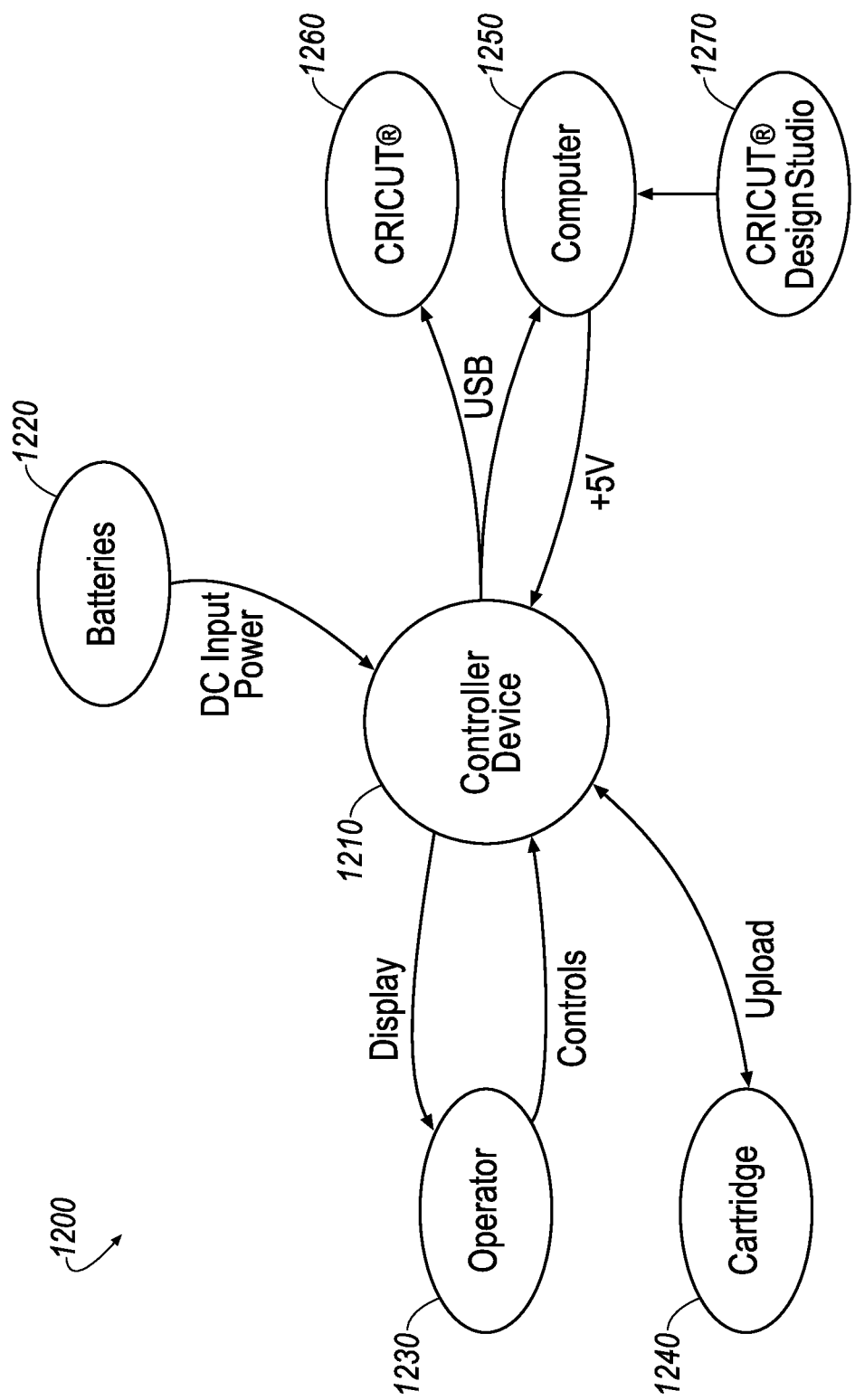
FIG. 12 is a schematic view of a system including a controller device.

FIG. 12 is an example of a system 1200 including a controller device 1210 powered by at least one battery 1220. The user/operator 1230 may interface with the controller device 1210 by way of a display and controls, which may be at least partially integrated into a touch-screen device and/or using user input buttons. A memory device such as a cartridge 1240 may be used to provide and/or validate ownership of the various artworks for use with the controller device 1210. In an example, the cartridge may be embodied as a proprietary interface cartridge, such as is used with the CRICUT® electronic cutting machine. However, the memory device/cartridge 1240 may be embodied as various memory storage types that may be connected to the controller device 1210 through an adapter. For example, the controller device 1210 may include a single connector for use with various types of memory devices where an adapter is configured to connect with the controller device 1210 and the desired type of memory device.

The controller device 1210 may also be connected with a computer 1250 and a peripheral device 1260 (shown here as a CRICUT® electronic cutting machine). The general connection of controller device 1210 and peripherals may be accomplished using commonly available interfaces such as USB, FireWire, serial (e.g., RS-232), etc. The controller device 1210 may also be networked using wired and/or wireless technology to communicate with a variety of peripheral devices (e.g., printers, cutters, etc.) and/or computing devices (e.g. personal computers, laptops, smart-phones, etc.).

The controller device 1210 may be connected with other software that may run on computer 1250. In this example, the controller device 1210 may be connected to a design software application 1270 executed on a processor (e.g., of a computing device), such as the CRICUT DESIGNSTUDIO® software, that may allow sharing of content, for example, designs and artwork. Moreover, the user may transfer designs from the controller device 1210 to design software application 1270 and vice versa.

In general, the controller device 1210 may be used to connect with various peripherals, other computing devices, networks, etc. to allow the user to select content (e.g., artwork), create designs (e.g., selecting, arranging, modifying content), as well as realize the designs by printing, cutting, etc.

Figure 13:
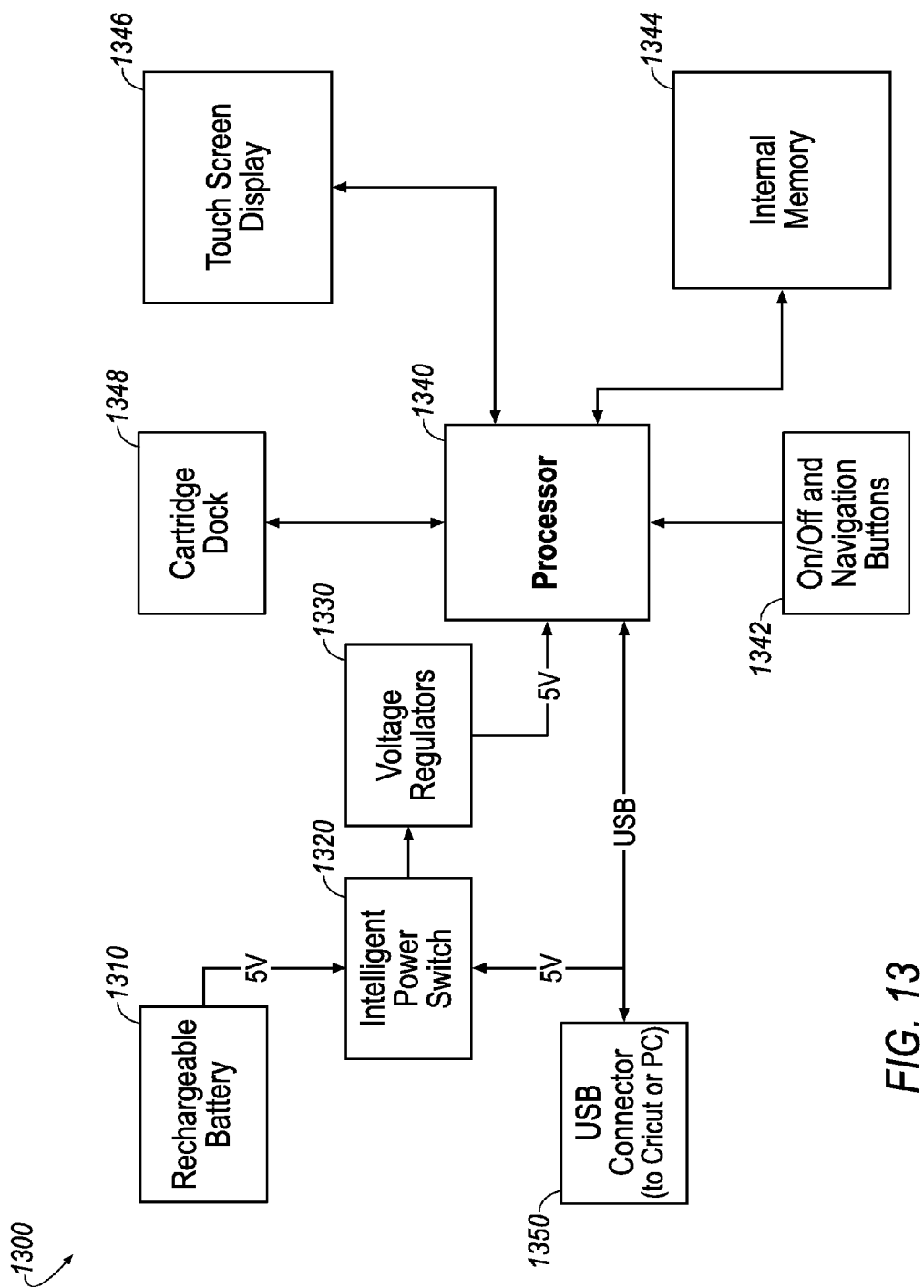
FIG. 13 is a schematic view of an exemplary system configuration for a controller device.

FIG. 13 is an example of a block diagram 1300 of a controller device 100, 200, 1210. A rechargeable battery 1310 may power an intelligent power switch 1320 to provide power to the controller device 100, 200, 1210. Voltage regulators 1330 may provide the necessary power to a processor 1340 and to the other systems. The processor 1340 may be used to centrally manage the controller device 100, 200, 1210 and interfaces with the On/Off buttons and navigation buttons 1342, internal memory 1344, touch screen display 1346, cartridge dock 1348, external connectors such as a USB connector 1350.

The system configuration shown is an exemplary implementation of a controller device 100, 200, 1210. Alternative configurations are also understood to be available and the general arrangement of the components is not limiting. Moreover, certain components may be separated from the controller device 100, 200, 1210 or integrated with other components. In an example, the internal memory 1344 and USB system 1350 may be integrated with the processor 1340.

Figure 14:
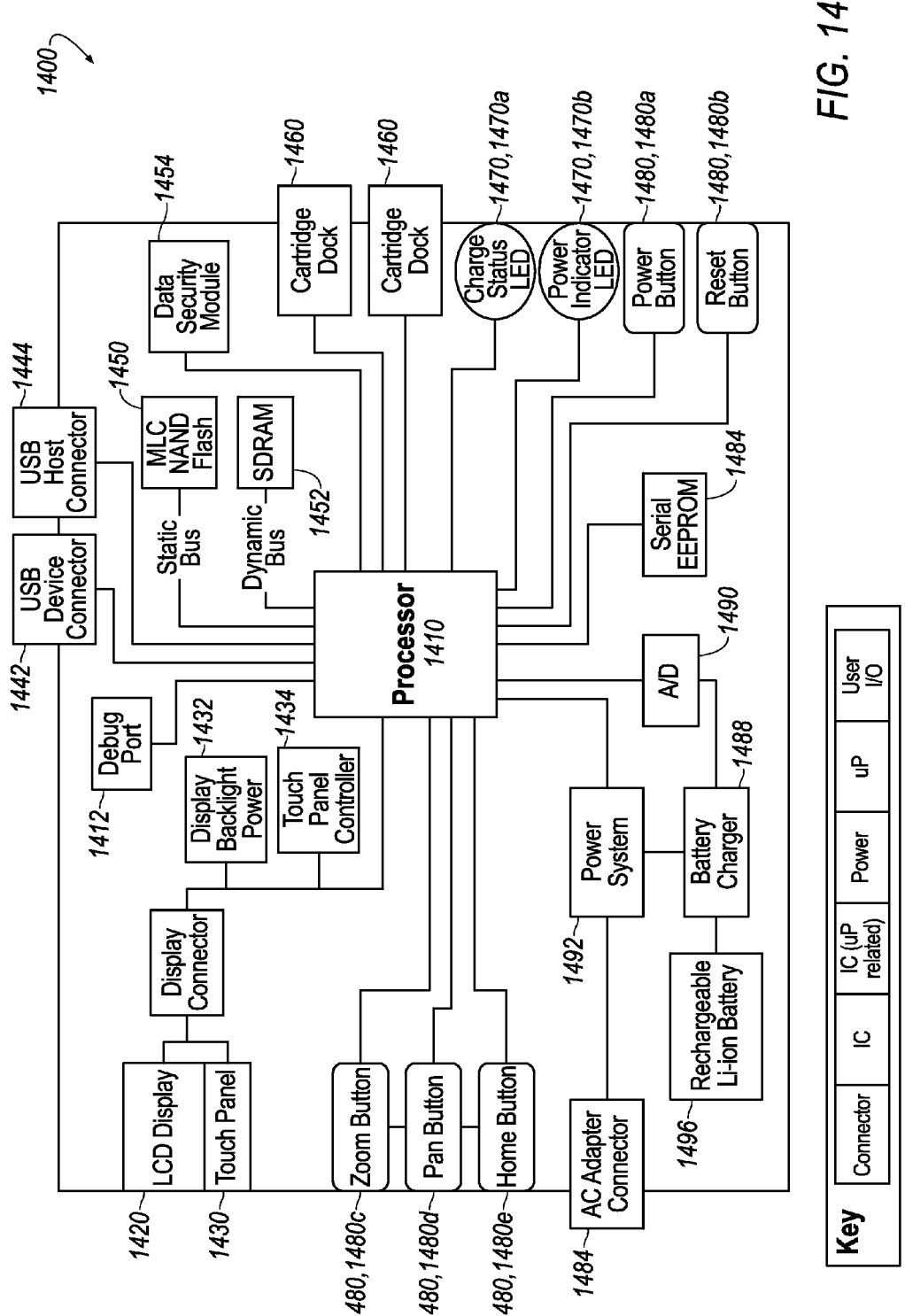
FIG. 14 is a schematic view of another exemplary system configuration for a controller device.

FIG. 14 is a second example of a block diagram 1400 of a controller device 100, 200, 1210. A processor 1410 may be connected to an LCD display 1420 for user output and a touch panel display 1422 for user input. The touch panel display 1422 may also include a display backlight 1432 and touch panel controller 1434 for determining the contrast, brightness, color, etc., of the LCD display 1420. The touch panel controller 1434 may also determine the position of a stylus or the user's finger on the LCD display 1420. This can be used for selection, dragging, and other operations as configured by software running on the processor 1310. The processor 1410 may also include a debug port 1412 (e.g., serial, JTAG, etc.).

The controller device 100, 200, 1210 may also include a USB device interface 1442 and a USB host interface 1444 in communication with the processor 1410. These interfaces 1442, 1444 may be used to connect with a personal computer and various peripherals.

The processor 1410 may also include a Flash memory 1450 for persistent storage and a SDRAM memory 1452 for dynamic storage. The Flash memory 1450 may contain operating system software and application software. These may include a boot loader, operating system kernel, and device drivers to interface with hardware of the controller device 100, 200, 1210. The SDRAM memory 1452 may be used for dynamic memory purposes when running programs such as storing dynamic data for use of the operating system and/or applications.

The controller device 100, 200, 1210 may also include a data security module 1454 that may be used for storage of encryption keys and production data such as serial numbers. The data security module 1454 may be configured so that memory addresses may be written to only once to avoid re-writing of security information. Moreover, the data security module 1454 may need to be accessed using an encryption key and may become unusable if the incorrect security key is sent to the data security module 1454 more than, for example, three consecutive times. The security information stored in the data security module 1454 may be used, for example, to validate the user's ownership of content. Moreover, the content may be stored on the controller device's Flash memory 1450 in an encrypted form where the encryption key is stored in the data security module 1454.

The controller device 100, 200, 1210 may include one or more cartridge docking locations 1460 allowing the user to plug memory devices containing content into the controller device 100, 200, 1210. The cartridge docking locations 1460 may include specialized and/or proprietary connectors or they may be standard connectors (e.g., SD card slots). The controller device 100, 200, 1210 may also include LED status indicators 1470 such as a charge status indicator 1470*a* used for indicating to the user that a connected battery 1496 is fully charged, or has a low charge. A power indicator 1470*b* may show the user that the controller device 100, 200, 1210 is powered up and ready for use.

User buttons 1480 may include a power button 1480*a* (e.g., to turn the controller device on, off, or sleep mode), and a reset button 1480*b* may be used to reset the controller device 100, 200, 1210. Other user buttons 1480 may include a zoom button 1480*c*, pan button 1480*d*, and home button 1480*e*. The zoom button 2480*c* may be used to zoom in the LCD display 1420 and touch panel display 1422 to customize the view. The pan button 1480*d* may be used to allow the user to pan through the LCD display 1420 and touch panel display 1422. For example, the user may press the pan button 2480*d* and then drag their finger or a stylus across the touch panel display 1422 to pan. The home button 1480*e* may be used to take the user back to the home screen of the controller device 100, 200, 1210.

A serial EEPROM 1484 may be used to store non-cryptographic information for use by the software. An Analog to Digital converter 1490 (ADC or A/D) may be used to measure physical hardware attributes such as voltage and/or current related to electrical components. The ADC 1490 may be used, for example, to check the charge status of the battery 1496. A power system 1492 may take outside current through an AC adapter 1494, which may be configured to use AC or DC input. The power system 1492 may control the battery charging and discharging. The battery 1496 may be configured as a lithium ion battery (Li-ion) and may have a separate battery charging circuit 1498. The power system 1492 may also be configured to use external power, when available, rather than the battery 1496 to power the controller device 100, 200, 1210.

Figure 15:
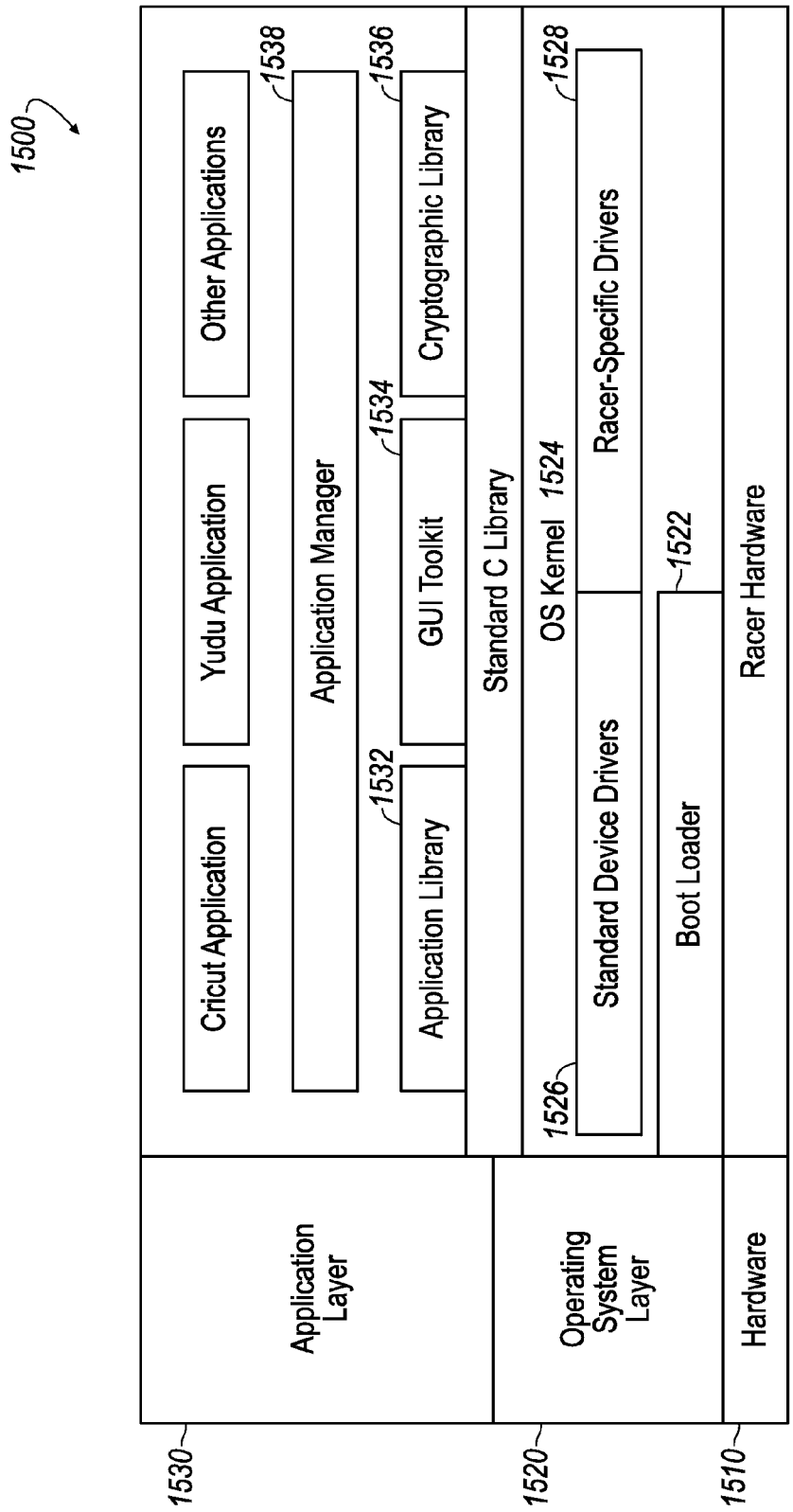
FIG. 15 is a schematic view of a software system for use with the controller device.
Figure 24:
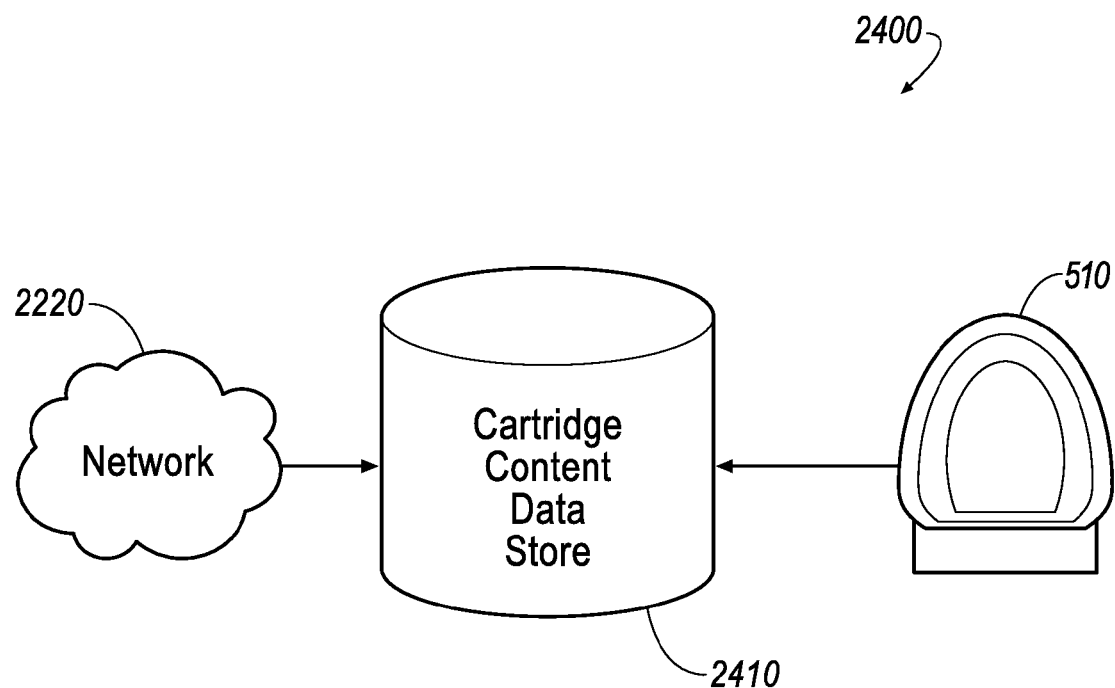
FIG. 24 is a schematic view of a cartridge data store.

FIG. 15 is an example of a software system 1500 for use with the controller device 100, 200, 1210. The software system 1500 may include generally, an operating system layer 1520 and an application layer 1530 that interact with hardware 1510 (e.g., as generally shown in FIG. 24).

The operating system layer 1520 may include a boot loader 1522 and an operating system kernel 1524 for generally allowing access to the hardware 1510 and to run software. The operating system kernel 1524 may include standard device drivers 1526 and controller device specific drivers 1528 for programmatically interfacing with the software and hardware systems.

The application layer 1530 may include an application library 1532, a GUI toolkit 1534 (e.g., for using the LCD touch screen), and a cryptographic library 1536 (e.g., for security purposes). The application layer 1530 may also include an application manager 1538 that allows the user to select which application to run in the foreground. Applications may include an application for designing content layouts, such as the CRICUT® application, and interfacing with an electronic cutting machine 610 (e.g., the CRICUT® electronic cutting machine) for cutting content. Another application may include a screen printing application (e.g., YUDU™ by Provo Craft & Novelty of Spanish Fork, Utah) that enables the user to design content layouts for screen printing. Other applications may include an image viewer/printer application where a user may download images to the controller device and may then crop or otherwise modify the images for printing. Other applications may be used for design and control of various peripheral devices such as inkjet printers, screen printers, automatic rhinestone setters, sewing machines, direct to garment printers, etc.

Figure 16:
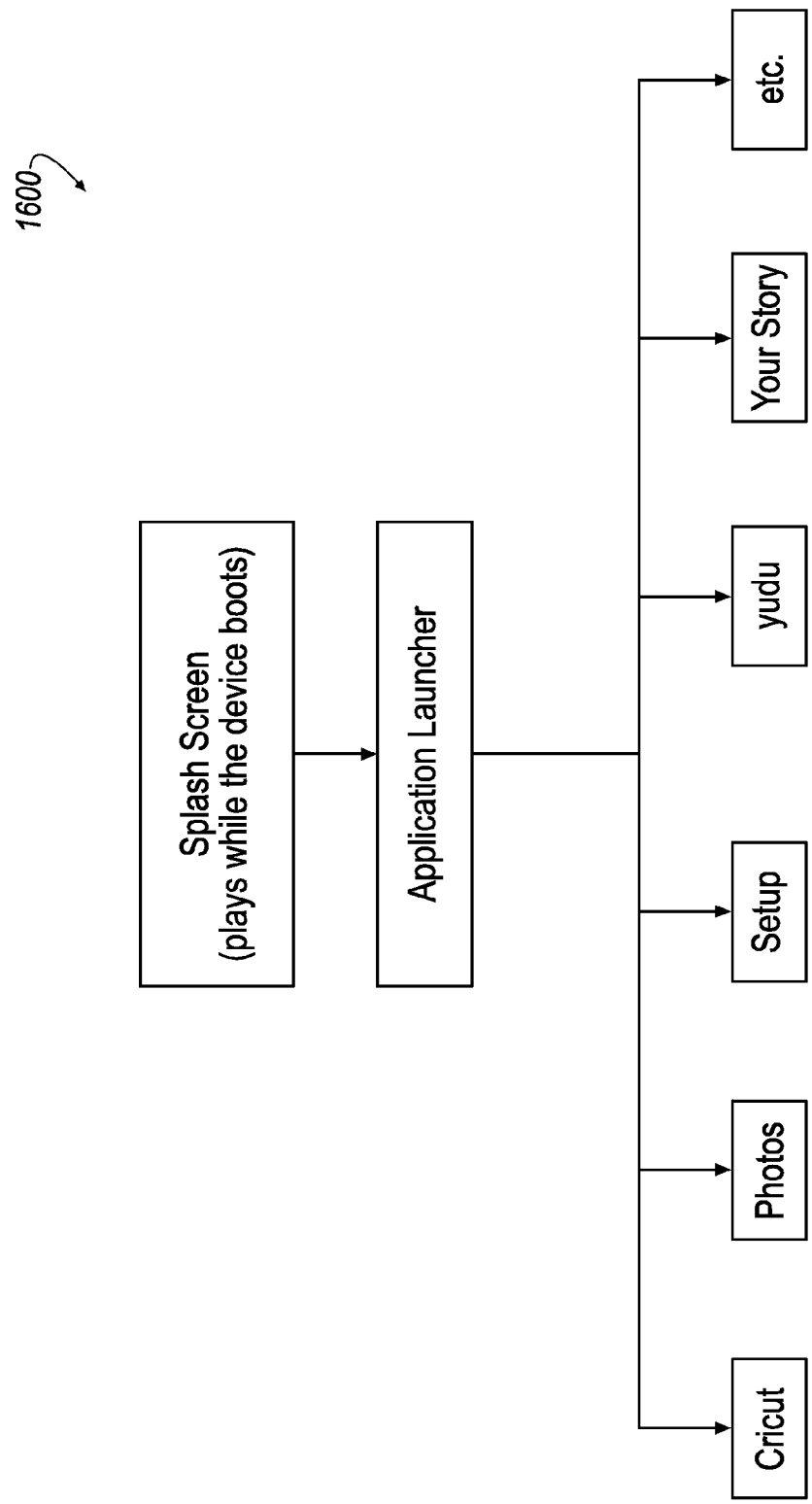
FIG. 16 is a schematic view of a user interface application selection screen.

FIG. 16 provides a schematic view of an exemplary user interface application selection screen 1600. The user may make a selection to use a design software application, such as CRICUT® designer, an image viewer, or adjust the settings for the controller device 100, 200, 1210. The design software application may be used to create content layouts and/or to realize the layouts by controlling an electronic cutting machine 610 to cut out content. The image viewer may allow for downloading images (e.g., photos) to the controller device 100, 200, 1210, modifying them (e.g., cropping, framing, etc.) and printing the images to a printer peripheral. The settings allow the user to customize the controller device 100, 200, 1210 to their liking, with features such as LCD brightness, and customization of each of the applications.

Figure 17:
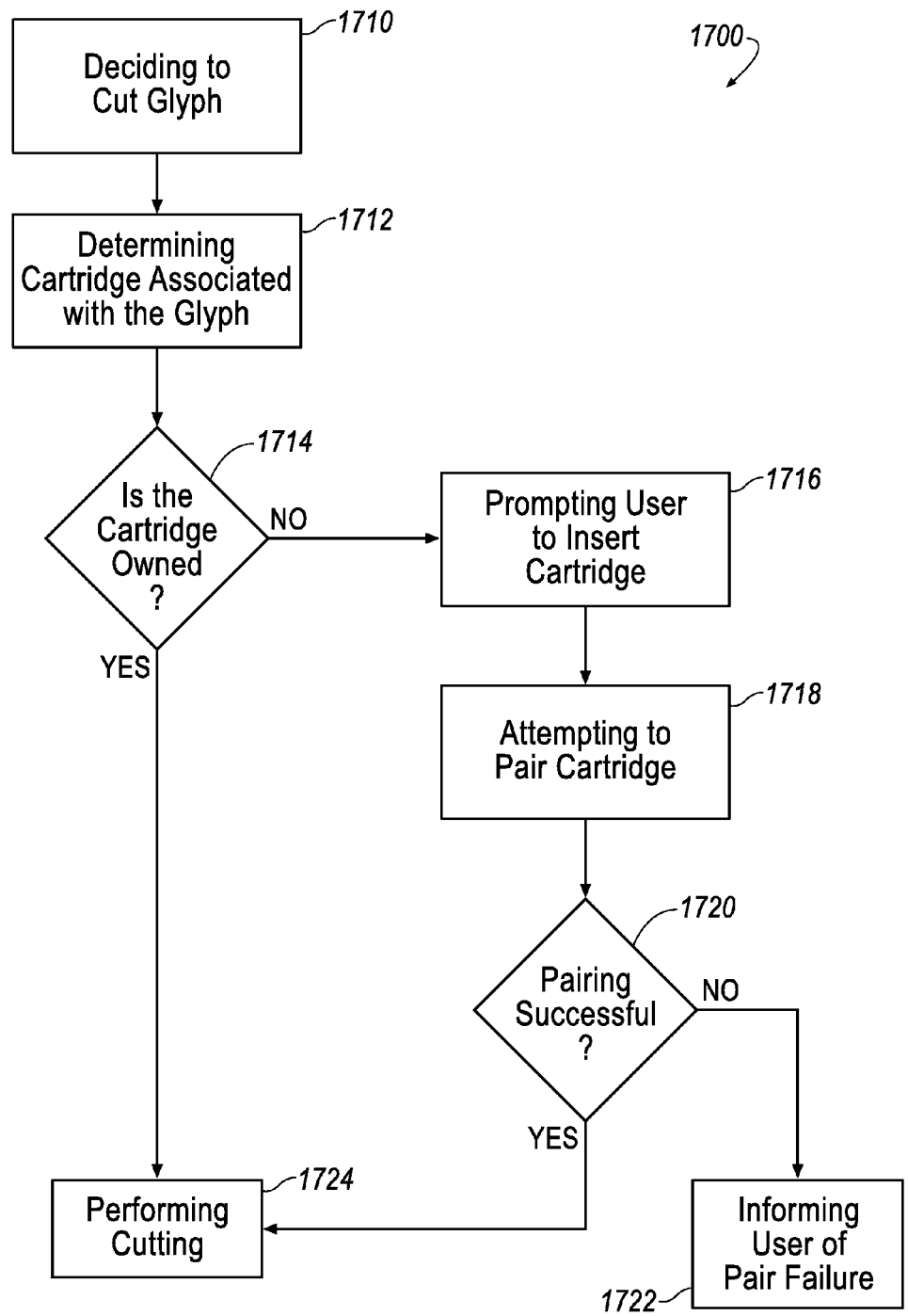
FIG. 17 is a schematic view of an exemplary arrangement of operations of a method for cartridge ownership verification.

FIG. 17 provides an exemplary arrangement 1700 of operations of a method for cartridge ownership verification. The method for cartridge ownership verification may be executable on a processor 240 of the controller device 200 (FIG. 11A), a computer 710 in communication with the controller device 200 (FIG. 9), and/or a peripheral, such as the electronic cutting machine 610 in communication with the controller device 200 (FIG. 9). To determine ownership of a cartridge 510 (see FIG. 5) and the digital content therein, the controller device 200 may query the cartridge 510 to determine whether the cartridge 510 is owned by another, and if it is not, the controller device 200 may pair the cartridge 510 to the controller device 200 to assert ownership. In some examples, once the cartridge 510 is paired to a particular controller device 200, the cartridge 510 digital content may not be paired to another controller device 200. However, the cartridge 510 and the digital content therein may still be used when directly connected to an electronic cutting machine 610 (see FIG. 6).

Operations of the cartridge ownership verification method include deciding 1710 to cut a glyph on an electronic cutting machine 610. When this happens, the controller device 200 may decide whether the user owns the particular digital content associated with the glyph, which may be part of a set of glyphs stored in a cartridge 510 (or a memory device in communication with the controller device 200). Operations further include determining 1712 which cartridge(s) 510 is associated with the glyph, which may include identifying each cartridge 510 associated with the content of the design to be cut and obtaining a cartridge identifier (e.g., serial number) for each identified cartridge 510. This may be determined using metadata for the glyph. The glyph metadata may be associated directly with each glyph of the a design, accessed from the memory 250 of the controller device 200, and/or accessed from an external source in communication with the controller device 200. For example, when the user places a glyph on a digital cutting mat, the identification for the glyph may include which cartridge(s) 510 (and corresponding cartridge identifier(s)) the glyph is associated with.

Operations of the cartridge ownership verification method include determining 1714 whether the identified cartridge 510 is owned by the user. This may be performed by searching a list of owned cartridges 510. The list of owned cartridges 510 may be stored in memory 250 of the controller device 200. If the cartridge 510 is owned by the user, operations of the cartridge ownership verification method include performing 1724 or allowing execution of a cutting operation, for example, on an electronic cutting machine 610 in communication with the controller device 200. If the cartridge 510 or digital content of the glyph is not owned by the user, operations of the cartridge ownership verification method may include prompting 1716 the user to insert the appropriate cartridge 510 into the controller device 200 or offering the user to purchase of a usage right of each identified cartridge 510 having a cartridge identifier absent from the list of owned cartridges 510, which may be stored in the memory 250 of the controller device 200. Once usage rights have been purchased, operations include allowing execution of the cutting operation on the electronic cutting machine 610.

Prompting 1716 the user to insert the cartridge into the controller device 200 may be done with a direct connection of the cartridge 510 to the controller device 200 (see FIG. 5) or it may be done using an adapter (see FIG. 3B). Alternatively, the connection may be done remotely by connecting the cartridge 510 to the electronic cutting machine 610 and then connecting the controller device 200 to the same electronic cutting machine 610, creating a communication path without a direct connection. In another alternative scenario, the user may download the digital content, for example, using the Internet, and transferring the digital content to the controller device 200.

Operations of the cartridge ownership verification method further include pairing 1718 the connected cartridge 510 with the controller device 200. The pairing 1718 may also be referenced with respect to FIG. 19. In attempting to pair the controller device 200 with the cartridge 510, the controller device 200 checks whether the cartridge 510 is already paired with a controller device 200. This may be done by reading a memory location 1914 or locations in the memory 514, 1900 of the cartridge 510 for a serial number associated with a controller device 200. If the memory location 1914 does not contain a serial number for a controller device 200 then it is deemed to be unpaired. In this case, the controller device 200 writes its serial number to the assigned memory location 1914 in the memory 1900 the cartridge 510 to assert ownership and pairing of the controller device 200 with the cartridge 510. This allows the specific controller device 200 that has written its serial number to have full access and control of the digital content with the paired cartridge content while preventing other controller devices 200 from using the content from the paired cartridge 510. In this way, management of the digital content is controlled.

Operations of the cartridge ownership verification method further include determining 1720 whether pairing of the controller device 200 with the cartridge 510 was successful or not. The pairing was successful when the cartridge 510 was not previously paired and the writing of the controller device's serial number to the cartridge 510 was successful. If pairing is successful, operations of the cartridge ownership verification method include performing 1724 a cutting operation, for example, on an electronic cutting machine 610 in communication with the controller device 200. If pairing was not successful, for example where the cartridge 510 was already paired with a different controller device 200 or the writing of the serial number was not successful, operations of the cartridge ownership verification method include informing 1722 the user of the pairing failure.

In informing 1722 the user of the pairing failure, the user may be informed the reason for the pairing failure, which may include that the cartridge 510 was already paired with another controller device 200. Moreover, additional information may be provided to the user related to the failure. In some examples, where the pairing of the controller device 200 with the cartridge 510 also includes writing of metadata about the pairing to the cartridge 510, the owner's name may also be included. This may be helpful to determine which controller device 200 has been paired with the cartridge 510, and who the owner is of that controller device 200. For example, if the user attempts to pair a cartridge 510 already paired with a controller device 200 owned by "Betty", the error message may include such metadata pulled from the paired cartridge 510 to explain the pairing failure as "Pairing failed. The cartridge is already paired to Betty's controller device".

Figure 18:
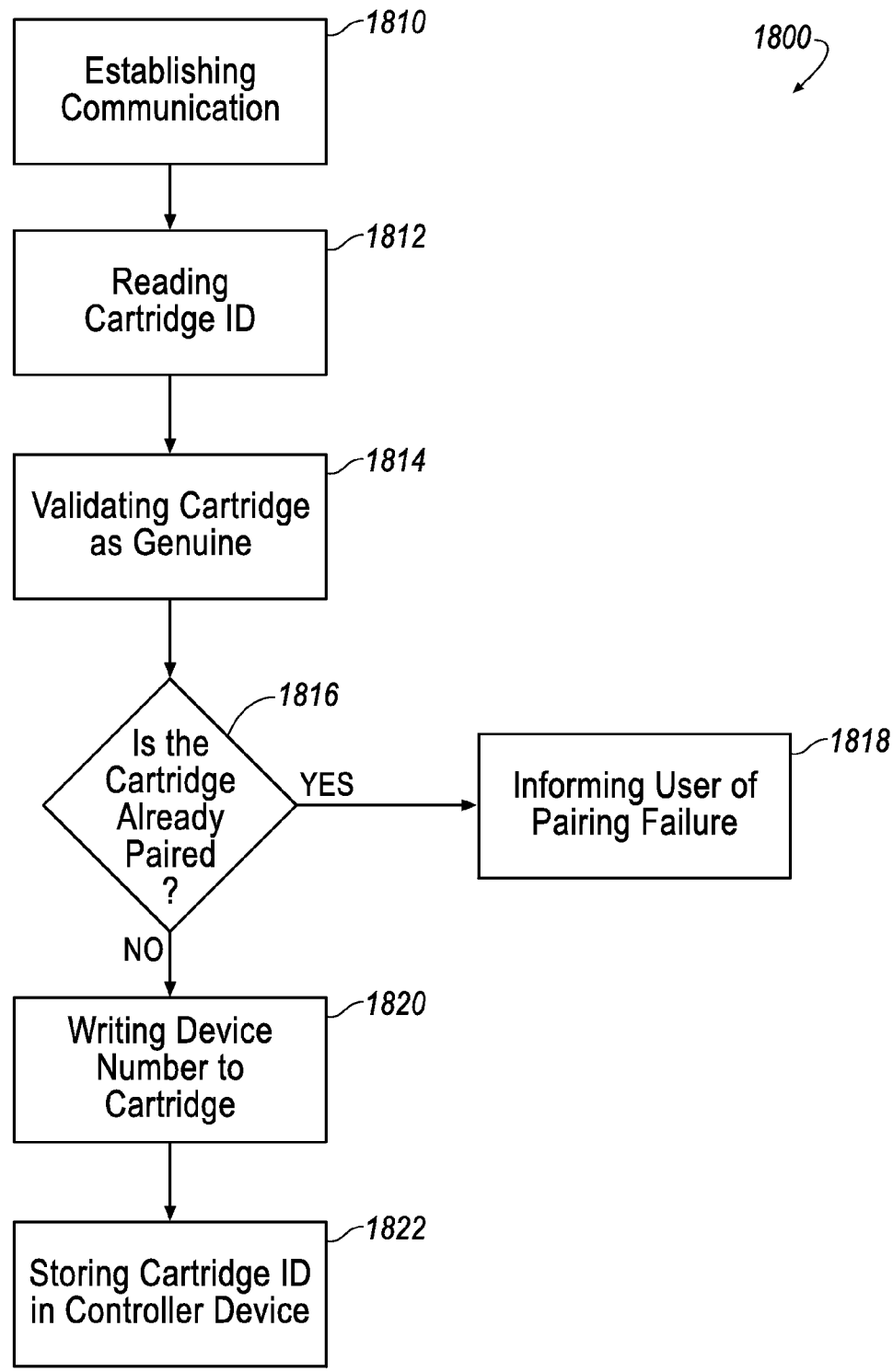
FIG. 18 is a schematic view of an exemplary arrangement of operations of a method for pairing a cartridge with a controller device.

FIG. 18 provides an exemplary arrangement 1800 of operations of a method for pairing a cartridge 510 with a controller device 200. When performing a pairing operation, the controller device 200 may not only determine whether the cartridge 510 is already paired with another device, but the controller device 200 may also validate the authenticity of the cartridge 510.

Operations of the method for pairing include establishing 1810 communication between the controller device 200 and the cartridge 510. In some examples, the cartridge 510 is electrically attached to the controller device 200 allowing communication therebetween. In other examples, the controller device 200 establishes a wireless connection with the cartridge 510 for communication therebetween. Operations include reading 1812 a cartridge identifier from the cartridge 510. In some examples, the controller device 200 reads a serial number, model number, and/or unique identifier for the cartridge 510 and its digital content. The cartridge identifier may serve as a unique identification of the cartridge 510 and may also include version information, manufacture date, and data structure types.

Operations of the method for pairing further include validating 1814 the cartridge 510 as genuine. Validation may be executed on the controller device 200 and can include a variety of techniques, including content verification and/or an encrypted verification method. Content verification is discussed below with respect to FIG. 20 and may include reading digital content from the cartridge 510 and comparing it with known content stored on the controller device 200. Alternatively, the cartridge 510 may contain encrypted data that the controller device 200 may read and verify the authenticity through a public/private key infrastructure.

Operations of the method for pairing include determining whether the cartridge 510 is already paired (e.g., with another controller device 200). The controller device 200 may determine the pairing status of the cartridge 510 by reading a memory location of the cartridge 510 for pairing information. If the cartridge 510 is already paired, operations of the method for pairing include informing 1818 of a pairing failure. For example, the controller device 200 may provide a message to the user informing them that the cartridge 510 cannot be paired with their controller device 200 because the cartridge 510 is already paired with another controller device 200. If the cartridge is not already paired, operations of the method for pairing include writing 1820 a serial number of the controller device 200 to memory 1900 the cartridge 510 (FIG. 19) to pair the controller device 200 to the cartridge 510. The serial number of the controller device 200 may be written to an assigned memory location in the cartridge 510, such as a controller device serial number memory portion 1914 (FIG. 19) so that later checks for pairing will read from the known location. The controller device serial number memory portion 1914 can be configured as write-once and read-many, so as to allow only one pairing operation. In addition to writing the controller device serial number the cartridge 510, additional metadata such as the time and date of the pairing may be written to memory of the cartridge 510 as well. Other information such as the name of the user and/or information about the controller device 200 may be written to the cartridge 510 to provide more meaningful error messages and to determine cartridge ownership if the cartridge 510 is queried.

Operations of the method for pairing further include storing 1822 the cartridge identifier in memory of the controller device 200 (e.g., in a licensing file). This cartridge identifier may then be used to later determine ownership of the cartridge 510 by the controller device 200 without requiring the cartridge 510 to be present. The controller device 200 may store information indicating the ownership of many cartridges 510 and the digital content stored therein. In addition to the cartridge identifier, the controller device 200 may also store the actual digital content from the cartridge 510. This digital content may be read-out from the cartridge 510 or it may be already stored on the controller device 200 awaiting activation by pairing of the cartridge 510. Alternatively, the user may download the digital content, for example, from the Internet via a rich internet application.

Figure 19:
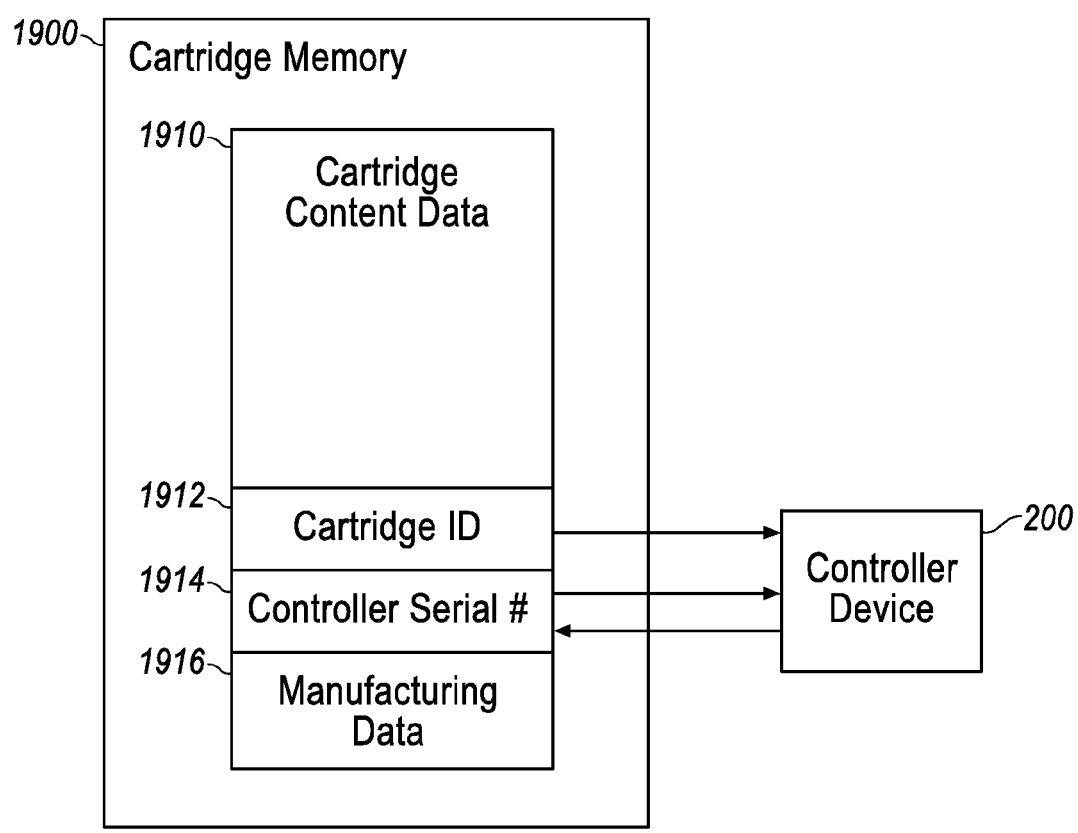
FIG. 19 is a schematic view of a data cartridge interfacing with a controller device.

FIG. 19 provides a schematic view of cartridge memory 1900 interfacing with a controller device 200. The cartridge memory 1900 may be embodied, for example, as FLASH memory, EEPROM memory, ROM memory, or the like. The cartridge memory 1900 may contain a cartridge content memory portion 1910 that may include the digital content and metadata. This may contain, for example, the cutting paths, images, overlay information, keypad mapping information etc.

The cartridge memory 1900 may also contain a cartridge identifier memory portion 1912, for example, at a predetermined memory location. The cartridge identifier portion 1912 may be programmed during manufacture of the cartridge 510, for example, at a factory. The cartridge identifier memory portion 1912 may include a unique identifier for the cartridge 510 including a serial number. When performing a pairing operation, the controller device 200 may read the cartridge identifier memory portion 1912 to determine what cartridge 510 and digital content will be owned by the user.

The cartridge memory 1900 may also contain a controller serial number memory portion 1914, for example, at a predetermined memory location. The controller serial number memory portion 1914 contains the serial number of a controller device 200 after pairing with the cartridge 510. If no controller device 200 has been paired with the cartridge 150 then the controller serial number memory portion 1914 may be blank (e.g., all zeroes), or contain predetermined information (e.g., a code) indicating that the cartridge 510 has not been paired. The controller serial number memory portion 1914 is written to by a controller device 200 during a pairing operation so that if other controller devices 200 attempt pairing they will know that the cartridge 510 has already been paired.

The cartridge memory 1900 may also contain a manufacturing data memory portion 1916, for storing a date of manufacture, and other metadata. This may include the memory addresses of the data structures in the cartridge memory 1910, and other information useful to an electronic cutting machine 610 and/or a controller device 200.

Figure 20:
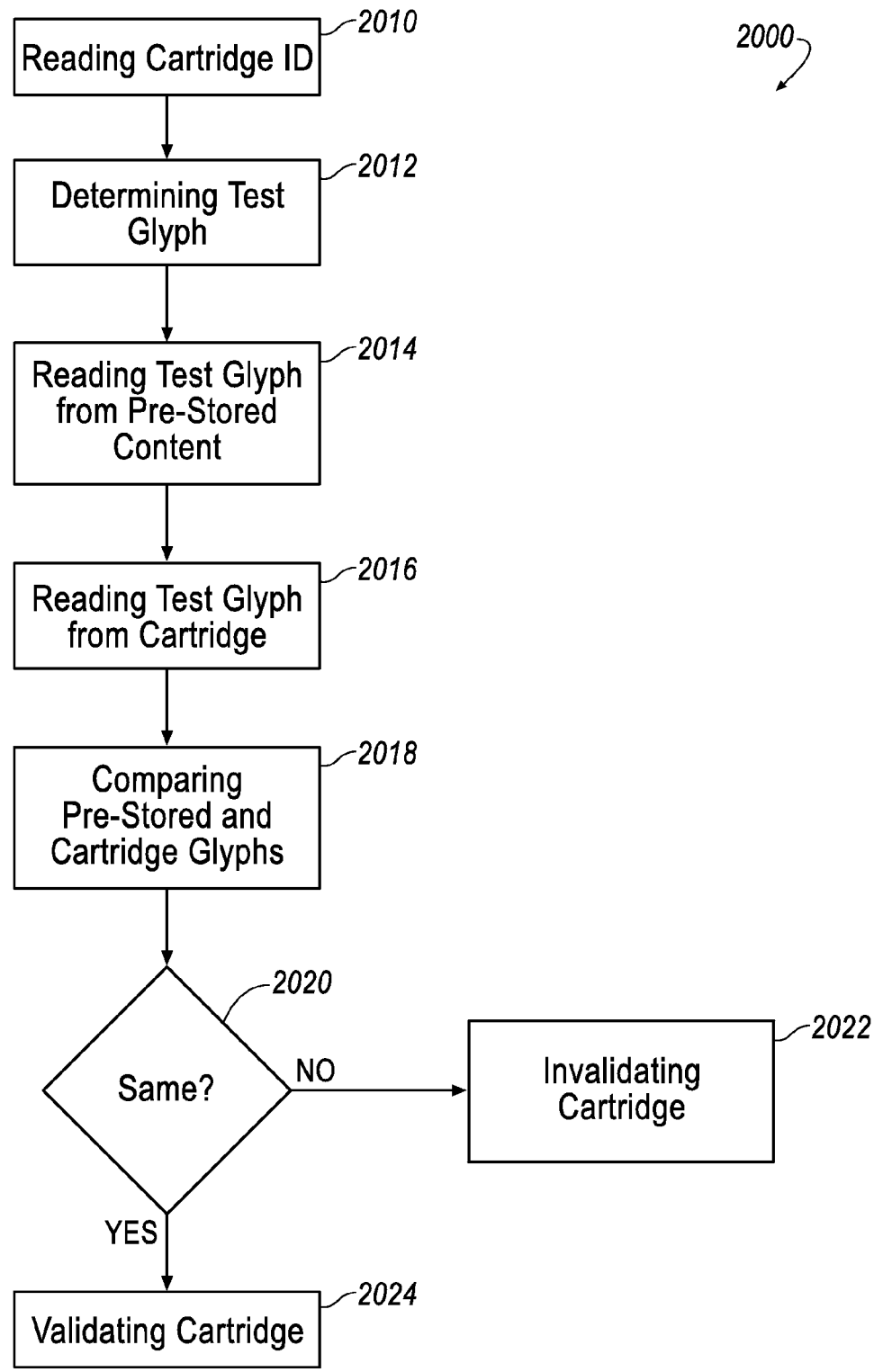
FIG. 20 is a schematic view of an exemplary arrangement of operations of a method for validating a cartridge as genuine.

Various methods may be employed to validate the cartridge 510 as a genuine cartridge including comparing the cartridge contents with a known example of the cartridge contents. FIG. 20 provides an exemplary arrangement 2000 of operations of a method for validating a cartridge 510 as genuine. The method for validating a cartridge 510 illustrates how to compare known glyphs with the cartridge glyphs for a match to determine whether the cartridge 510 is genuine. The cartridge validation may be used, for example, during the controller device/cartridge pairing methods to determine whether the cartridge 510 is genuine and should be paired.

Operations of the method for validating a cartridge 510 include reading 2010 a cartridge identification of the cartridge 510. In some implementations, the controller device 200 reads the cartridge identification, which allows the controller device 200 to correlate the cartridge's digital content with known digital content. The operations also include determining 2012 a glyph to test. The controller device 200 may hold a copy of the cartridge's digital content internally, or a subset of the cartridge's digital content. The controller device 200 may then select a glyph to test from internal memory storage 250, 1344 or a trusted external source in communication with the controller device 200 (e.g., memory device or rich internet application) that is also included in the cartridge 510. The operations include reading 2014 the selected glyph from the controller device's pre-stored content or trusted external source, as a master glyph and reading 2016 the selected glyph from the cartridge 510, as a test glyph. Operations of the method for validating a cartridge 510 further include comparing 2018 at least a portion the master glyph to a corresponding portion of the test glyph for a match. In some examples, the comparing operation 2018 includes comparing one or more Bézier curves of the each glyph. In vector graphics, Bézier curves may be used to model smooth curves that can be scaled indefinitely. If the master glyph matches the test glyph as the same, operations include validating 2024 the cartridge as genuine. The user may also be informed that the cartridge 510 is a genuine cartridge. Once validated, the controller device 200 can write a controller device serial number to the controller device serial number memory portion 1914 of the cartridge memory 1900. The If the master glyph does not match the test glyph, operations include invalidating 2022 the cartridge as not genuine, for example, because the master glyph did not match the test glyph. The user may then be informed that the cartridge 510 is not genuine and that pairing of the cartridge 510 to the controller device 200 has failed.

Once paired with the cartridge 510, the controller device 200 may receive all or a portion of the content (e.g., content libraries) stored on the cartridge 510 (e.g., in the cartridge content data memory portion 1910). The controller device 200 may execute a script that reads the content from the cartridge content data memory portion 1910 of the cartridge memory 1900 and stores the read content in memory 250 of the controller 200. The script may update existing store content on the controller device 200 and/or access an external source (e.g., the Internet) for updated or additional content associated with the cartridge 510. For example, the cartridge 510 may only hold a core set of content libraries; however, upon pairing or activation of the cartridge 510 with the controller device 200, the controller device 200 may access or receive additional content associated with the cartridge 510 (e.g., bonus content) or ancillary content (e.g., content from a related cartridge 510). This allows for receipt of promotional content and/or content updates to the controller device 200. The controller device 200 may access a network or the Internet through a WiFi dongle connected to the controller device 200. In some implementations, the WiFi dongle is integrated or associated with the cartridge 510.

In some implementations, the controller device 200 allows a user to access and use content associated with a paired and validated cartridge 510. For example, bonus content associated with the cartridge 510 and/or content from another cartridge 510 associated with the paired and validated cartridge 510 may be made accessible and usable by the user on the controller device 200. For example, a user buys cartridge A and pairs cartridge A with his/her controller device 200, which subsequently validates cartridge A as valid. Cartridge A is associated with bonus content (e.g., which may not have fit on cartridge A), which the user can now access (e.g., via the Internet and/or via another cartridge). Cartridge A is also associated with cartridges B and C for promotional reasons. After pairing and validating cartridge A, the user can access the content of cartridges B and C (e.g., via the Internet and/or via additional cartridges).

Figure 21:
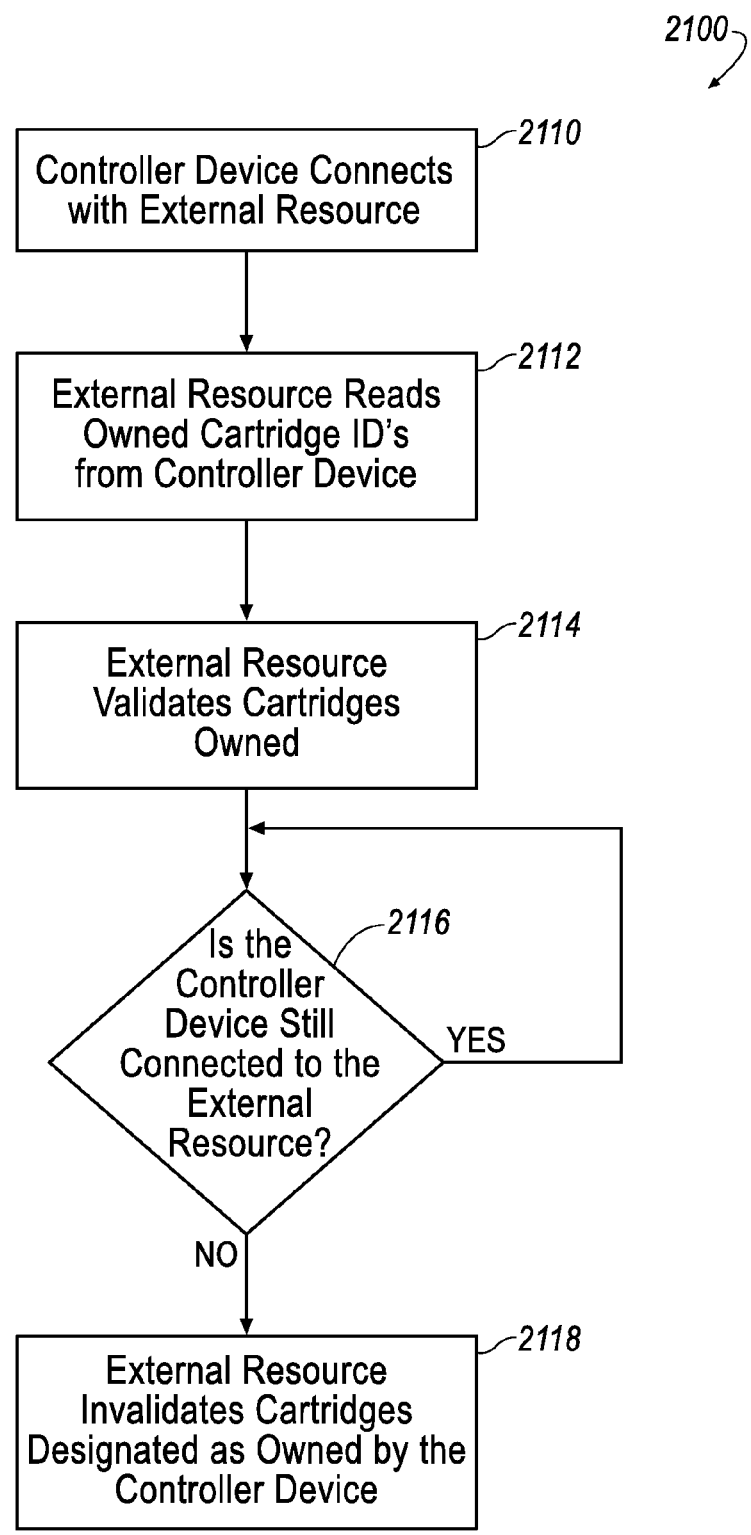
FIG. 21 is a schematic view of a cartridge ownership proxy.

FIG. 21 provides an exemplary arrangement 2100 of operations of a method for cartridge ownership proxy. The controller device 200, through the pairing processes, may serve as a proxy to ownership of the digital content stored on cartridges 510. For example, the user may pair a cartridge 510 to the controller device 200 and then use the controller device 200 to validate the content ownership without having to connect a cartridge 510 (e.g., by electrical or wireless connection) to use the digital content. In this way, the controller device 200 may serve as a digital juke box that stores the user's digital content.

Operations of the method for cartridge ownership proxy include connecting 2110 the controller device 200 with an external resource 1180, such as an executable user interface 1150 (e.g., rich internet applications (RIA) 1150a or software design studios 1150b (e.g., CRICUT DESIGNSTUDIO®)) executable on a processor, such as a computer 1160 (FIG. 11). The design software application 1150b allows the user to create and cut designs using the associated electronic cutting machine 610. The operations include the external resource 1180 reading 2112 a list of cartridge identifiers from the memory 250 of the controller device 200 to determine what digital content is owned by the user. The operations further include the external resource 1180 validating 2114 the cartridges 510 owned by the user. This validation allows the user to execute resource operations, such as cut operations on the electronic cutting machine 610, with the owned content. The validation is not static, however, and if the controller device 200 is removed from the external resource then the previously validated cartridges 510 are no longer available for use via the proxy served by the controller device 200.

In some implementations, the external resource 1180 receives a resource operation for executing a design 2805 on the external resource 1180. The design 2805 includes content associated with at least one cartridge 510. The external resource 1180 identifies each cartridge 510 associated with the content of the design 2805, obtains a cartridge identifier for each identified cartridge 510, searches the memory 250 of the controller device 200 for the cartridge identifier of each identified cartridge 510, and allows execution of the resource operation after each cartridge identifier of each identified cartridge 510 is located in the memory 250 of the controller device 200.

Operations of the method for cartridge ownership proxy include the external resource checking 2116 whether the controller device 200 that validated the digital content is still connected. If the controller device 200 is still connected, control loops back to the operation of checking 2116 the connection and the user may continue to cut using the validated cartridges 510. However, if the controller device 200 is removed, operations include the external resource invalidating 2118 the cartridges 510 owned by the user, but only as it relates to the external resource. That is to say, when the controller device 200 is unplugged from the external resource, the digital content whose ownership was proxied by the controller device 200 is no longer available for use by the external resource. In this way, the user may carry the controller device 200 and use it as a proxy to ownership of the paired cartridges 510 and their associated digital content.

Figure 22:
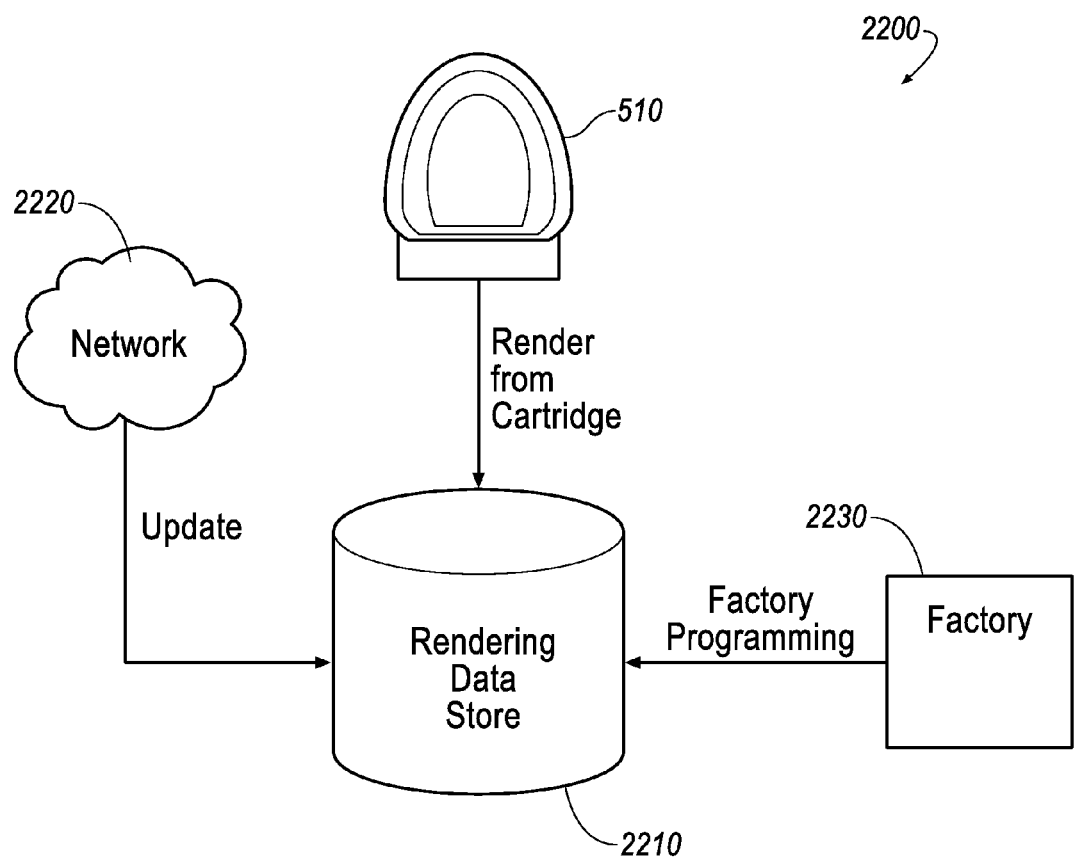
FIG. 22 is a schematic view of a display rendering data store.

FIG. 22 is an example of a display rendering data store system 2200. The display rendering data store system 2200 allows for the rendering of glyphs on the screen 112 (see FIG. 1). In use, the image or group of images shown on screen 112 may be rendered directly from the digital content (e.g., from a cartridge 510), or it may be stored, for example, as an image. The use of rendering from content or a bitmap may be determined by availability and processing time. For example, where the screen 112 is not stored as an image.

In general, the rendering of a virtual overlay for the screen 112 may be accomplished by translating cutting and/or printing instructions from the cartridge 150 into a graphic form, or the graphic form may be pre-stored or cached in the controller device 200. The overlay may comprise a series of glyphs that represent the content. The user may then select each glyph for use and positioning on a mat. The images that are displayed from each glyph may be generated in a number of ways.

In some examples, the renderings may be loaded directly from a cartridge 510 that was attached to the controller device 200 during the pairing process. After being rendered the first time (which takes time to decode the content and render to the screen 112), the keys may be stored in their rendered state so that the next time the images are accessed they will quickly appear on a keypad (e.g., displayed on the screen 112). In additional examples, renderings of each glyph may be delivered to the controller device 200 as part of a library update and stored as an image for quick rendering. Alternatively, some glyph images may be deemed non-descriptive when rendered from the cartridge 510. These non-descriptive glyphs may be replaced with pre-rendered images that will be delivered through a library update. Examples of non-descriptive keys include feature keys (e.g., shift, space, etc.). Shift and feature keys may change the display when activated. For example, when activated, the new keys/glyphs are shown that relate to the feature or shift key. For example, when "shift" is pushed, the keys may change from lower case letters to upper case letters.

Typical image formats may include, for example, bitmaps (e.g., BMP, DIB, PBM) and/or compressed formats that are easily expanded to bitmaps JPEG, TIFF, PNG, and GIF, rather than vector graphics. These types of image formats may be used over vector graphics to avoid the processor cost of rendering the vector graphics to the device. In order to speed up display of the glyphs on the display, the pre-rendered glyphs may be stored in a cache or data store and pulled on demand for display on the screen 112.

As shown in FIG. 22, a rendering data store 2210 may be a non-volatile memory that stores rendered glyphs or complete overlays for use with the screen 112. The software operating in controller 200 may first check the rendering data store 2210 to determine if a glyph or overlay has already been rendered prior to rendering it from cutting instructions (e.g., digital content stored on the cartridge 510 or in the controller device 200). In checking the rendering data store 2210, the process of converting the cutting instructions into a rendered graphic may be eliminated. In so doing, the amount of CPU overhead, and the time prior to displaying the rendered graphic may be reduced.

In general, the rendering data store 2210 may be updated in a variety of ways. In a first example, the digital content from the cartridge 510 may be read and the cutting instructions translated into pen instructions for rendering in a graphical manner suitable for display on the screen 112. This translation and rendering operation may be done on content directly from the cartridge 510 or it may be done using a local copy, which may be pre-loaded onto the controller device 200. Alternatively, the rendering data store 2210 may be updated from a network 2220, such as the Internet. In this way, when new cartridges 510 are released, or if existing overlays are modified, the rendered glyphs and overlays may be updated remotely. In another example, a factory 2230 may pre-load rendered overlays and glyphs into the rendering data store 2210 prior to shipment for existing cartridges 510.

In general, the translation of cutting instructions to a rendered graphic may include virtually tracing the cutting path over a virtual grid. Where the cutting path intersects a pixel the pixel may be marked as "on". In another example, the final rendered graphic may be optimized for display on the screen 112, which may include, for example, anti-aliasing, and re-sampling after scaling operations are performed. For example, where the glyph has a "hover" feature, the size of the glyph may be temporarily enlarged for the purpose of giving the user an enlarged view for more detail. Because the glyph is resized, certain optimized views of each glyph may be stored to provide the highest quality view.

Figure 23:
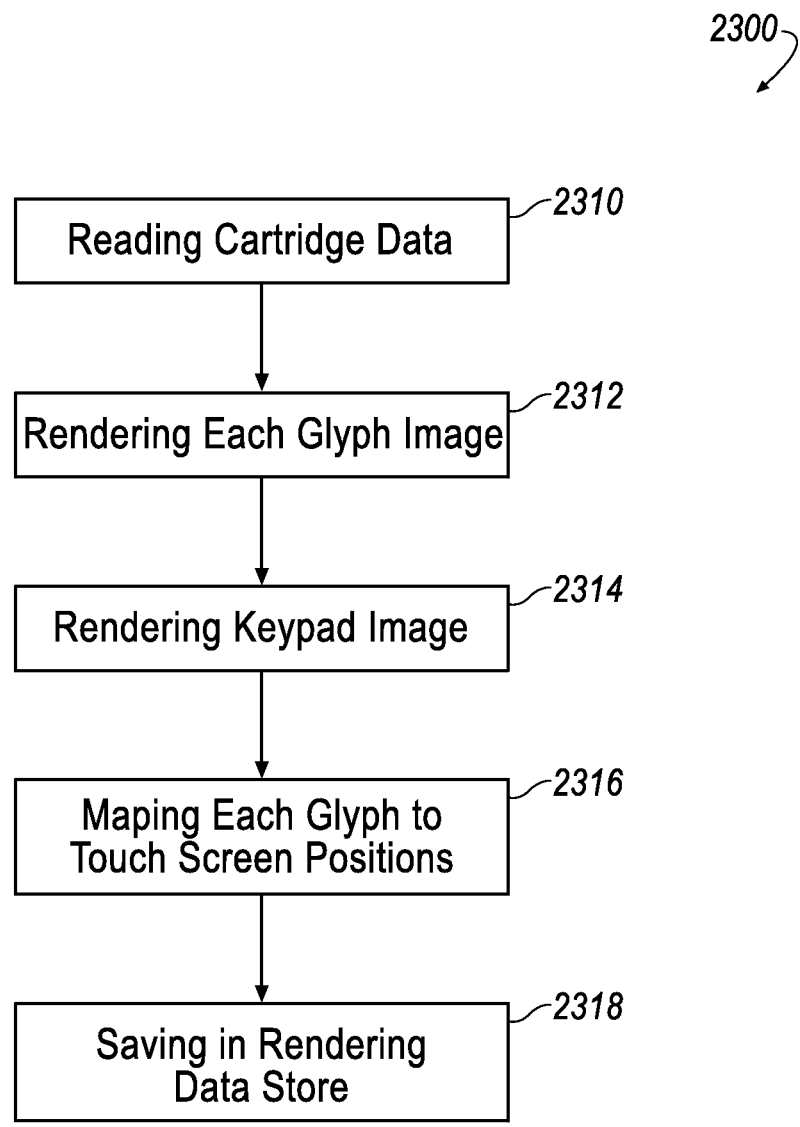
FIG. 23 is a schematic view of an exemplary arrangement of operations of a method for display rendering from a cartridge.

FIG. 23 provides an exemplary arrangement 2300 of operations of a method for display rendering from a cartridge 510. In this example, the cartridge 510 is used as a data source. However, it should be understood that the data source may be stored within the controller device 200, or downloaded, for example from an online store.

Operations of the method for display rendering include reading 2310 the cartridge 510 for the digital content data. This data may include cutting paths for artwork stored thereupon. Cutting instructions may be read and the corresponding cutting paths may be treated, for example, as vector graphics. The data may also include information about mapping of the glyph or artwork to an overlay, and may also include graphical information used for printing or used for display.

The operations include rendering 2312 each glyph or separate item for cutting (e.g., on the electronic cutting machine 610). The rendering may be accomplished by resizing the cutting paths onto a virtual bitmap of a particular resolution. Because the resolution of the screen 112 (e.g., LCD Display 1420) is fixed, the rendering may be optimized for that particular resolution depending on what the rendering will be used for. For example, for a virtual overlay keypad, each glyph may have a predetermined size and take up a predetermined number of pixels. In that example, the cutting path may be optimized for that number of pixels. Alternatively, for example where a zoom image or larger hover image is desired, the area or number of pixels may be adjusted and the cutting paths may be rendered for the desired size bitmap. Both the virtual overlay rendered image and the hover images may be stored for later use.

In some implementations, the content of the read cartridge includes multiple files for each glyph, where each associated file contains graphics data for rendering of the glyph at different resolutions or sizes. In such implementations, the rendering operation 2312 includes selecting the graphics data file corresponding to the appropriate rendering for display. For example, each glyph can have first, second and third associated graphics data files for rendering corresponding first, second and third images of the same glyph. The first image may have a level of image detail for a relatively small image size for a key of a keypad overly, the second image may have a level of image detail for a relatively larger image size for a selected or pass-over image, and the third image may have a level of image detail for a full-screen image size for display during zooming operations of that glyph/image.

In other implementations, rendering operation 2312 includes extrapolating image detail from a master graphics data file for a corresponding glyph for rendering the corresponding image at an appropriate size (e.g., relatively small for a key of a keypad overly, relatively larger for a selected or pass-over image, and a full-screen size). In some implementations, cutting paths or image lines within a threshold distance of each other are merged into one cut path or image line for glyphs below a threshold size (e.g., for display and/or cutting). The extrapolation operation may include selecting a threshold amount of Bezier lines that form the image.

The operations of the method for display rendering further include mapping and rendering 2314 each glyph on a virtual keypad overlay. The mapping of the virtual keypad overlay may be accomplished using mapping data provided by the cartridge data as to which glyph corresponds to which key, and the shifted or function keys. The mapping data may include an XML file or data structure that associates glyphs with keypad positions of a keypad template. The mapping and rendering operation 2314 may include reading the XML file or data structure to obtain glyph layout information and rendering each glyph to a key location of the keypad template according the glyph layout information. The mapping may be transferred directly to the virtual overlay or the mapping may be modified to fit a particular purpose. For example, if the mapping is to be the same as the physical overlay, then the mapping on the virtual overlay will match the physical overlay. For an example of a physical overlay, see U.S. patent application Ser. No. 11/457,415, filed Jul. 13, 2006, to Workman et al, which is hereby incorporated by reference in its entirety. However, if the mapping is changed to provide larger but fewer glyphs on each screen, the mapping may be changed to provide multiple pages (e.g., paging) of the overlays, in which case the mapping will change to provide for page changes in the virtual overlay. Also, some glyphs may be mapped to multiple keys of the keypad, so as to accommodate a relatively larger rendering of the glyph.

The operations also include mapping 2316 each glyph to the virtual overlay touch screen location. The mapping of each glyph and its border may be mapped to the hardware level of sensors of the touch panel 1430 (see FIG. 14). For example, where each pixel is sensitized for touch then each pixel residing in the glyphs region will be sensitive to touch for selection. In some examples, the mapping operation 2316 uses the keypad template to map each glyph to regions of the touch screen 112.

The operations of the method for display rendering further include saving 2318 the rendered and mapped overlay information in the rendering data store 2210 (see FIG. 22). Once the rendering and mappings are complete, the rendered overlays (and if desired the scaled up hover images) may be stored in rendering data store 2210 for future use. Because the work has already been performed to render the glyphs, the images will appear on the screen faster than if they were rendered on-the-fly using the cutting path instructions.

FIG. 24 is a schematic view of a cartridge data store 2400. A cartridge content data store 2410 may be embodied as a non-volatile memory such as a FLASH memory or a ROM. The cartridge content data store 2410 may store cutting instructions read from the cartridge 510, or may be programmed with all or most cartridge content from the factory 2230 (see FIG. 22). Alternatively, the cartridge content data store 2410 may be updated with the actual data contents of the read cartridge 510. This may happen when a subsequent cartridge 510 is released after the cartridge content data store 2410 has been programmed at the factory 2230 and the cutting instructions are not already present. Alternatively, the cartridge content data store 2410 may be updated from a network 2220 (FIG. 22), such as the Internet. When the user updates the controller device 200, the cartridge content data store 2410 may be updated with new content. The cartridge content data store 2410 also acts as a repository for the user to browse content that the user may not already own. In this case, the user may view and design with the content but not cut with it until they have the rights (e.g., through cartridge purchase and/or online purchase).

Figure 25A:
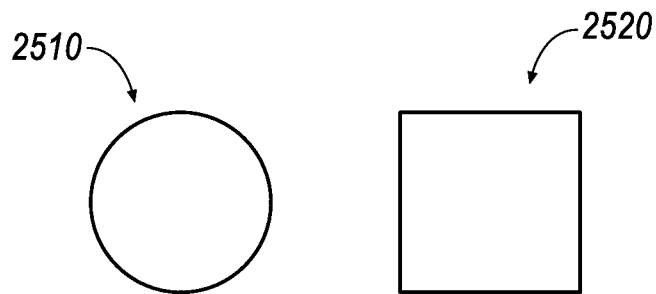
FIG. 25A is an example of two glyphs that the user desires to be welded.
Figure 25B:
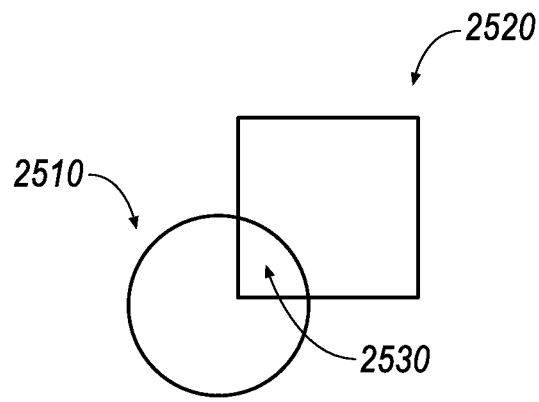
FIG. 25B is an example of the glyphs overlaid for welding.
Figure 25C:
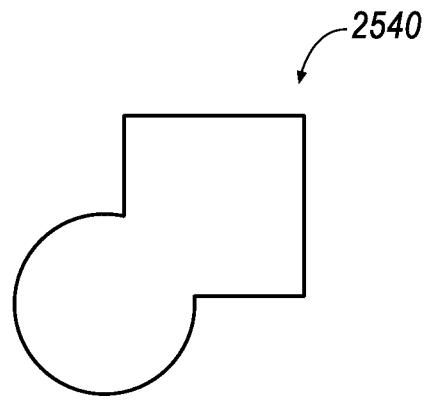
FIG. 25C is an example of the completed welded glyphs.

Referring to FIGS. 25A-25C, welding is a process of connecting the outside perimeters of two or more images 2510, 2520 to form a new image 2540. FIG. 25A is an example of first and second glyphs or images 2510, 2520 that the user desires to be welded (e.g., merged together in appearance). In the example shown, the first glyph 2510 is a circle, and the second glyph 2520 is a square. FIG. 25B illustrates an example of the two glyphs 2510, 2520 overlaid for welding or merging. The user may move the first and second glyphs 2510, 2520 into positions where there is at least one overlapping region 2530. The overlapping region 2530 is not desired to be cut because it would create three separate pieces, rather than a single piece (the resultant of the welding operation). Thus, the user may choose how to weld or merge the first glyph 6510 and the second glyph 6520 together. FIG. 25C is an example of the completed welded or merged glyphs 2510, 2520 as a single resultant glyph 2540. The two separate glyphs 2510, 2520, are replaced by the single resultant glyph 2540 having a single cut path thereabout. The cutting path removes the overlapping area 2530 (see FIG. 25B) that would have created an awkward third piece if no welding or merging was performed.

To determine the overlapping area 2530 and merge the outer cutting paths of the first and second glyphs 2510, 2520, the controller device 200 may determine the outer cutting path for each glyph 2510, 2520, and then determine the overlapping area 2530. Where the cutting path around the first glyph 2510 intersects the cutting path around the second glyph 2520, the two cutting paths are merged at those points and the inner cutting path(s) is not taken. In the example shown, there are two intersections of the cutting paths for the first glyph 2510 and the second glyph 2520. The common or overlapping area(s) of the first glyph 2510 and the second glyph 2520, which are not cut are bounded by the overlapping area 2530. The cut paths for the welded images 2510, 2520 may be reviewed and identified as either a boundary or webbing. If the cut path is considered "webbing" (e.g., cut paths that are internal to the design) then they are ignored and not cut. If the cut paths are boundary cut paths and do not intersect another boundary, then they are cut as they would normally be cut. If the cut paths are boundary cut paths and do intersect another boundary, then the two lines are joined so that the overlapping regions 2530 defined by the two boundaries are made into one region.

Figure 26:
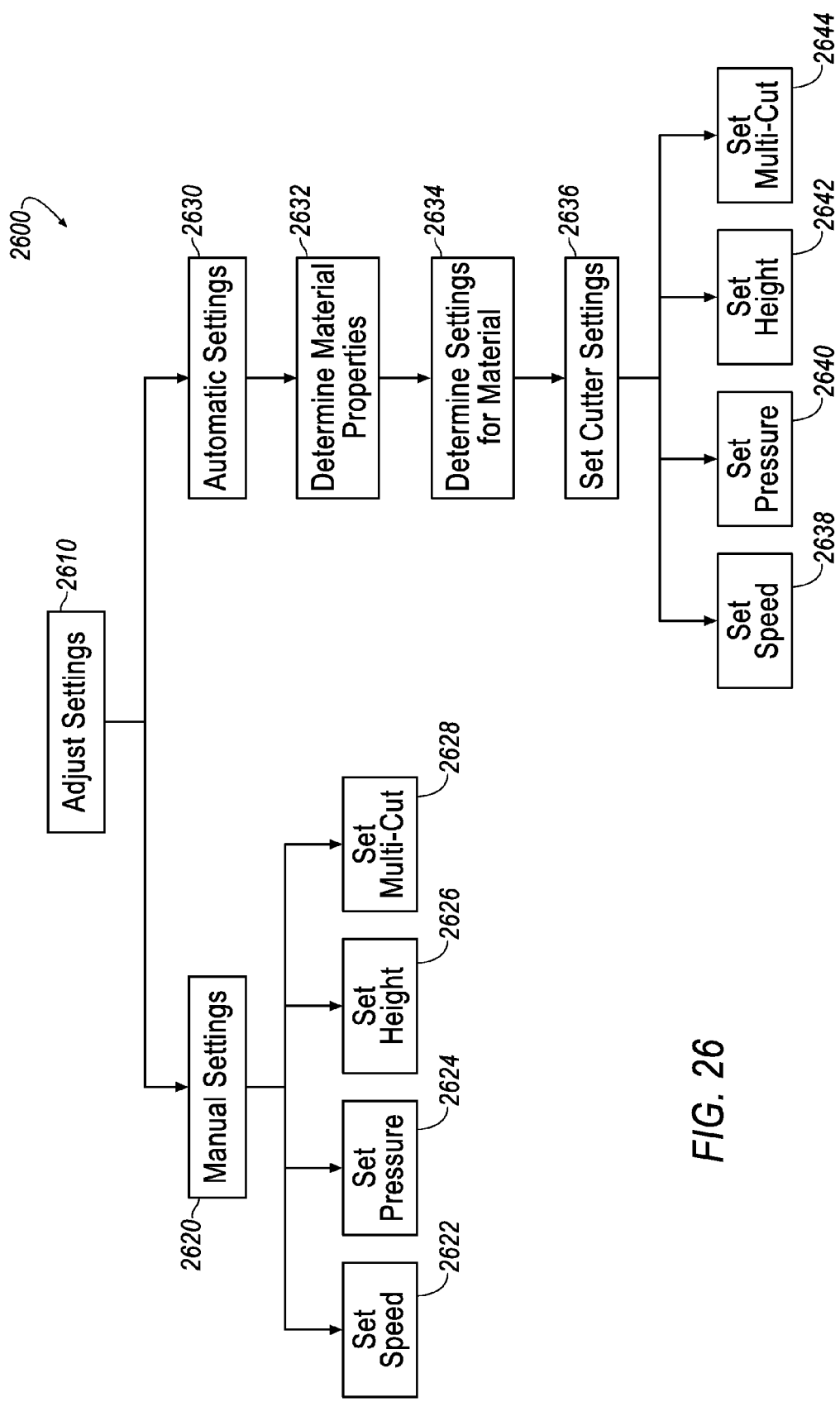
FIG. 26 is a schematic view of an exemplary arrangement of operations of a method for adjusting a cutting machine's settings using a controller device.

FIG. 26 provides an exemplary arrangement 2600 of operations for adjusting settings of an electronic cutting machine 610 using a controller device 200. The controller device 200, when connected to the electronic cutting machine 610, may have control over various configurable aspects of the electronic cutting machine 610. For example, the user may adjust the settings manually through the controller device 200 or the user may choose to have the controller device 200 configure the electronic cutting machine 610 automatically.

In some implementations, the user may select an "adjust settings" dialog 2610 on the controller device 200. The user may then be presented with at least two options, which may include a manual settings option 2620 and an automatic settings option 2630. The manual settings option 2620 allows the user to manually setting various electronic cutter adjustments, such as cutting speed 2622, cutting pressure 2624, cutting height 2626, and multi-cut 2628. The automatic settings option 2630 allows the user to choose to have the controller device 200 automatically select the settings for the electronic cutting machine 610 for a particular cutting job. In some implementations, the electronic cutting machine 610 determines 2632 the material properties of the media to be cut (e.g., the weight and thickness of paper loaded in the electronic cutting machine 610) or uses user defined settings for the cutting media and then automatically selects 2634 the electronic cutter settings for that material, for example, based on previously used cutting settings, a settings algorithm (which may use the paper weight, paper thickness, model of the electronic cutting machine (e.g., to determine hardware components), etc. The controller device 200 proceeds to set 2634 the various electronic cutter adjustments, such as cutting speed 2638, cutting pressure 2640, cutting height 2642, and multi-cut 2644.

In some examples, the user may adjust the material properties so that the controller device 200 may adjust the electronic cutter settings to that material. For example, if the user defines the material properties 2632 as heavy card stock, the controller device 200 may query a database to determine 2634 the appropriate electronic cutter settings for that material. The database may include a mapping of various materials to appropriate cutter settings, or it may include a formulaic approach where each of the material properties are pulled from the database and applied to a formula to determine the electronic cutter settings. In the example where the user specifies heavy card stock, the electronic cutter setting for speed 2638 may be set as a slower speed than regular craft paper. Moreover, the pressure 2640 may be increased, as well as use of the multi-cut feature 2644 to traverse the cut path multiple times with the blade to ensure proper cutting through the material. In this way, the user may add features to the design that includes the material type desired and the controller device 200 may prompt the user for that type of material, as well as configure the physical parameters of the electronic cutting machine 610 to efficiently cut out that material.

Figure 27:
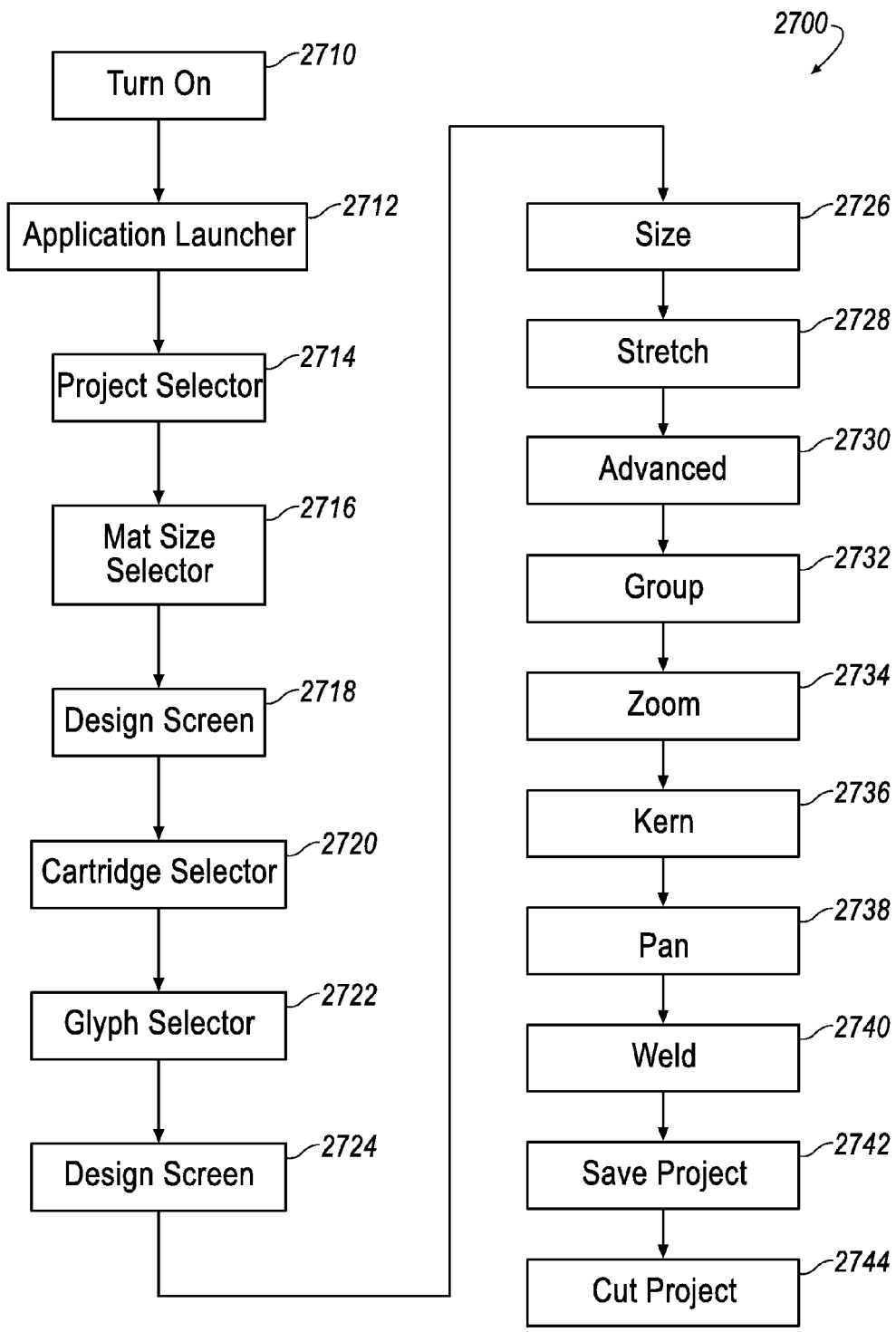
FIG. 27 is a schematic view of an exemplary arrangement of operations of a generic use case for the controller device.

FIG. 27 provides an exemplary arrangement 2700 of operations for using the controller device 200. In general, the controller device 200 is a portable device that works with an electronic cutting machine 610, such as the CRICUT® Personal Electronic Cutter, to let the user create custom shapes, letters, and phrases on the go, for later cutting and sharing.

Operations for using the controller device 200 include turning on 2710 the controller device 200. The user may connect a power source to the power connector 110 (FIG. 3A) or use the user selector button 320 (FIG. 3A), for example, to toggle power on and off. When the controller device 200 turns on the user may see a welcome screen (e.g., a splash screen). If the controller device 200 is turned on for the first time, an End User License Agreement (EULA) may be shown to the user, and when the user agrees, they may be taken to an application launcher screen.

The operations for using the controller device 200 include viewing 2712 an application launcher on the screen 112 to choose and launch an application to run on the controller device 200. The application may be a picture program (e.g., to manipulate and print pictures) or a device specific program, such as the CRICUT® Application. In this example, the user selects the CRICUT® application to start a new design project.

The operations include selecting 2714 a project from the application. The project may be a saved (e.g., stored) project or a new project. In the example shown, the user selects a new project. The operations include selecting 2716 a mat size, e.g., 6×12 or 12×12, and presenting 2718 a main design screen where a virtual cutting mat is shown. The user may add a glyph (e.g., an image representing the cutout from the digital content) to the virtual mat. The operations further include selecting 2720 a particular cartridge 510 to add content to the virtual mat. The cartridge 510 may be considered a collection of glyphs for use. The user may be presented with a list of all available cartridges 510 or only the cartridges the user owns for selection. The controller device 200 may allow the user to preview and even design with the entire cartridge library regardless of whether the user owns the cartridges 510 or not. In this way, the user may sample cartridges 510 before buying them. However, to cut an image using the controller device 200, the user must first connect the cartridge 510 containing the desired image and authorize the controller device 200 to cut it. This operation is discussed herein as "pairing" and only needs to be done once when controller device 200 remembers the cartridges that have been paired. In general, the controller device 200 can be configured to store the contents of thousands of cartridges 510. Moreover, the controller device 200 may have one or more cartridges 510 pre-loaded and authorized for use.

The operations for using the controller device 200 also include presenting 2722 the user with a glyph selector screen where each glyph is shown rendered on the screen 112. The user may have the option of selecting the "option" and "shift" buttons to change the display. The controller device 200 also may be configured to show the user all of the available glyphs in a particular cartridge 510. Thus, the user need not have to carry the user manuals for each cartridge 510 to peruse the content stored on the cartridge 510. The controller device 200 allows the user to preview all of the digital content for each cartridge 510 on the screen 112. Additionally, the user may hover over each glyph to view an enlarged or zoomed view of the glyph to see it in more detail. The user may double-tap an image to select it and place it on the virtual mat to begin designing with it.

In a main design screen, the virtual mat allows the user to manipulate each glyph. For example, the user may move the glyph around, align glyphs with each other, show highlighted axes on the mat to allow for alignment, etc. The user may simply tap the glyph and drag it to a new location on the mat. There are also more precise positioning methods discussed herein that allow for direct entry of X/Y coordinates for positioning the glyph to a precise location.

The operations may include resizing 2726 a glyph. In some implementations, highlight size buttons on the controller device 200 (e.g., on the screen 112) allow the user to change the width and height of the glyph. For example, arrow buttons (e.g., a spin control) may be used to change the size of the glyph where an "up" arrow makes the glyph larger and a "down" arrow makes the glyph smaller. Alternatively, the user may use direct input methods to set the height and width to specific sizes (e.g., by entering a height and width into respective height and width fields displayed on the screen 112).

The operations may include stretching 2728 the glyph. For example, the stretch function allows the user to change the aspect ratio of a glyph by entering the size they want in the height and width fields. The user may also use the arrows to stretch an image. The operations may include using 2730 an advanced setting to adjust the glyph. For example, the advanced features may include rotate, skew, flip vertical, and flip horizontal, as well as other functions such as rotation and slant for modifying the glyph.

The operations may include grouping 2732 two or more glyphs. For example, the glyphs may be positioned on the mat in a desired orientation with respect to each other. The glyphs may then be grouped together so that they may be moved, resized, rotated or otherwise manipulated together as if they were a single glyph. In some implementations, to select a group, the user selects the first glyph, then taps the "group" button, then selects the second glyph. With the two glyphs grouped together, whatever the user does to one glyph is automatically applied to both glyphs. This is helpful, for example, when moving glyphs without having to be concerned about their relative positioning. Moreover, when precision is desired, the user may not be able to see the entire mat view when zoomed into a particular location for alignment, and the group function allows any number of glyphs to be positioned at the same time.

The operations may include zooming 2734 in on a particular area of the virtual mat. In some implementations, to zoom, the user may hold a zoom button (e.g., a virtual button displayed on the screen 112 or a physical button on the controller device 200) and tap on an area of the screen 112. The controller device 200 may then zoom in on the area tapped, which is displayed on the screen 112. The user may continue to hold the zoom button and tap different areas to zoom in on the desired location. In general, the image shown on the screen 112 will enlarge and center on the spot that the user tapped.

The operations for using the controller device 200 may also include kerning 2736 glyphs, for example, so as to remove a portion of space between adjacent glyphs in preparation for printing or cutting. In some implementations, the user uses kern buttons (e.g., virtual buttons displayed on the screen 112 or physical buttons on the controller device 200) to manipulate the glyphs. Kerning may be used to position two glyphs relative to each other, based on the spacing between them. Kerning allows for the determination of a gap or distance between glyphs.

The operations may include panning 2738 the virtual mat. In some implementations, the user holds down a pan button (e.g., a virtual button displayed on the screen 112 or a physical button on the controller device 200) and drags the stylus 210 across the screen 112 to pan the virtual mat and any images thereon.

The operations may include welding or merging 2720 two or more glyphs or images together. In some implementations, the user selects multiple glyphs or images and presses a weld button (e.g., a virtual button displayed on the screen 112 or a physical button on the controller device 200) to weld or merge the multiple glyphs or images together into a single resultant glyph or image having a single cut group.

The operations may include saving 2742 the project (e.g., storing the project in memory 250 on the controller device 200 or a connected memory device). In some implementations, the user presses a "save" button (e.g., a virtual button displayed on the screen 112 or a physical button on the controller device 200), and is presented with a dialog window for selecting a project name and/or a location for storing the project. A project file can have a header that includes file attributes, such as file name, size, creation date, last save date, etc. The project file can also have data portion that includes glyph group, which lists all of the glyphs forming the design. The glyph group can include attributes such as glyph ID and/or glyph name, cartridge name, and placement properties. The placement properties may include mat location, size, rotation, skew, applied style, etc.

The operations for using the controller device 200 may also include executing 2744 a cut operation on an electronic cutting machine 610. For example, if the user wishes to realize the project in tangible form, the user may press a "cut" button (e.g., a virtual button displayed on the screen 112 or a physical button on the controller device 200) and a connected electronic cutting machine 610 cuts out the glyphs of the project. The controller device 200 may prompt the user to place certain cutting media (e.g., paper) in the electronic cutting machine 610, for example, having a particular color or weight.

In some implementations, the controller device 200 executes a conversion program that converts a visual design into a cuttable design for executing a cut operation on the electronic cutting machine 610. The conversion program determines cutting paths for various image lines of a displayed design to create a substantial similar cut design. For example, the conversion program may create cuts of various thickness and/or depth to achieve a look substantially similar to the displayed design (e.g., a photo). The conversion program may merge cutting paths or image lines within a threshold distance of each other into one cut path or image line. The threshold distance may be set by the user or determined based on cutting material type and/or thickness. For example, for typical 20 lb. paper, the threshold distance may be 0.2 mm for merging multiple cutting paths corresponding to image lines into one cutting path. The conversion program may use Bezier lines forming the design to determine cutting paths. For example, each Bezier line of the design may be a cutting path and Bezier lines within a threshold distance of each may be merged into one cutting path. The conversion program can select one of many Bezier lines within an image region having a threshold size to represent all or part of that region. A selected Bezier line can then be used as a cutting path having a set width (as by the width of a selected cutting tool) determined by the user or the conversion program for a particular design region. In some implementations, cutting paths are extrapolated from all or select Bezier lines. Some factors that may be considered during an extrapolation operation include cutting material (type, thickness, etc.) and cutting tool. The conversion program may also introduce over-cuts (e.g., past an image line end point to make a full cut), under-cuts (e.g., cutting short of an image line end point), angled cuts, and custom cutting paths (e.g., to achieve cutting turns, acute angles, etc.) to achieve cutting a design that substantially resembles a displayed image of the design (e.g., on the screen 112).

Figure 28A:
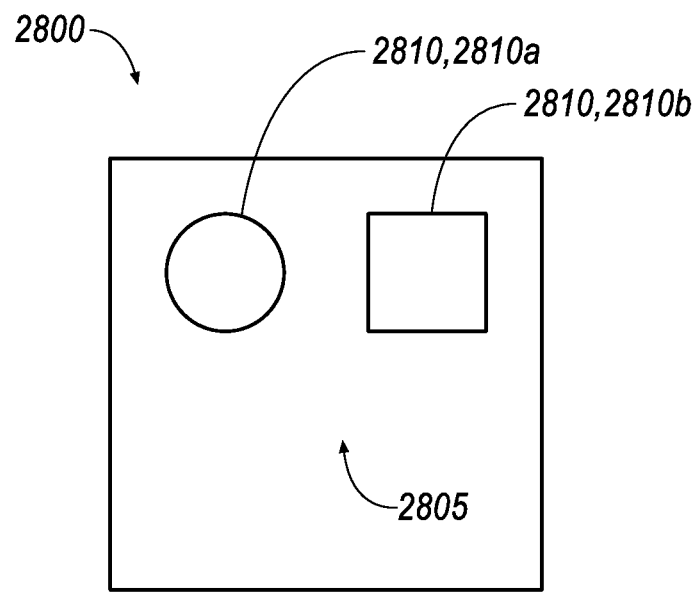
FIG. 28A is a schematic view of a design mat having designs to be cut.

FIG. 28A provides a schematic view of a virtual design mat or virtual mat 2800 having designs 2805 comprising one or more images or glyphs 2810 to be cut on an electronic cutting machine 610. The designs may include a circle glyph 2810a and a square glyph 2810b. The controller device 200 knows the position of the glyphs 2810a, 2810b on the virtual mat 2800 that relate to a physical cutting mat. After the designs 2805 are cut using the electronic cutting machine 610, the controller device 200 knows that those areas cut no longer have paper, or that they are already cut, and to remind the user or prevent the user from placing other glyphs over those cut areas.

Figure 28B:
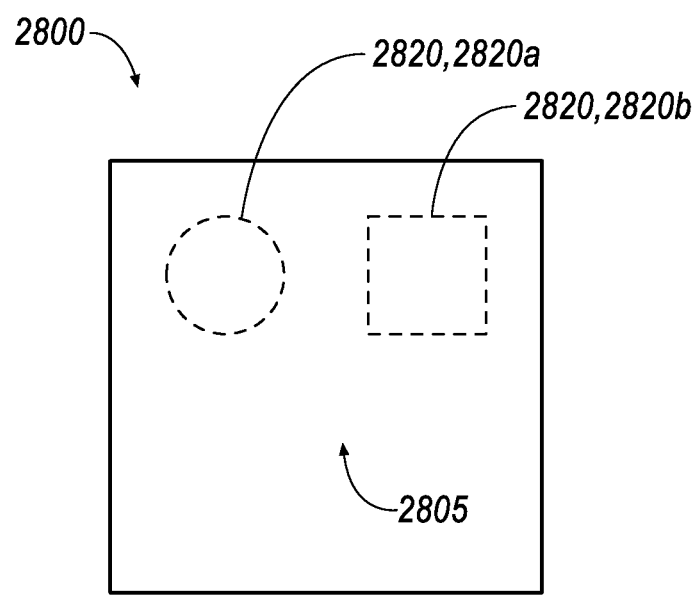
FIG. 28B is a schematic view of a design mat showing keep-out areas after the designs are cut.

FIG. 28B provides a schematic view of the virtual mat 2800 showing keep-out or cut areas 2820 after the designs are cut. The dashed areas 2820a, 2820b show where the corresponding glyphs 2810a, 2810b have already been cut from the physical paper on the cutting mat. An illustration, such as the figure shown, showing the virtual mat keep-out areas 2820 may be shown to the user (e.g., on the screen 112 of the controller device 200) to indicate that the user should not place glyphs in those areas. Alternatively, the controller device 200 may not allow the user to place any portion of a glyph within the keep-out areas 2820. The virtual mat 2800 with keep-out areas 2820 may be manually saved by the controller device 200, for example, when glyphs 2810 have been cut and the cutting mat has not been ejected from the electronic cutting machine 610. Alternatively, the user may save information on the already cut mat (e.g., to memory 250 of the controller device 200 or a connected memory device) for future use, which includes information of what locations have already been cut.

Figure 28C:
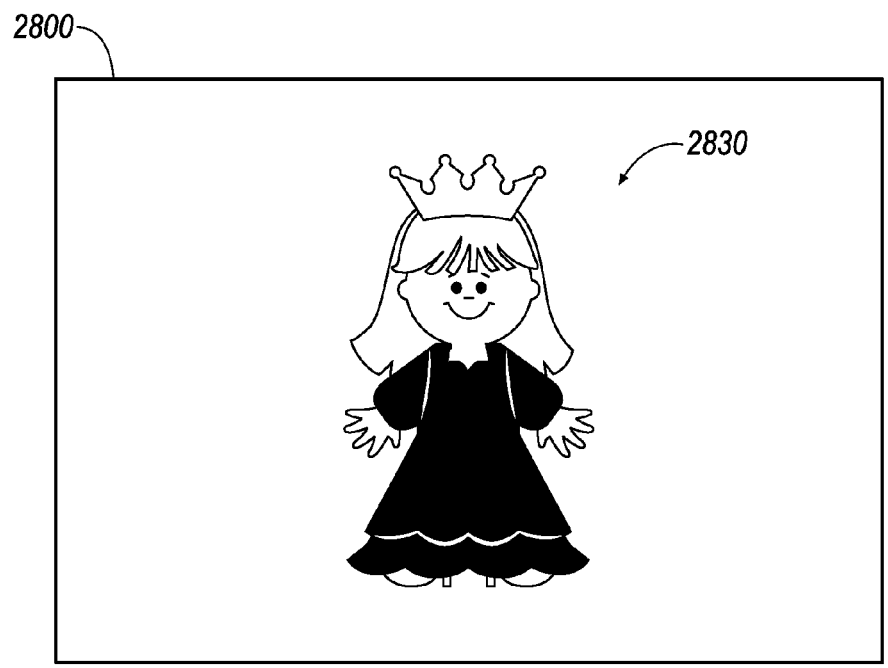
FIG. 28C is a schematic view of a composite design.

FIG. 28C provides a schematic view of a composite image 2830 on the virtual mat 2800. The composite image 2830 comprises layers of component images 2840 that collectively provide the composite image 2830 visually, and also mechanically during physical assembly of component images 2840 cut from a material on the electronic cutting machine 610. The usage of a collection of component images 2840 to form a composite image 2830, digitally and/or physically is referred to herein as image layering and digital paper layering. In some examples, the user can assemble a composite image 2830 on the virtual mat 2800 or select a pre-made composite image 2830. The composite image 2830 may be configured or designed by an artist and provided to the user for consumption (e.g., via a cartridge 510 or the Internet). The composite image 2830 may include a home location, which is the location of a vector path that, when all the vectorized component images 2840 arranged in the home location, provides the user the composite image 2830.

Figure 28D:
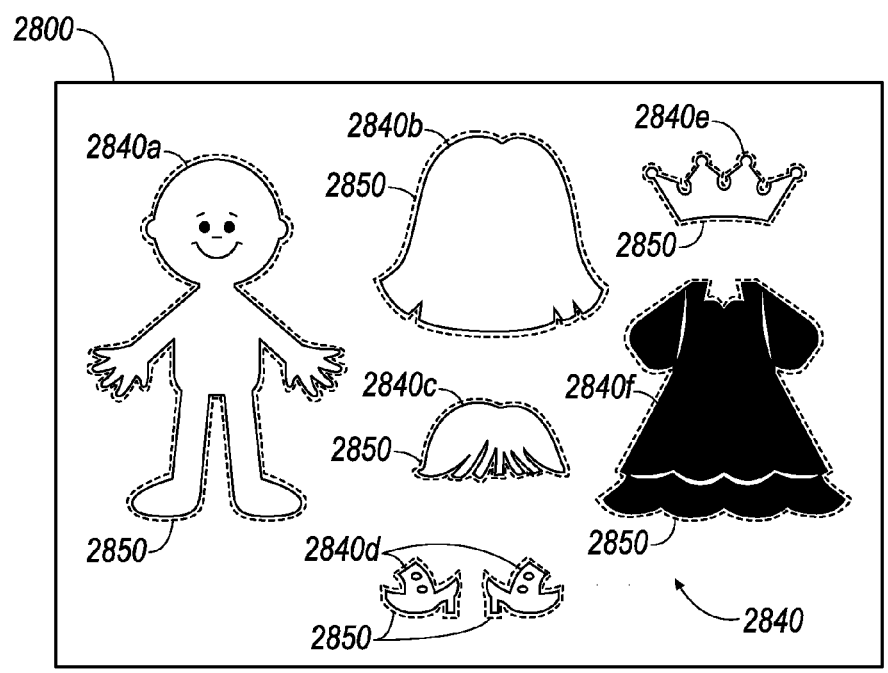
FIG. 28D is a schematic view of component glyphs of the component design of FIG. 28C.

When a user initiates a cutting operation or executes an exploded view operation, the composite image 2830 is exploded into the non-overlapping component images 2840 for cutting and later assembly, as shown in FIG. 28D. In some implementations, separate component image files corresponding to each component image 2840 are used for providing the exploded view, while in other implementations, the component images 2840 are created or extrapolated from the composite image 2830 (e.g., via segmenting the image). In the example shown, the composite image 2830 is assembled from a body component image 2840a, a first hair component image 2840b, a second hair component image 2840c, a shoes component image 2840d, a crown component image 2840e, and a dress component image 2840f. If the composite image 2830 is cropped, the corresponding component images 2840 may be cropped accordingly. A semi-composite state of the composite image 2830 may be provided where the component images 2830 can be arranged with overlapping and non-overlapping vector paths.

In some examples, the user may recolor, flood fill, paint, shade, texture, other otherwise alter all or parts of the composite image 2830 and/or any of the corresponding component images 2840 so as to customize the look of the image(s) 2830, 2840. In shading, for example, the user may altering the color of raster art to make it a different color while maintaining the shading of the raster art. In texture filling, the user may remove the raster art from inside a vector border and replacing it with a pattern.

Referring again to FIG. 28C, each component image 2840 may have a vector region, which is an area created by the boundary of a vector path. In some implementations, a buffer region 2850 is disposed around the perimeter or boundary of the vector path of the component image 2840. The buffer region 2850 allows cutting the component image 2840 along its perimeter while maintaining any coloration (e.g., via printing) of component image 2840 completely up to the cut perimeter. The buffer region 2850 may have a threshold thickness that stays constant or is not exceeded (e.g., maximum or minimum) when the component image 2840 is scaled or altered. In some implementations, the buffer region 2850 is created by extrapolating colors outwardly beyond the image perimeter. For example, pixel colors may be propagated a threshold number of pixels outwardly form the image perimeter and overlapping colors mixed appropriately (e.g., according to a mixing criteria, such red+blue=purple).

Table 1 provides example use cases that illustrate various operations that can be performed on composite images 2830 (full and semi-composite state of the composite image 2830) and/or component images 2840. Other uses are possible as well. In some examples, the user may wish to execute a machine operation, such a print operation, a cut operation, or a print and cut operation from the controller device to realize a design in physical form. The user may also execute one or more image manipulation operations on the composite images 2830 (full and semi-composite state of the composite image 2830) and/or component images 2840 before executing the machine operation.

The user may alter or manipulate the image in any number of ways, including, but not limited to: sizing, flipping, rotating, shading, filling, painting, skewing, patterning, etc.

Additional details on image layering and other features combinable with this disclosure can be found in U.S. Provisional Patent Application Ser. No. 61/178,074, filed on May 14, 2009 as well as U.S. Provisional Patent Application Ser. No. 61/237,218, filed on Aug. 26, 2009. The disclosures of these prior applications are considered part of the disclosure of this application and are hereby incorporated by reference in their entireties.

Figure 29:
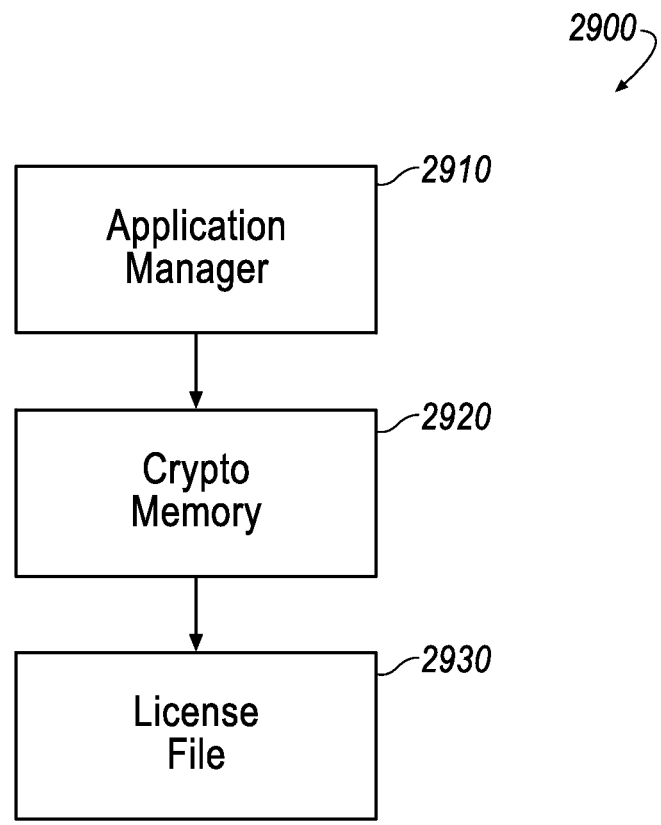
FIG. 29 is an example of a security scheme for the controller device.

FIG. 29 is an example of a security scheme 2900 for the controller device 200. The security scheme 2900 may include an application manager 2910 that handles encryption and verification of software running on the controller device 200 as well as the digital content used. In some examples, the application manager 2910 may access a crypto memory 2920 that may be configured as a write-once, read-many memory. The crypto memory 2920 may only provide information when a long code is entered. Moreover, the crypto memory 2920 may provide seed data that must be decoded by the application manager 2910 so that a suitable access key is provided back to the crypto memory 2920 before any data is read out. Additionally, the crypto memory 2920 may include

TABLE 1

| | Composite | Semi-Composite | Exploded |
|---|---|---|---|
| Print and Cut | Alter the image, print and cut, peel and use. Alter the image, flood fill some/all vector regions, print and cut, peel and use. Alter the image, shade fill some/all vector regions, print and cut, peel and use. Alter the image, texture fill some/all vector regions, print and cut, peel and use. | Alter the image, move some/all vector regions, print and cut, peel, layer if desired and use. Alter the image, move some/all vector regions, flood fill some/all vector regions, print and cut, peel, layer if desired and use. Alter the image, move some/all vector regions, shade fill some/all vector regions, print and cut, peel, layer if desired and use. Alter the image, move some/all vector regions, texture fill some/all vector regions, print and cut, peel, layer if desired and use. Additionally - vector regions could be deleted. | Alter the image, explode the image, print and cut, peel, layer if desired and use. Alter the image, explode the image, flood fill some/all vector regions, print and cut, peel, layer if desired and use. Alter the image, explode the image, shade fill some/all vector regions, print and cut, peel, layer if desired and use. Alter the image, explode the image, texture fill some/all vector regions, print and cut, peel, layer if desired and use. Additionally - vector regions could be deleted. |
| Print | Alter the image, print, peel and use. Alter the image, flood fill some/all vector regions, print, peel and use. Alter the image, shade fill some/all vector regions, print, peel and use. Alter the image, texture fill some/all vector regions, print, peel and use. | Alter the image, move some/all vector regions, print, peel, layer if desired and use. Alter the image, move some/all vector regions, flood fill some/all vector regions, print, pea, layer if desired and use. Alter the image, move some/all vector regions, shade fill some/all vector regions, print, peel, layer if desired and use. Alter the image, move some/all vector regions, texture fill some/all vector regions, print, peel, layer if desired and use. Additionally - vector regions could be deleted. | Alter the image, explode the image, print, peel, layer if desired and use. Alter the image, explode the image, flood fill some/all vector regions, print, peel, layer if desired and use. Alter the image, explode the image, shade fill some/all vector regions, print, peel, layer if desired and use. Alter the image, explode the image, texture fill some/all vector regions, print, peel, layer if desired and use. Additionally - vector regions could be deleted. |
| Cut | Alter the image, select the paper, cut, peel and use. | Alter the image, move some/all vector regions, select the paper, cut, peel, layer if desired and use. | Alter the image, explode the image, select the paper, cut, peel, layer if desired and use. | a bad-key lockout that may prevent any information from being read if, for example, three failed attempts happen in providing the key.

The crypto memory 2920 may contain, for example, a private encryption key or password that allows access to the digital content, such as glyphs 2810, and other stored digital content (e.g., in memory 250 of the controller 200 or in a connected cartridge 510). To secure the digital content it may be stored on the controller device 200 in an encrypted form. To access the digital content a key from the crypto memory 2920 may be read and stored in volatile memory (e.g., such as RAM) and used to decode the encrypted digital content. Moreover, an encryption key may be stored in crypto memory 2920 that is used to encrypt and decrypt a license file 2930 that may store all of the cartridge identifiers and digital content rights authorized for the particular controller device 200. In some examples, the license file 2930 is tied to a specific device (e.g., an electronic cutting machine 610). The license file 2930 can be encrypted and signed for the specific device, and a device specific key can stored in the crypto memory 2920.

A designer software application, executable on the controller device 200, provides the user with tools to create a design 2805 using digital content. The CRICUT® Application may be used as the designer software application to mix and match content on a cutting mat. In some examples, the images or glyphs 2810 are moved on the virtual mat 2800 by dragging them around the screen 112, using nudge buttons (moves the image by some predetermined interval), or by inputting an x/y value for placement of the images on the virtual mat 2800. Images 2810 may be sized by using "handles" around the images 2810 on the screen 112 (e.g., handles are icons that surround an image that allow users to move, slant, rotate, etc.), by using the nudge buttons (e.g., a virtual button displayed on the screen 112 or a physical button on the controller device 200) (to change the size at a some predetermined interval), or by inputting a width or height value into respective width or height input boxes on the screen 112 (e.g., when inputting a height or width value, the user has the ability to either preserve the aspect ratio or break the aspect ratio). Images 2810 may be stretched by dragging image handles on the screen 112, using nudge buttons with the aspect ratio preservation turned off, or by inputting a value into the width or height input boxes with aspect ratio preservation turned off. The images 2810 may also be rotated by dragging the image handles on the screen 112, using the nudge buttons, or by inputting a value into a rotate input box on the screen 112. Images 2810 may be slanted (e.g., italicized) by dragging image handles on the screen 112, using the nudge buttons, or by inputting a value in a slant input box on the screen 112. Any space between images 2810 may be adjusted by the value of kerning that may be changed by selecting a group of images 2810 and inputting a value in a kerning input box on the screen 112 or by using the nudge buttons.

The designer software application may selectively alter the appearance of an image 2810 that receives an appearance altering operation, such as resizing, rotating, slanting, etc., so as to provide a generally desirable effect. For example, when a pattern image 2810 is resized to fit a specific size design 2805 (e.g., for a cake or shirt), the user may wish to have a pattern image 2810 of a particular width, while maintaining the height and general appearance of the pattern. Rather than having the height scaled proportional to the width of the image 2810 or stretching or distorting the image 2810 by increasing the width and maintaining the height constant, the designer software application repeats a pattern of the image 2810 having a specific height to meet a desired width of the image 2810. The designer software application may calculate the number of repetitions and also fractional repetitions of the image 2810 to provide a desired look of the patterned image 2810. The designer software application can also weld the repeated images 2810 together.

Other features of the designer software application include mirroring and welding. Mirroring in the Y axis provides for images 2810 and groups of images 2810 mirrored about a vertical axis by selecting the image 2810 or image group and selecting a mirror Y button (e.g., a virtual button displayed on the screen 112 or a physical button on the controller device 200). Mirroring in the X axis provides for images 2810 and groups of images 2810 be mirrored about a horizontal axis by selecting the image 2810 or image group and selecting a mirror X button (e.g., a virtual button displayed on the screen 112 or a physical button on the controller device 200). Welding is the process of connecting the outside perimeters of two or more images 2810 (e.g., images 2510, 2520 of FIG. 25A) to form a new image 2540 (FIG. 25C). Welding may be a defined property of an individual image 2810. Any images 2810 that are overlapping and that have the welding property "turned on" (e.g., enabled) will be interpreted by the designer software application running on the controller device 200 as needing a welding operation, which can be executed substantially instantaneously thereafter, rendering the resulting image 2810, 2540 on the screen 112.

Real size may be a feature of the designer software application that allows the user to control the size of an image 2810 both relative to a key character in a font set or not relative to a key character in a font set. The real size feature allows the user to put the designer software application in one of two modes. In some examples, a character set is selected where the capital "A" is the key character and a lower case "a" has a relative height of half that of the key character and the characters "Aa" are placed on the virtual cutting mat 2800 at a size of 1 inch. When the relative size mode is selected (e.g. not real size) then the letter "A" will be 1 inch tall and the letter "a" will be 0.5 inch tall. However, if the letter "a" is selected individually the size will be displayed as 1 inch tall even though it is only 0.5 inch tall. The letter "a" displays as 1 inch tall because that is its size relative to the "A". If the user inputs a value of 2 inches tall for the letter "a", it will show up on the screen as 1 inch tall because it is still relative to the key character "A" which states that the letter "a" is always half the height of the letter "A". Values may also be directly input into the system to determine the size. For example, if the user turns on real size (also discussed as "true size"), the letter "A" will still be 1 inch tall and the letter "a" will still be 0.5 inch tall. However, if the letter "a" is selected individually the size will be displayed as 0.5 inch tall. The letter "a" will display as 0.5 inch tall instead of 1.0 inch tall because it is now showing the true height of the letter "a" and not the height relative to the key character. This also allows a user to directly control the height of that letter "a." If the user wants the letter "a" to be 1 inch tall, the user doesn't have to guess what value to enter into a height field on the screen 112. Instead, the user can turn on the True Size mode, select the letter "a" and enter a value of 1 inch into the height field.

Am additional feature of the designer software application includes deletion. The user may be able to select and delete individual images as well as groups of images from the virtual mat 2800. The image groups may be based on selection of adjacent images 2810 or disparate images 2810. The image group may then be deleted. The designer software application can also provide "undelete" or "undo" operations where the user has the ability to undo on or more operations, such as a delete operation. The designer software application can also provide a "redo" operation to redo the last operation.

Grouping may be a feature of the designer software application that allows the user to group images 2810 to do one or many operations at once to all items in a group. For example, the user may move the group and maintain the location of each image 2810 in the group relative to another. The user may size all the images 2810 in a group while maintaining the relative size of all the images 2810 in the group. The user may stretch all the images 2810 in a group so that the images 2810 all stretch by the same proportions. The user may rotate all the images 2810 in a group so that the images 2810 are all rotated as if they were one image 2810. The user may slant all the images 2810 in a group so that the images are all slanted by the same amount. The user may kern the images 2810 in a group so that the horizontal spacing between the images 2810 in the group is either increased or decreased regardless of the location of the images 2810 in a group, for example, to maintain even spacing between the images 2810. The user may mirror all the images 2810 of the group about a horizontal or vertical axis so that all the images 2810 in the group mirror as if they are one image 2810. The user may turn on or off the welding function or property for all the images 2810 in the group.

Grouping may be accomplished in at least two ways. First, all images 2810 that are selected on the keypad screen will by default belong to the same group. Second, images 2810 may be joined together. Joining images may be done by turning on a "group mode" and selecting all the images/groups that the user wants to join. The operation is completed by exiting group mode. Alternatively, the user may select an existing group or image on the virtual mat 2800, exit to a keypad screen, select additional images from a keypad and then go back to the screen showing the virtual mat 2800. Images 2810 within a group can be selected individually by first selecting the group and second by selecting the image 2810 within the group. Once an individual image 2810 inside a group is selected, then other operations may be performed on the individual image 2810 without affecting the other images 2810 in the group. For example, the user may move the image 2810 within the group without affecting the other location of any other image 2810 in the group. To un-group, the user may explode the group so that each image 2810 in the group becomes individually selectable, not belonging to a group.

Another feature of the designer software application includes a "Multi-Cut" system. The multi-cut system allows the user to select how many times the electronic cutting machine 610 passes a cutting blade over the same cut path so that the cutting blade is capable of cutting through thicker materials. An example may include the desire to cut through heavy card stock where a single cutting pass by the electronic cutting machine 610 may not be able to completely cut through the material. In this case, the user may select three cuts using the multi-cut system. The electronic cutting machine 610 would retrace the cutting paths three times to accomplish the cut. Another feature of the designer software application includes selection of English or metric measurement systems to change the display to inches or metric units.

The designer software application may include outputting a design 2805 to an associated electronic cutting machine 610 for cutting the design 2805 on media, such as paper. Cutting may include a single or multi-cut scenario (discussed above). The multi-cut operation allows the user to select how many times to pass the cutting blade over the same cut path so as to enable cutting through relatively thick materials with a given cutting blade. A pause feature allows the user to pause the cutting operation and then resume the cutting operation at will during the cutting process. For example, during a pause, a user could change the parameters of the cutting process (i.e. speed, pressure, etc.) to change the cut quality. The typical cutting operation allows the user to cut a design 2805 displayed on the virtual mat 2800 on a physical mat of the electronic cutting machine 610. A Load/Unload Mat feature allows the user to load and unload media, such as paper, using controls on the controller device 200. The user may also control the cutting pressure settings, speed, and other parameters of the electronic cutting machine 610 through the controller device 200. For example, when the controller device 200 is connected to the electronic cutting machine 610, the only setting a user would have to make on the electronic cutting machine 610 itself would be to physically adjust a blade height.

In some implementations, the controller device 200 interfaces with a printer (e.g., a laser printer, inkjet printer, photo printer, photo copier, etc.). The user has the ability to print a design 2805 on a printer (e.g., using a USB connection) without the need of a personal computer. The user may print images, designs, etc., for use in a design 2805 or for review of the layout prior to cutting. For example, when a user imports an image (e.g., a picture of a family member) to the controller device 200 for placement on a scrapbooking design 2805, the user may use the controller device 200 to print the image on a photo printer and/or execute a cutting operation for the image on the electronic cutting machine 610. Alternatively, the user may use a combined printer/cutter device to combine the printing and cutting operations into a single machine.

The user may also use a find feature to locate images and content on the controller device 200. The user may search by keywords for content. Keywords may be delivered to the controller device 200 using library updates. In some examples, the keywords may not be delivered when content is copied directly from a cartridge 510 unless that information is available through metadata. Filtering may also be used to filter search results based on categories, for example.

The controller device 200 may also include security features to protect and authorize use of the content stored on the controller device 200, or authorized for use. For example, when a cartridge 510 is paired to the controller device 200, the design software application may randomly check pre-loaded glyph images against the cartridge content to verify that the cartridge 510 is an authorized cartridge 510 (e.g., a genuine cartridge) that contains artwork/content and not a dummy or counterfeit cartridge designed to look like a genuine cartridge.

An additional security feature may include multiple levels of encryption to access content and/or the cutting path for the content. For example, authentication may be performed with a public/private key infrastructure.

Upgradeability may be enhanced through library downloads and updates. The controller device 200 may be connected through a network (e.g., the Internet) that will enable downloads of new content and/or libraries of content. The update feature may also provide for the purchase of content without requiring a physical cartridge 510 being connected to the controller device 200. For example, the user may visit a web-portal or rich internet application (RIA) and purchase content. The purchased content may then be downloaded to the controller device 200 for authorization and use. Alternatively, if the content is already loaded onto the controller device 200 but not yet authorized for use, an authorization may be downloaded. Alternatively, a library update may download new content to the controller device 200 but not yet provide authorization to use it. This may be helpful to the user for viewing the content with the controller device 200 to make a decision to purchase the content. The library content may also be used to update metadata associated with the content. Metadata may include keywords for collections of content, keywords for each glyph of content, categorization of the content, pre-rendered keys for the digital overlay and more descriptive key renderings for the digital overlay.

Additionally, the applications (e.g., the CRICUT® Application) may be updated from the network connection and the user may connect a cartridge 510 to the controller device 200 and update the cartridge information.

Another feature may be on-the-fly shadow generation for the content. In an example, the letter "A" may be shadowed from the basic cutting path. This may include pushing the extents of the cutting path outwardly automatically to create a shadow cutting path.

Figure 30:
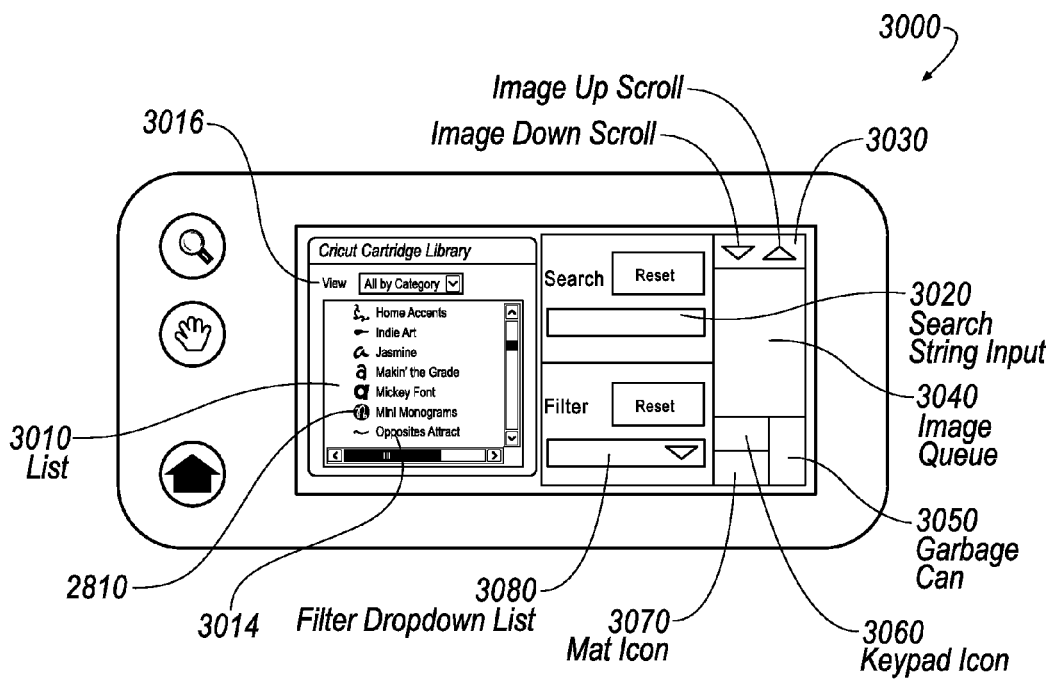
FIG. 30 is a schematic view of a user interface for the controller device.

FIG. 30 provides a schematic view of an exemplary user interface 3000 for the controller device 200. The controller device 200 may allow the user to store images, overlays, and user manuals in local storage. The user interface 3000 may include a search list 3010 of applications or content libraries (e.g., cartridge libraries), a search input 3020, image scrolling 3030 and/or an image queue 3040, a garbage can 3050, a keypad icon 3060 (that changes the display to a virtual keypad for user text input), a mat icon 3070 (that changes the display to a mat layout display such as is described in FIG. 32), and/or a filtering drop down list 3080.

To locate content, the user can scroll through the search list 3010, which, in the example shown, provides an image or glyph 2810 and a cartridge name 3014 of the cartridge 510 associated with that glyph 2810. The search list 3010 may be populated with all content stored or accessible by the controller device 200 (e.g., via the Internet or an external source in communication with the controller device 200). In some examples, the search list 3010 is populated with search results based on a string entered into the search string input 3020. The controller device 200 compares the string of the search string input 3020 with one or more keywords associated with each accessible glyph and returns any matches (partial and/or exact) to the search list 3010. The keywords may be stored in a data structure, XML file, or database accessible by the controller device 200. The search list 3010 may be further refined by using a search filter 3080 (shown as a dropdown list of filter categories) and/or a display filter 3016 (e.g., alphabetical, new content only, owned content only, non-owned contently only, etc.). The search results may provide a listing of owned content (e.g., in green) as well as non-owned available content (e.g., in red) that can be purchased for use. For example, selection of non-owned content can forward the user to a purchase screen for procurement of the non-owned content. The non-owned content may be preinstalled (e.g., at a factory) on the controller device 200 or otherwise accessible, as by an external source such as the Internet.

Figure 31:
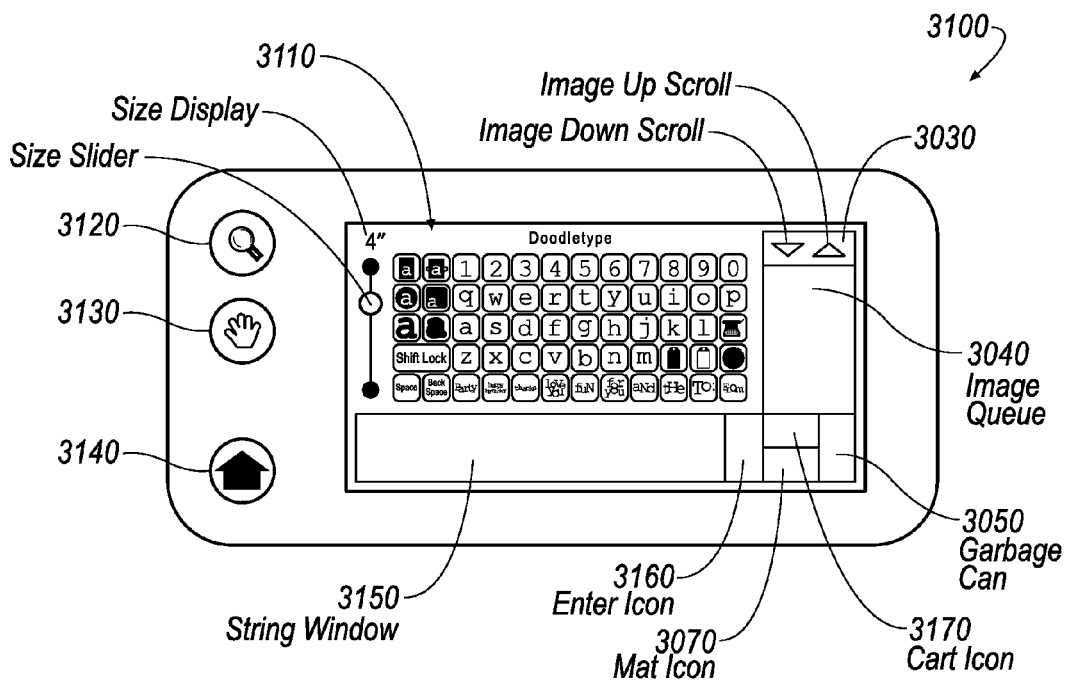
FIG. 31 is a schematic view of a user interface including cartridge content selection for the controller device.

FIG. 31 provides schematic view of another exemplary user interface 3100 including cartridge content selection for the controller device 200. In some examples, the cartridge 510 may include cutting instructions for the electronic cutting machine 610, as well as keypad mapping information and/or keypad layout information. The controller device 200 may read the information of a communicatively attached cartridge 510 and generate a layout for the user interface 3100 where the user may select shapes provided by the cartridge 510. Similarly, the controller device 200 may recognize an attached external resource, such as an electronic cutting machine or printing machine, and generate a machine specific user interface 3100. The cartridge content may be stored locally on the controller device 200 or on a local communication system (e.g., a network, USB, etc.) In some examples, the content is downloaded to the controller device 200 through a local communication system (e.g., a network, USB, etc.). The user may use the screen 112 to select a desired shape or content item and further manipulate it with the controller device 200.

The user interface 3100 includes an overlay 3110, which may be stored on the cartridge 510, or generated from images stored on the cartridge 510 and mapped to virtual keys rendered on the screen 112 using an image mapping stored on the cartridge 510. The controller device 200 may access mapping information (e.g., an XML file or data structure) that indicates which glyphs 2810 correspond to particular overlay or screen locations. For example, a keypad template may have empty key locations that receive mapped glyphs 2810. In general, the controller device 200 may store cartridge content and/or content-overlay mapping, but copying of cartridge content may be prevented, or it may be performed through authorized methods (e.g., backup).

The user may change a view of the overlay 3110 on the screen 112 of the controller device 200 by selecting a shift key or Alt key, and/or user button 212, 214, 310 (to change the usage state). The overlay 3110 displayed by the controller device 200 changes images based on an active feature, the selected shift key or Alt key, and/or user button 212, 214, 310. The user interface 3100 may include features such as zooming 3120, zooming increments (e.g., 50%, 75%, 100%, 150%, etc.), panning 3130 (e.g., with pan acceleration), and the image queue 3040. The user interface 3100 may also include an image sizer 3140 (e.g., slider control with accompanying size display), a string window 3150 for displaying selected images (e.g., letters), an enter icon control 3160 (for carriage returns in the string window 3150), and a cart icon 3170 (for switching to the user interface 3000 having the content selection tools, such as the search input 3020, image scrolling 3030 and/or an image queue 3040). The string window 3150

Figure 32:
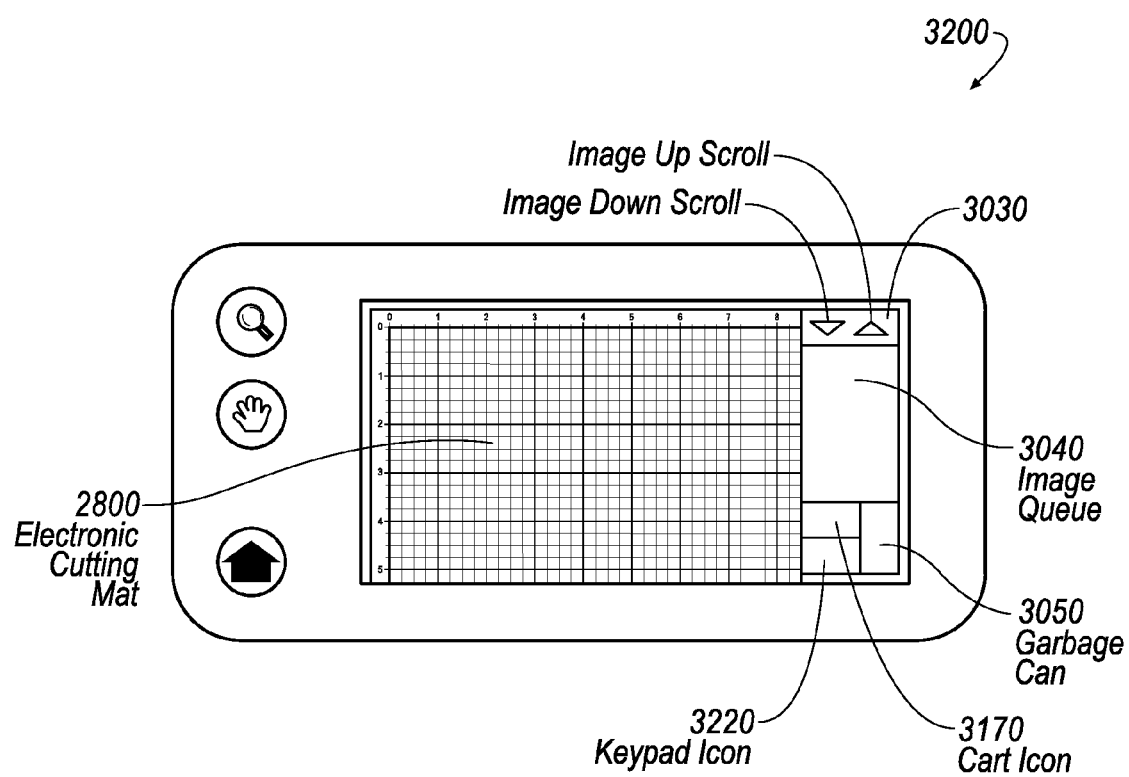
FIG. 32 is a schematic view of a user interface including page/mat layout for the controller device.

FIG. 32 provides schematic view of an exemplary user interface 3200 that includes a page/mat layout for the controller device 200. The user interface 3200 may used to preview designs 2805 comprising one or more glyphs 2810 prior to cutting the design 2805 on a peripheral device, such as the electronic cutting machine 610. This may be useful for What-You-See-Is-What-You-Cut ("WYSIWYC"). WYSIWYC may be more than simply viewing the image of the design shape(s), but rather may allow the user to selectively place images on an electronic representation of the cutting mat, a virtual mat 2800, to maximize the use of cuttable area. This maximization may also be automatically performed by the controller device 200. Moreover the user interface 3200 may be used for rotating, stretching, and/or skewing of images before executing a cutting operation. The user interface 3200 may also provide for expandable modes and modes and features buttons (e.g., "pause" cutting). The user interface 3200 may allow for confirmation of the design 2805 prior to cutting. This may be a confirmation window that displays all the settings and asks for a confirmation before allowing a cutting operation. The user interface 3200 may include a keypad icon 3220 for switching to the user interface 3100 having the overlay 3110 of a keypad.

To use cartridge content, the user may select glyphs 2810 from the search list 3010 (FIG. 30) and place them in the image queue 3040. In some examples, selected glyphs 2810 are automatically placed directly on the virtual mat 2800 (e.g., in a default position) (FIG. 32), while in other examples, the user can stage glyphs 2810 in the image queue 3040 for placement on the virtual mat 2800. The image queue 3040 may be a group edit field that contains a group of selected images (from the search list 3010 and/or the virtual mat

2800). For example, the image queue 3040 may provide a view of a current selection of glyphs 2810 on the virtual mat 2800. In some instances, the order of the glyphs 2810 in the image queue 3040 is the order of selection from the search list 3010, the original order of placement on the virtual mat 2800, the order of selection on the virtual mat 2800, left-to-right order on the virtual mat 2800, alphabetical order, or some other appropriate order. Re-ordering on the virtual mat 2800 may or may not be reflected in the image queue 3040. In some examples, glyphs 2810 cannot be deleted from the image queue 3040, but rather only from the virtual mat 2800 and/or the overlay 3110.

In some implementations, selection of a glyph 2810 from the search list 3010 opens or switches to the overlay view 3100 with the overlay 3110 populated with the glyphs 2810 of the corresponding selected cartridge 510, with the selected glyph 2810 and any associated altered-state keys (e.g., shift or Alt key) highlighted or otherwise marked as selected.

Figure 33:
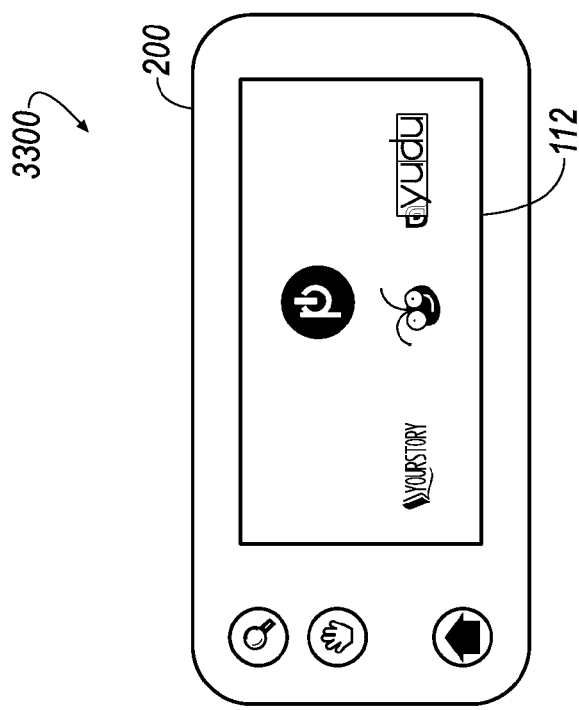
FIG. 33 is a schematic view of screen and menu changes for the controller device.
Figure 33:
Figure 33:
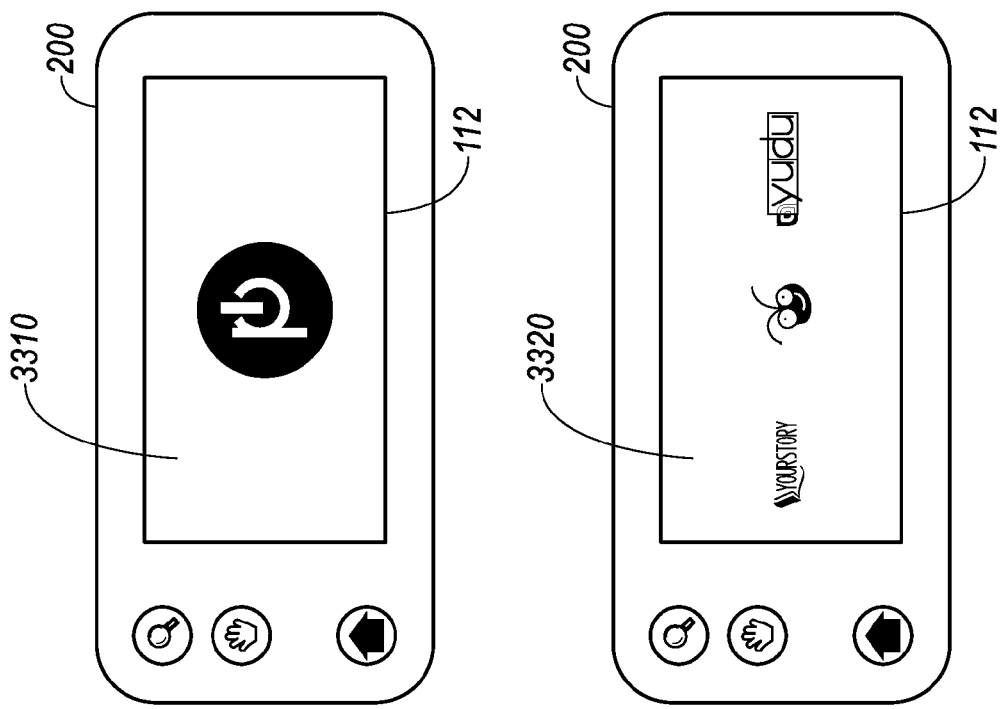

FIG. 33 is an example 3300 of screen and menu transitions or changes for the controller device 200. The controller device 200 may start up with a splash screen 3310 displayed on the screen 112, and then transition to an application launcher 3320 displayed on the screen 112. In the example shown, the application launcher 3320 provides selection of application programs including a YourStory (photo album) application, a CRICUT® application, and a YUDU™ (silk screening) application, all available by Provo Craft & Novelty, Inc. of Spanish Fork, Utah.

Figure 34:
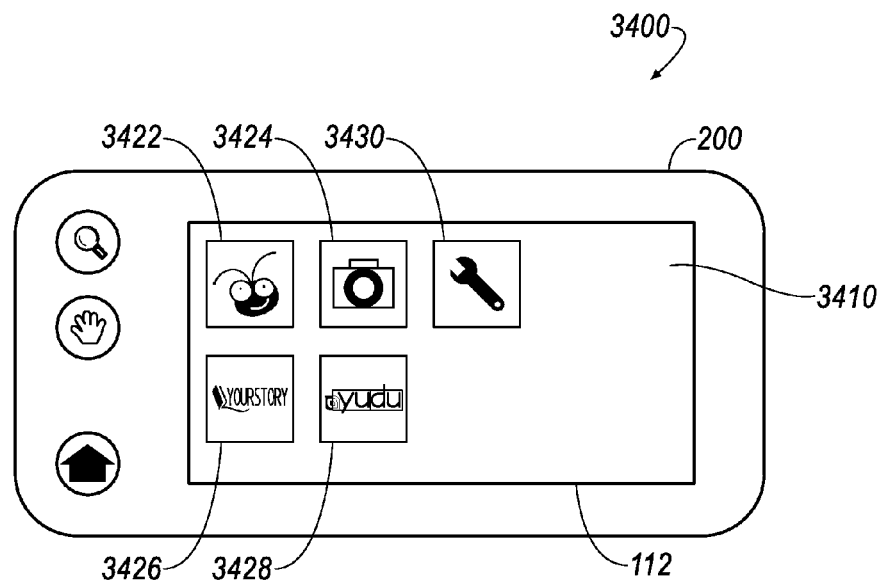
FIG. 34 is a schematic view of an application selection for the controller device.

FIG. 34 is an example 3400 of an application launcher 3410 displayed on the screen 112 of the controller device 200. The application launcher 3410 may provide software applications executable on the controller device for interfacing with particular peripherals. For example, the application launcher 3410 may include one or more cutting applications 3422, such as those provide by the CRICUT® application, for interacting with an electronic cutting machine 610, such as the CRICUT® machine. The application launcher 3410 may include a photo application 3424 that provides functions for manipulating and printing digital photos. The application launcher 3410 may include designer application 3426, such as the YUDU™ application, for creating screens and designs for a personal silk screening machine, and a photo album application 3428, such as YourStory, that provides for photo album design, printing, and cutting. Additionally, there may be an application for a combined printer/cutter that allows for designing what is to be print and cut, as well as controlling the peripheral to create the design. The application launcher 3410 may also include a utilities application 3430 for setting options on the controller device 200, such as screen resolution, color scheme, layout, etc.

Figure 35:
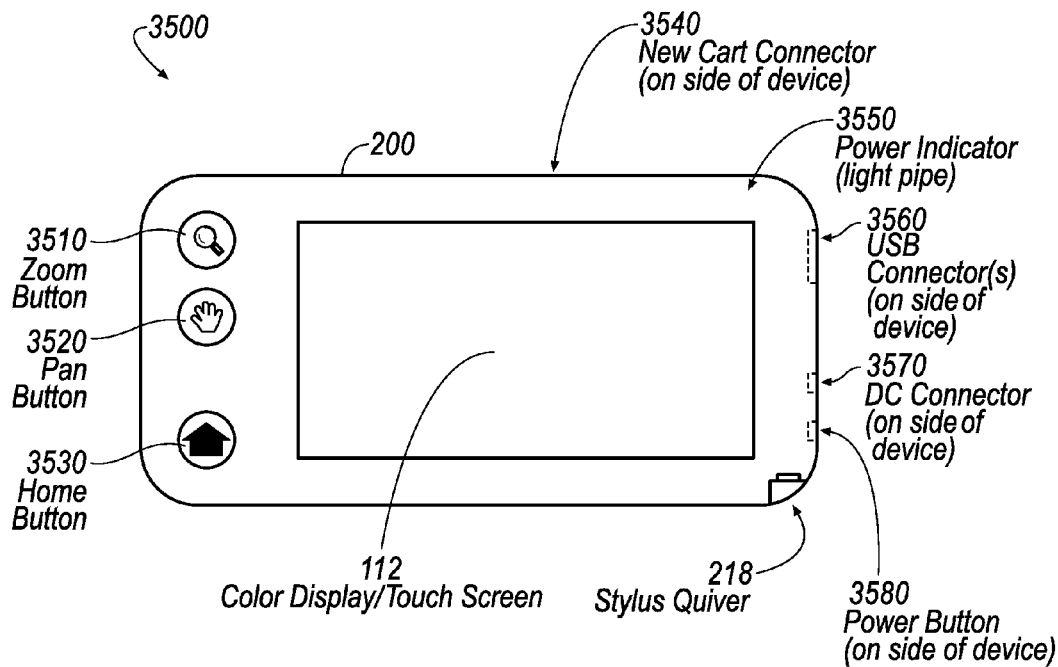
FIG. 35 is a schematic view of an exemplary layout of the controller device.

FIG. 35 provides a schematic view of an exemplary controller device layout 3500. In the implementation shown, the controller device 200 may include a zoom button 3510 (e.g., for zooming in on a particular area of the screen 112, using a stylus 210 or a user's finger on the touch screen), a pan button 3520 (e.g., for panning about the screen 112) and a home button 3530 (for returning to a home display on the screen 112). The buttons 3510, 3520, 3530 are shown on the left side of the controller device 200, but may be placed in other locations. The controller device 200 may also include a color display/touch screen type of screen 112 for user data entry and glyph manipulation. The controller device 200 may include a stylus quiver 218 to hold a stylus 210 when not in use. Moreover, the controller device 200 may include a cartridge connector 3540, a power indicator 3550, a USB connector 3560, a power connector 3570, and a power button 3580 for turning the controller device 200 on and off.

Figure 36:
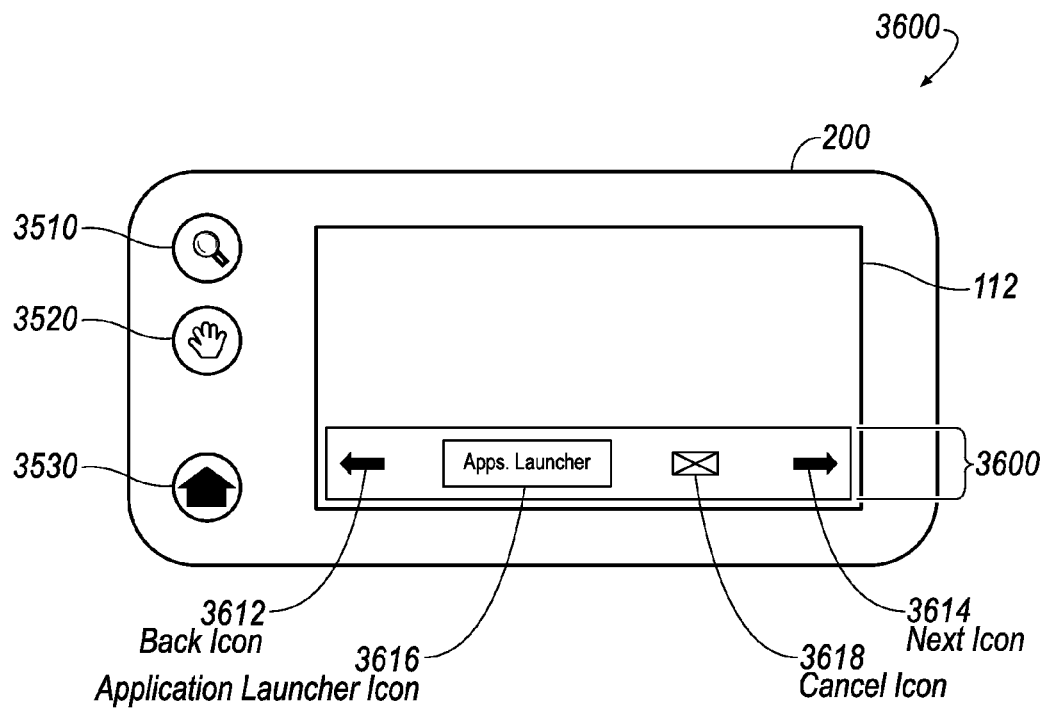
FIG. 36 is a schematic view of an exemplary application launcher for the controller device.
Figure 37:
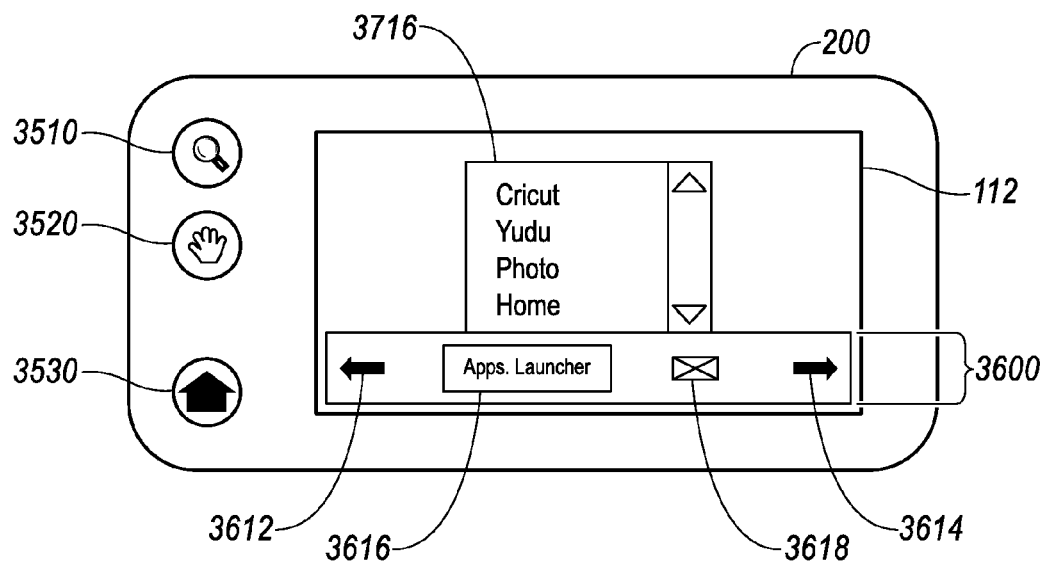
FIG. 37 is a schematic view of an exemplary selection list for the controller device.

FIG. 36 provides a schematic view of an exemplary application launcher 3600 displayed on the screen 112 of the controller device 200. The application launcher 3600 may include back and next icons 3612, 3614, an application launch icon 3616, and a cancel icon 3618. The application launch icon 3616 (e.g., activatable by the stylus 210 or the user's finger) may cause a list 3716 of applications to be displayed on the screen 112, as shown in FIG. 37. The user can select an application from the list 3716 to be executed on the controller device 200. In the example shown, the list 3716 of applications provided by the application launcher 3616 include a CRICUT® application, a YuDu™ application, a photo application and a home navigation selection; however, any number and type of applications executable on the controller device 200 may be provided in list 3716 of applications.

Figure 38:
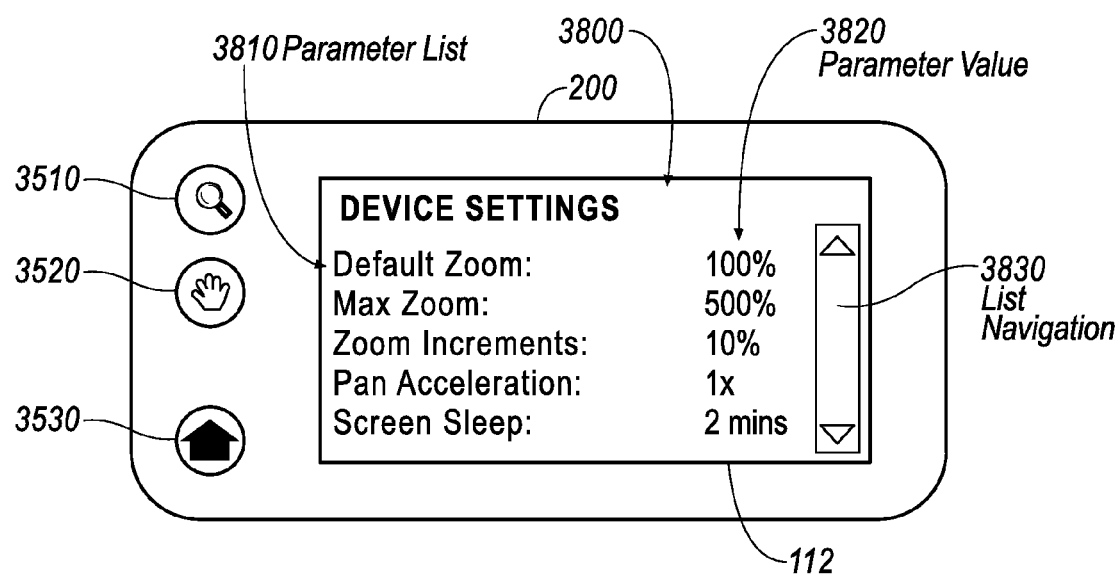
FIG. 38 is a schematic view of an exemplary device settings screen the controller device.

FIG. 38 provides a schematic view of an exemplary device settings screen 3800 displayed on the screen 112 of the controller device 200 for adjusting controller device settings. The device settings screen 3800 may provide a parameter list 3810 with respective parameter values 3820, which the user can edit. Example parameters of the parameter list 3810 include default zoom, max zoom, zoom increments, pan acceleration, and sleep time (e.g., the time lapse before the screen 112 goes to sleep to conserve battery power). A list navigation bar 3830 allows the user to scroll through the parameter list 3810.

Figure 39:
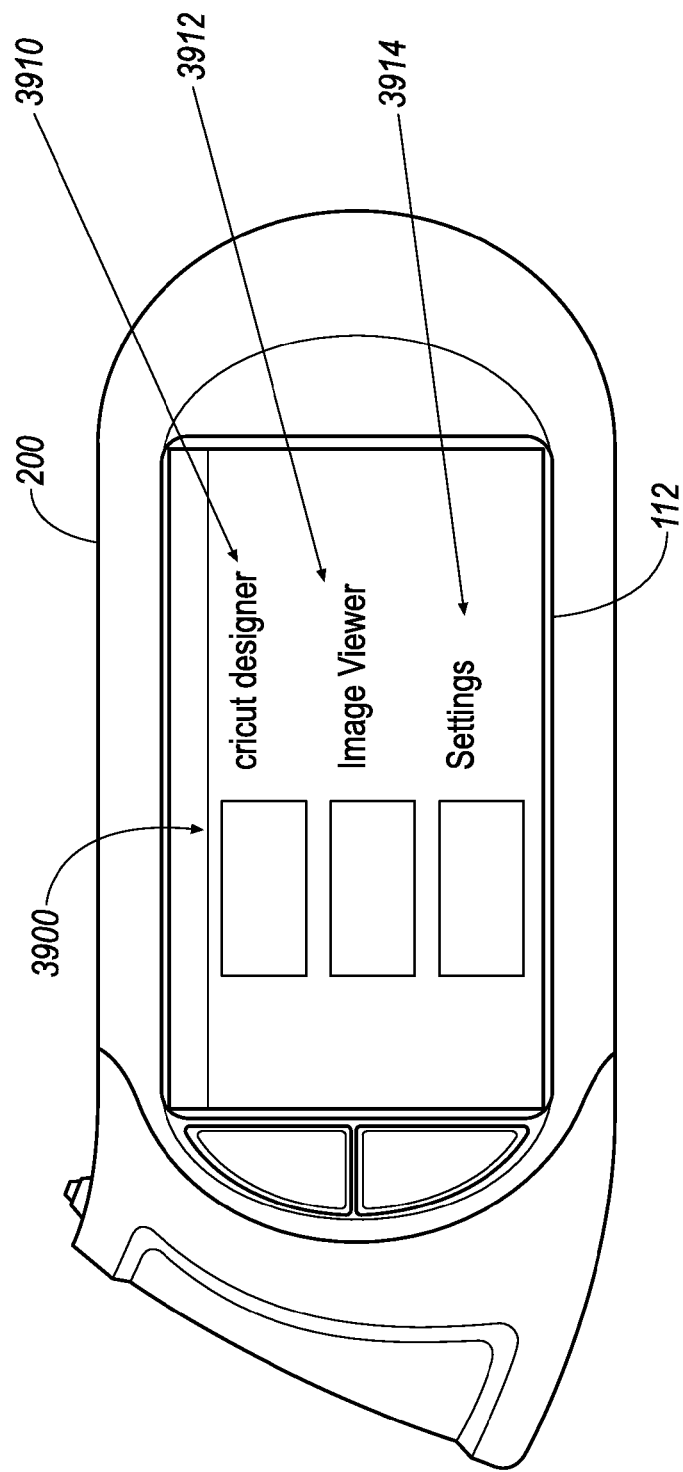
FIG. 39 is a schematic view of an exemplary navigation screen for the controller device.

FIG. 39 provides a schematic view of an exemplary navigation screen 3900 displayed on the screen 112 of the controller device 200. The navigation screen 3900 may include a collection of software applications and/or setting menus. In the example shown, the navigation screen 3900 provides a list of applications, including a designer software application button 3910, an image viewer application button 3912 and a settings button 3914 (e.g., where each button is a selectable image, hypertext link, etc. displayed on the screen). Upon selecting an application, the application is launched (e.g., executed on the controller device 200) and displayed on the screen 112 for use by the user.

Figure 40:
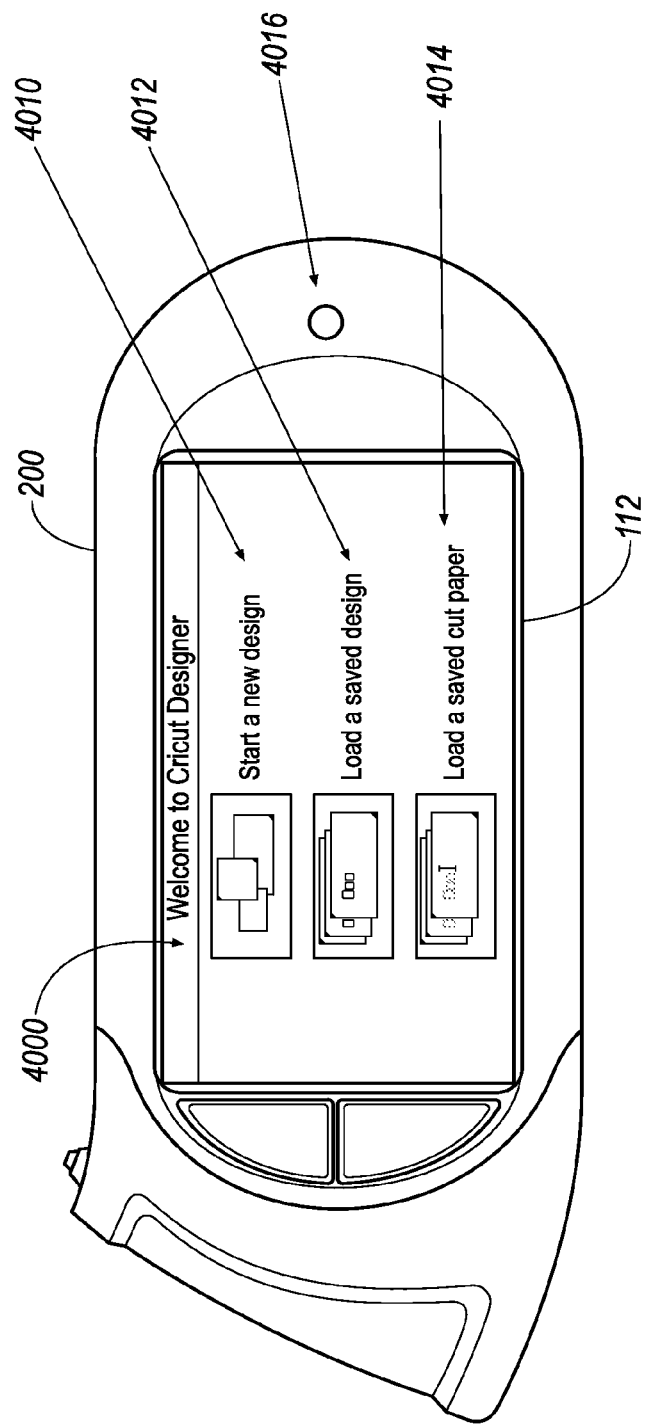
FIG. 40 is a schematic view of an exemplary user interface start screen for the CRICUT® designer application.

FIG. 40 provides a schematic view of an exemplary user interface start screen 4000 for the designer software application (e.g., accessible through the navigation screen 3900). The user can use the user interface start screen 4000 to start a new design by selecting a new design button 4010, load a saved design by selecting a load saved design button 4012, or load a saved cut paper by selecting a load saved cut paper button 4014 (e.g., where each button is a selectable image, hypertext link, etc. displayed on the screen). When the user starts a new design, the user is presented with a blank virtual mat for content selection and layout. When the user loads a saved design, prior design work is presented to the user on the screen 112 for further design and/or cutting. The user may also turn off the device with a power button 4016.

When the user loads a saved cut paper, the system will have stored the layout for a previously cut piece of paper (e.g., cut by the CRICUT® machine). For example, the controller device 200 used to cut the paper, knows the location of any previously cut content (e.g., by retrieving information for the previously cut content from a data store or memory source). Thus, when loading a saved cut paper, the controller device 200 may avoid cutting over already cut areas. The saved cut paper may be used to show the user where the paper has already been cut (e.g., by showing a grayed out area) or by preventing placement of content on the virtual mat over the previously cut area. In this way, the user may load and unload paper and re-use that paper without having to guess at the placement of content on the virtual mat for subsequent cuts.

The controller device 200 may remember the cut areas by storing the cutting information for the mat (e.g., by storing in non-volatile memory).

Figure 41:
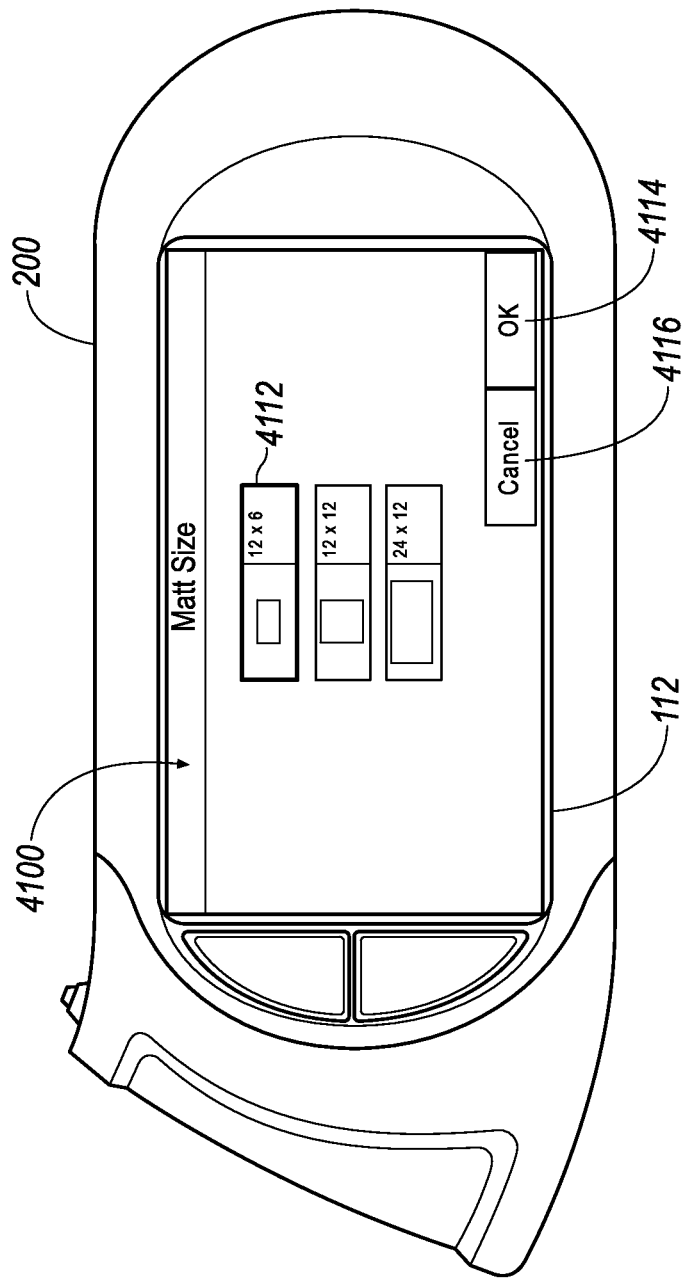
FIG. 41 is a schematic view of an exemplary user interface mat-size selection screen.

FIG. 41 provides a schematic view of an exemplary user interface mat-size selection screen 4100 displayed on the screen 112 of the controller device 200. In the example shown, the user may select a mat size for use with an associated electronic cutting machine 610. Here, three sizes of mats are shown including 12"×6", 12"×12" and 24"×12". As shown, the 12"×6" mat size 4112 is selected, and the user may select OK 4114 to confirm the selection or select cancel 4116 to cancel the selection.

Figure 42:
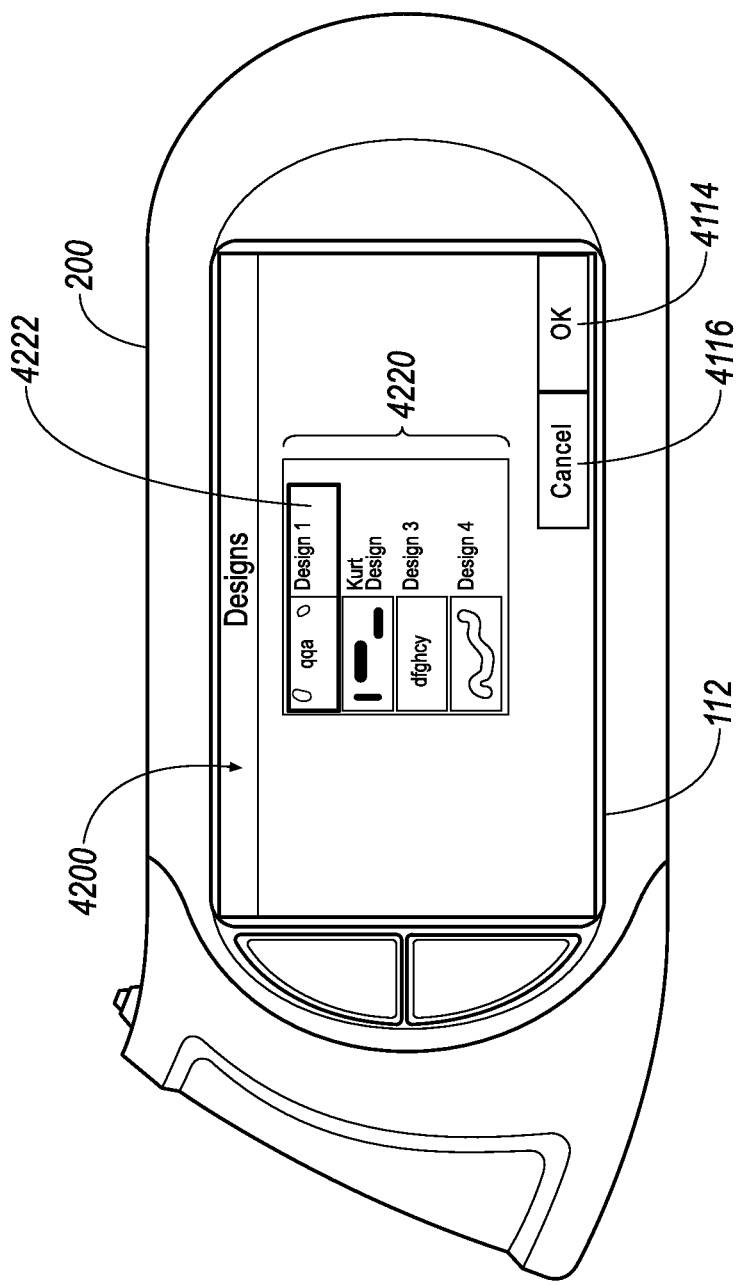
FIG. 42 is a schematic view of an exemplary design selection load screen.

FIG. 42 provides a schematic view of an exemplary design selection load screen 4200 displayed on the screen 112 of the controller device 200. In the example shown, the design selection load screen 4200 shows a collection 4220 of saved designs. The saved designs may be presented as a list that includes a thumbnail view of the design and a name that the user chose to associate with the design when saving the design. Here, "design 1" 4222 is shown as selected. The user may select OK 4114 to confirm the selection or select cancel 4116 to cancel the selection.

Figure 43:
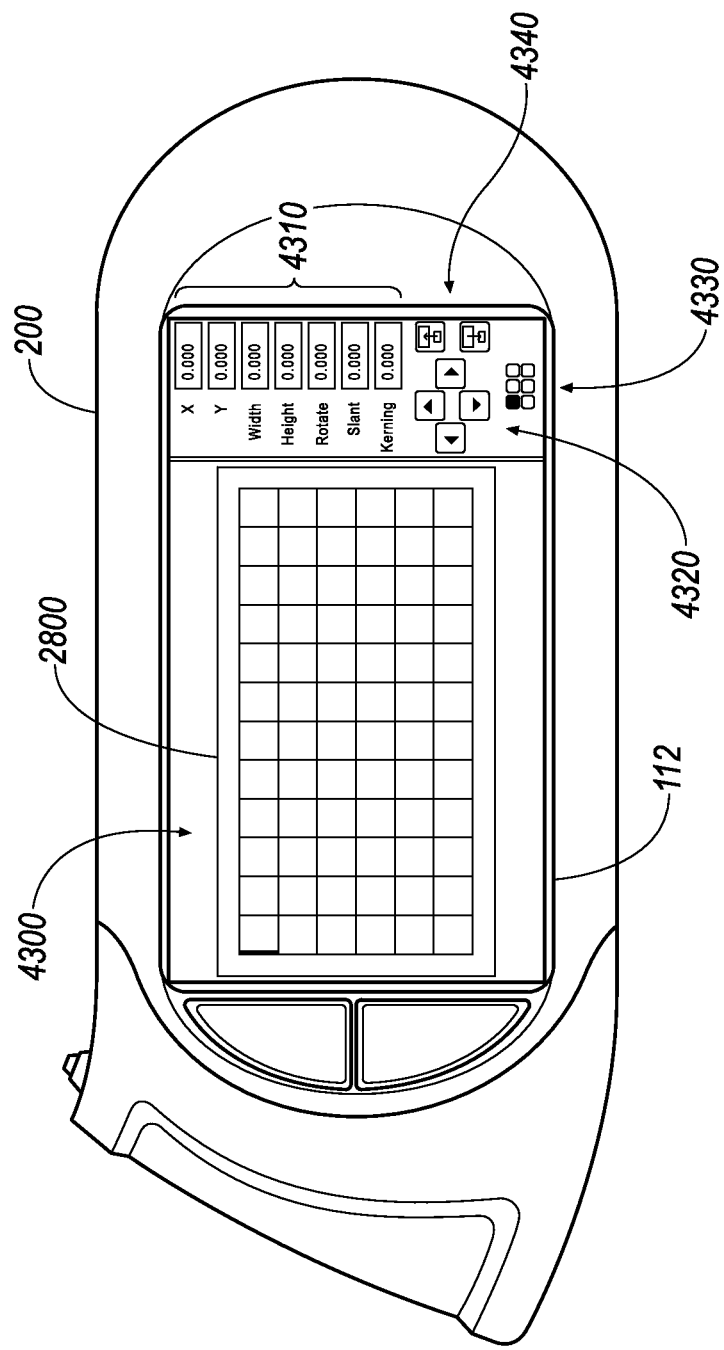
FIG. 43 is a schematic view of an exemplary mat design screen.

FIG. 43 provides a schematic view of an exemplary mat design screen 4300 displayed on the screen 112 of the controller device 200. In the example shown, the virtual mat 2800 is shown on the left side of the mat design screen 4300 as having a grid pattern. On the right side of the mat design screen 4300, a content attribute section 4310 may be shown to assist the user in placing content. The content attribute section 4310 may include position information on the virtual mat 2800 such as width, height, rotation, slant, and kerning for the content. To adjust various content attributes, a joystick or arrow key type control 4320 may be used to increase or decrease the attribute values. Additionally, quick launch buttons 4330 may be used to switch from the mat view to the overlay view, etc. The mat design screen 4300 may also include other buttons 4340, such as user defined buttons, save or save as buttons, etc.

Figure 44:
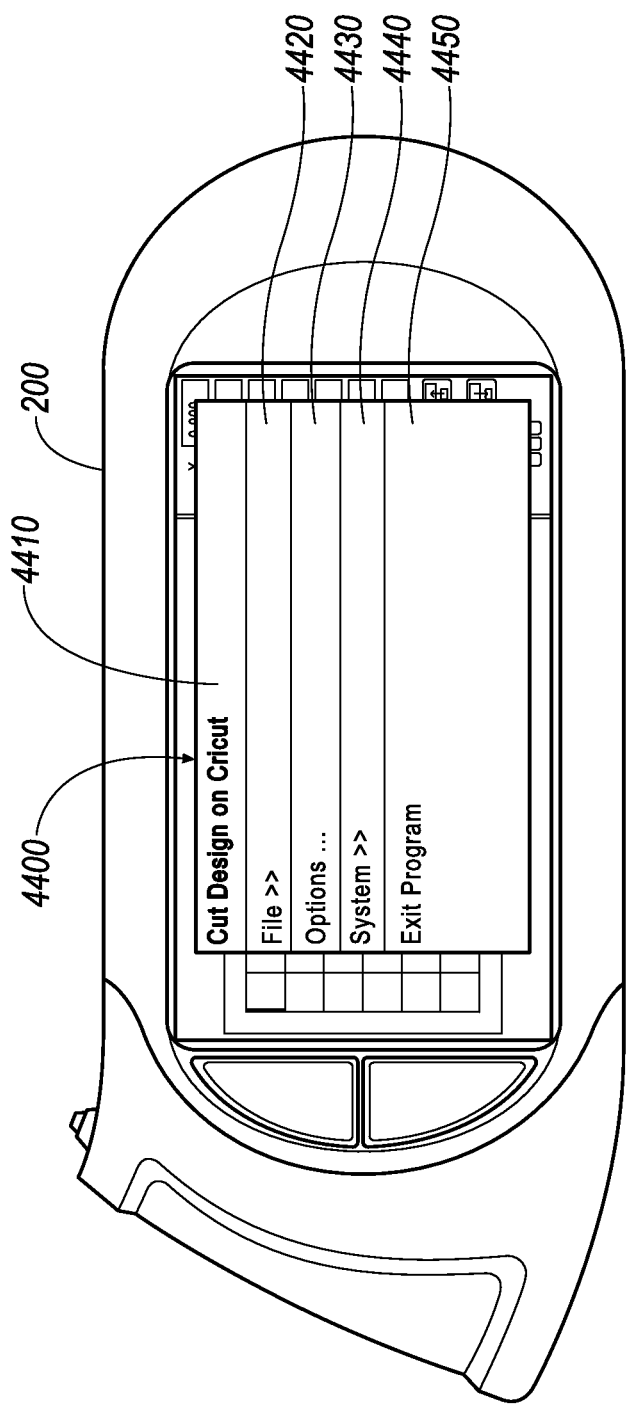
FIG. 44 is a schematic view of an exemplary mat menu screen.

Referring to FIG. 44, the mat design screen 4300 may include a mat menu screen 4400 that includes options such as send to cutter 4410 (allowing the user to send content to an associated electronic cutting machine 610), file path 4420 (displaying a current file path or file location), options 4430 (allowing selection of an options menu to configure settings of the design software application, controller device 200 and/or the electronic cutting machine 610), system 4440 (allowing selection of a systems menu to configure system settings (e.g., hardware specific settings) of the design software application, controller device 200 and/or the electronic cutting machine 610), and/or exit 4450 (allowing the user to exit the program).

Figure 45:
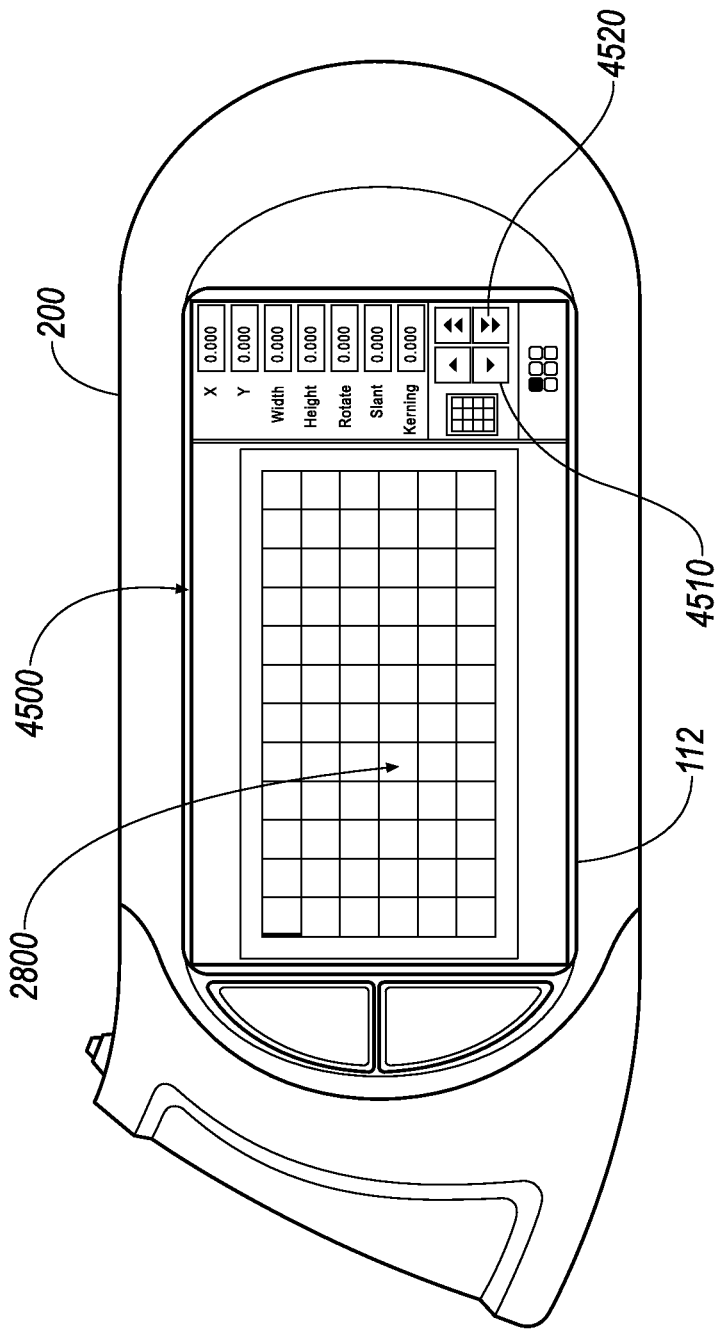
FIG. 45 is a schematic view of an exemplary mat with entry screen.

Referring to FIG. 45, the mat design screen 4300 may include a mat entry screen 4500. Similar to the example shown in FIG. 43, the virtual mat 2800 is shown but the display may also show small and large increment buttons 4510, 4520. The small increment buttons 4510 may be used to adjust attribute values with relative small or micro increments (e.g., 0.001 increments) while the large increment buttons 4520 may allow for relatively large or macro increments (e.g., 1.000). By providing both large and small increment adjustment capabilities, the user may get to a desired value faster.

Figure 46:
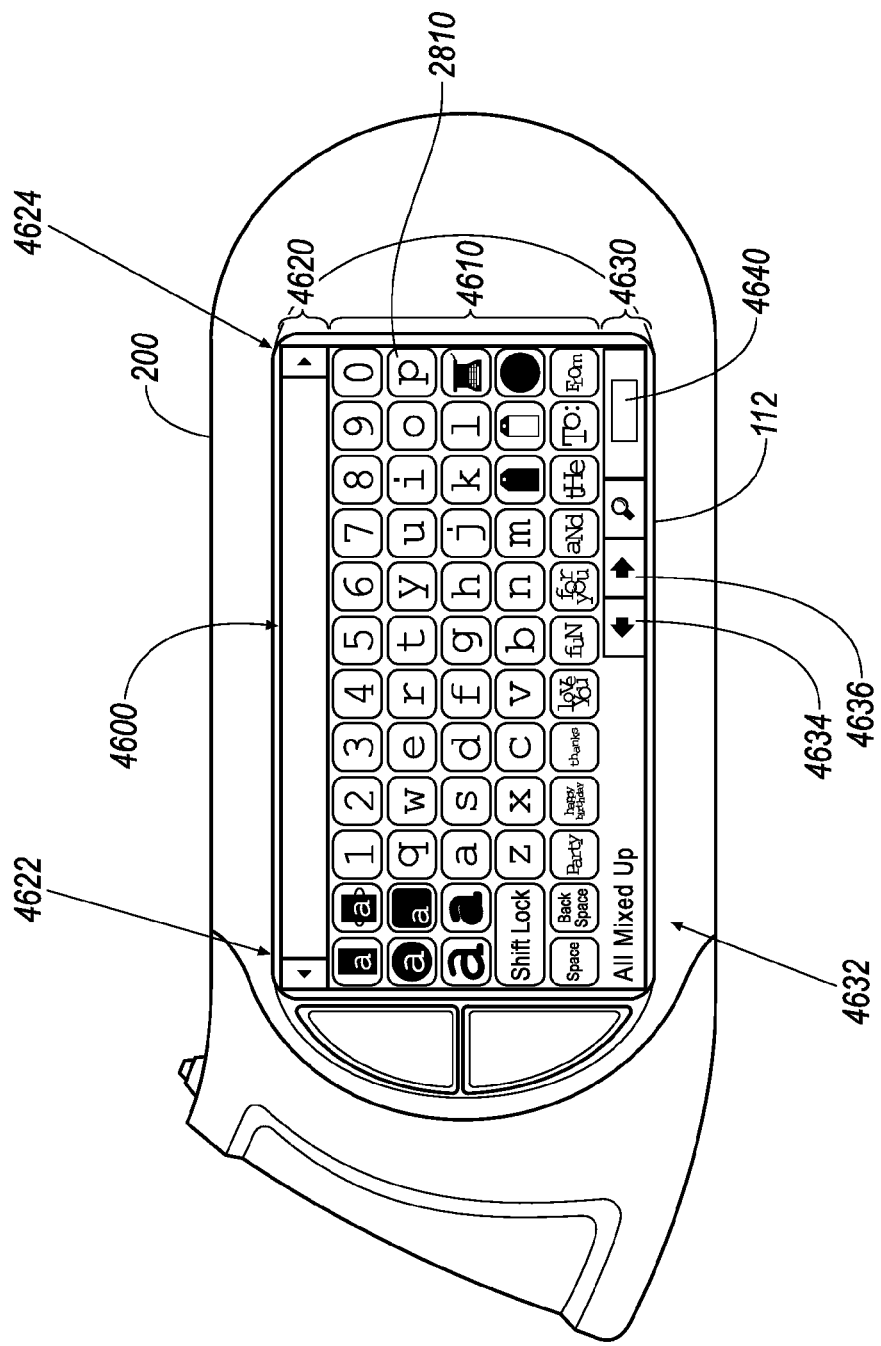
FIG. 46 is a schematic view of an exemplary keypad/overlay screen.

FIG. 46 provides a schematic view of an exemplary keypad/overlay screen 4600 displayed on the screen 112 of the controller device 200. The keypad/overlay screen 4600 provides a graphical representation of content associated with a cartridge 510 or memory device connected to or stored on the controller device 200. For example, the keypad/overlay screen 4600 includes an overly region 4610 including each glyph 2810 (e.g., an iconic representation of the content, such as the letter "p" as shown) of the associated cartridge 510 or memory device that the user may select and use in a design (e.g., by tapping the glyph with a stylus 210 or finger). When the user makes a selection, the glyph 2810 may appear in a selection region 4620 (e.g., which may have one or more lines, similar to a word editor). In this way, the user can string multiple glyphs 2810 together and then transfer the glyphs 2810 to the virtual mat 2800 for positioning and sizing. In some implementations, the transfer of glyphs 2810 from the selection region 4620 to virtual mat 2800 is automatic, while in other implementations, the user can stage glyphs 2810 in the selection region for placement on the virtual mat 2800. The selection region 4620 may include scroll arrows 4622, 4624 that allow the user to scroll backward and forward, respectively, across a long string of glyphs 2810 for review. In some examples, the selection region 4620 only provides a group edit view of the glyphs 2810 selected (either via the virtual mat 2800 or the overlay region 4610, where the user can add and/or remove glyphs 2810. The order of the glyphs 2810 in the selection region 4620 may be the order of selection from the overlay region 4610, the original order of placement on the virtual mat 2800, the order of selection on the virtual mat 2800, left-to-right order on the virtual mat 2800, alphabetical order, or some other appropriate order. Re-ordering on the virtual mat 2800 may or may not be reflected in the selection region 4620.

The name of the cartridge 510 associated with the displayed glyphs 2810 may be displayed in a cartridge name portion 4632 of a cartridge region 4630 (e.g., shown in the example as located below the overlay region 4610). The user select different cartridges 510 in the cartridge region 4630 to change the collection of glyphs 2810 shown in the overlay region 4610 to match the selected cartridge 510, while leaving the selection region 4620 persistent to allow modification of a glyph string created therein (e.g., by concatenating more glyphs 2810 or otherwise editing the selected glyphs 2810). In the cartridge region 4630, the user may use left and right spin controls 4634, 4636 to scroll through a list of available cartridges 510 to select a cartridge 510. A displayed backlight button 4638 may be used to adjust the brightness and/or contrast of the screen 112 depending on ambient light conditions. A displayed mat button 3640 allows the user to switch between the keypad/overlay screen 4600 and the mat design screen 4300 or mat entry screen 4500.

The digital overlay displayed in the overlay region 4610 of the keypad/overlay screen 4600 may be considered an arrangement of glyphs 2810 on the screen 112 that are available for user viewing and selection. The glyphs 2810 may be rendered to the screen 112 based on various inputs. In a first example, the content may include pre-rendered images for each glyph 2810 or each screen arrangement (e.g., the pre-rendering having a JPEG or PNG formatted image). In this way, the controller device 200 simply loads the image to the screen 112 for display. Additionally, each set of digital overlays may be pre-rendered. This may include "shifted" glyphs 2810 (e.g., when the user presses a shift key the lower case "a" become an upper case "A").

In another example, the controller device 200 may generate the digital overlays based on the content of the cartridge 510. For example, the cutting paths may be downloaded from the cartridge 510 and the controller device 200 may render the glyph 2810 using the outer extents of the cutting paths and inner paths. However, such a rendering may not take into account special keys such as "shift" or "space".

In another example, the digital overlay may be first rendered using the cartridge content and then updated (e.g., using an Internet connection) to download additional renderings that may include special buttons for shift keys, etc.

Figure 47:
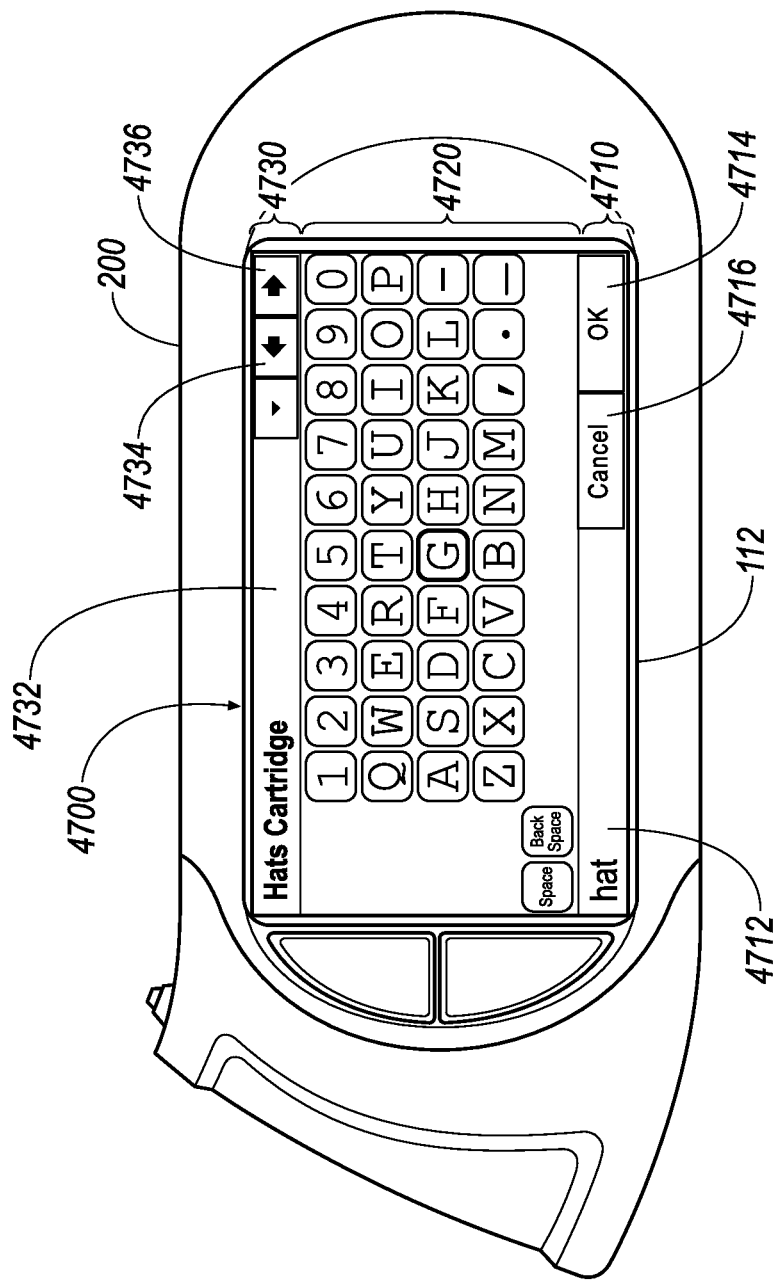
FIG. 47 is a schematic view of an exemplary keyword search screen.

FIG. 47 provides a schematic view of an exemplary keyword search screen 4700 displayed on the screen 112 of the controller device 200. The keyword search screen 4700 includes a search string region 4710, a keyboard region 4720 (e.g., displaying a QWERTY keyboard for data entry), and a results region 4730. To locate content (e.g., on cartridges 510), the user may type in all or part of the name of the content in the search string region 4710 using the keyboard region 4720. In the example shown, the user has input "hat" in a search textbox 4712 of the search string region 4710 to search for content related to "hat". The controller device 200 (or software executing thereon) may search content collections related to "hat" or "hats", as well as the name of specific glyphs 2810. The controller device 200 may also search content metadata tags for relations to the search term. Search results are displayed in the results region 4730. In the example shown, the name of a "Hats" cartridge is shown in a results listing portion 4732 of the results region 4730, which may be a drop down menu, list view, etc. to show multiple results. The results region 4730 may also display forward and back scroll buttons 4734, 4736 to scroll through results in listed in the results listing portion 4732. The user may select OK 4714 to confirm a selection or operation or select Cancel 4716 to cancel a selection or operation.

Figure 48:
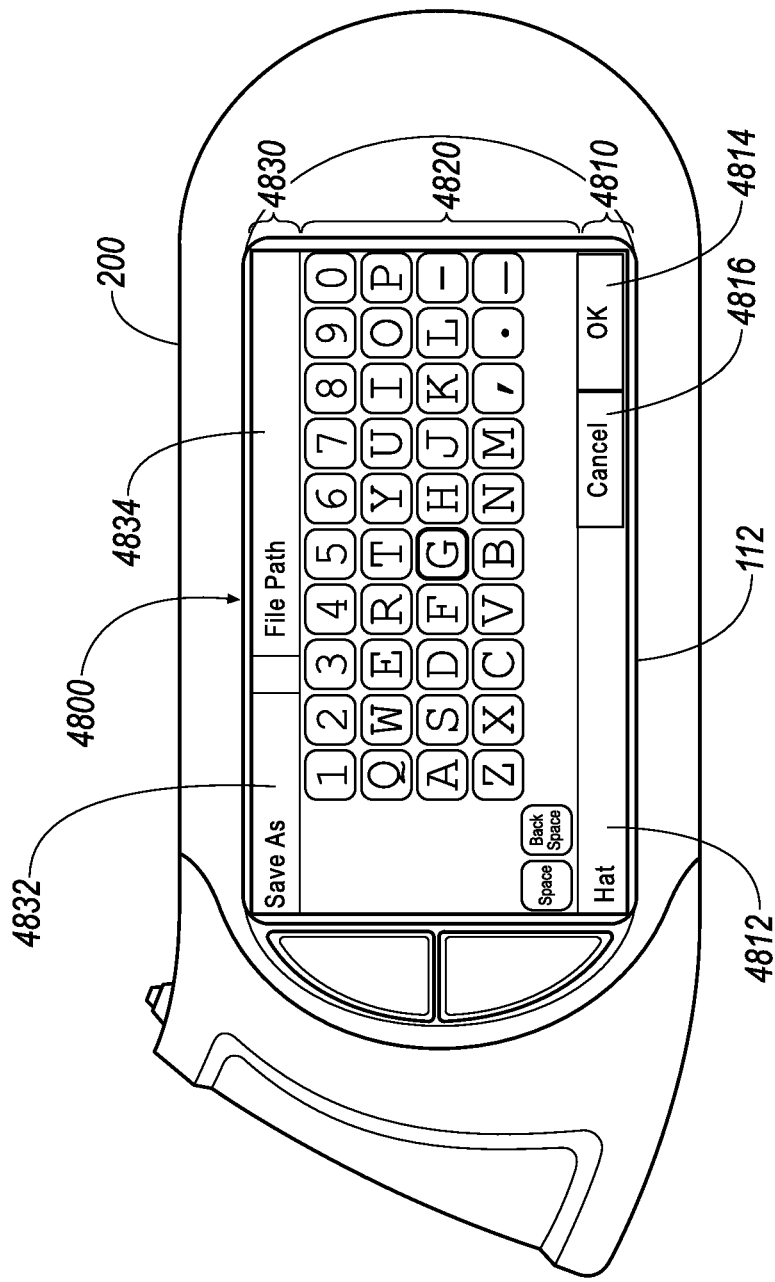
FIG. 48 is a schematic view of an exemplary entry screen.
Figure 49:
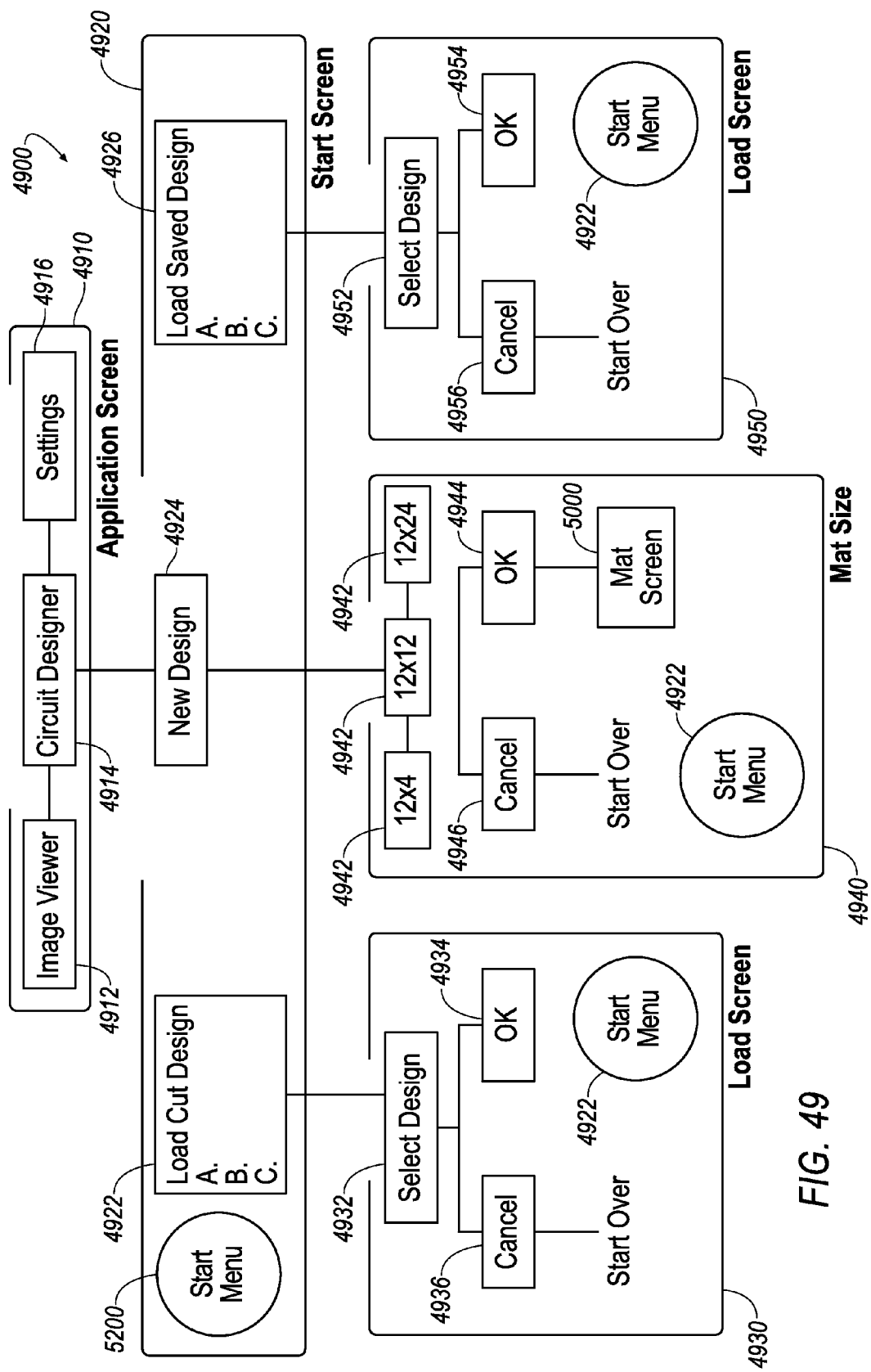
FIG. 49 is a schematic view of an exemplary feature tree for the application selection screen.

FIG. 48 provides a schematic view of an exemplary entry screen 4800 displayed on the screen 112 of the controller device 200. The entry screen 4800 may be used to name designs for saving, for entering designs for loading, etc. The entry screen 4800 includes a naming region 4810, a keyboard region 4820 (e.g., displaying a QWERTY keyboard for data entry), and a filing region 4830. The user may type in the name of the design in a name textbox 4812 of the naming region 4810, select a saving action, such as "Save" or "Save As", in a save control 4832 (e.g., drop down list) and/or a file location in a filing control 4834 (e.g., which may open file path dialog box) both in the filing region 4830, and then OK 4814 to confirm a selection or operation or select Cancel 4816 to cancel a selection or operation.

FIGS. 49-53 provide schematic views of an exemplary designer software application 4900 executable on the processor 240 of the controller device 200. The designer software application 4900 includes an application screen 4910 allowing a user to select an image viewer 4912, a designer application 4914, and/or a settings viewer 4916. In the example shown, the user has selected the designer application 4914 having a designer start screen 4920 that allows the user to select a start menu 5200 (See FIG. 52), a load cut design operation 4922, a new design operation 4924, and/or a load saved design operation 4926. The load cut design operation 4922 opens a load cut design screen 4930 that allows the user to select a design 4932, confirm (OK) 4934 or cancel 4936 the selected design, or select the start menu 5200. The new design operation 4924 opens a mat size screen 4940 that allows the user to select a mat size 4942 (e.g., 12×4, 12×12, 12×24, etc), confirm (OK) 4944 or cancel 4946 the selected mat size 4942, or select the start menu 5200. The load saved design operation 4926 opens a load saved design screen 4950 that allows the user to select a design 4952, confirm (OK) 4954 or cancel 4956 the selected design, or select the start menu 5200.

Figure 50:
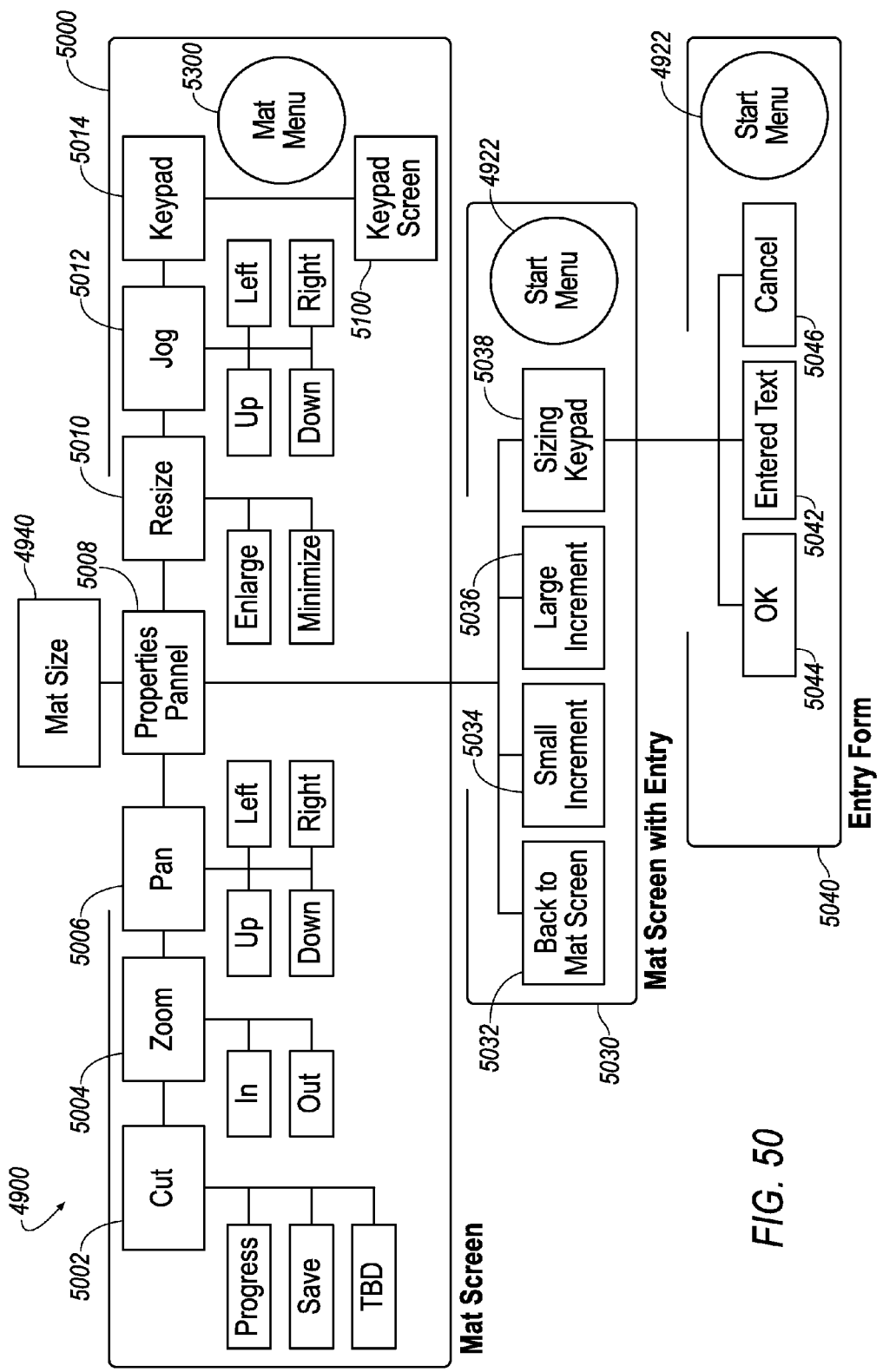
FIG. 50 is a schematic view of an exemplary feature tree for the mat design screen.

Referring to FIG. 50, upon selecting and confirming the selection of a mat size 4942 in the mat size screen 4942, the designer software application 4900 provides a mat design screen 5000. The mat design screen 5000 allows selection of the following operations: cut 5002 (e.g., to perform a cutting operation on an electronic cutting machine 610, see the progress of the cut, and/or to save a cut operation), zoom 5004 (e.g., zoom in and/or out), pan 5006 (e.g., pan or move a viewing area right, left, up, or down), properties 5008, resize 5010 (e.g., to change a size of the virtual mat 2800, as by enlarging or reducing the size), jog 5012 (e.g., to move the virtual mat 2800 right, left, up, or down), keypad 5014, and a mat menu 5300 (see FIG. 53). The properties operation 5008 opens a mat entry screen 5030 allowing selection of operations including back-to-mat screen 5032, small increment 5034, large increment 5036, sizing keypad 5038, and the start menu 4922. Selection of the sizing keypad 5038 operation opens an entry form 5040 that accepts text entries, for example, in an input box 5042, where the entered text is confirmed by an OK operation 5044 or canceled by a cancel operation 5046. The entry form 5040 also allows selection of the start menu 4922.

Figure 51:
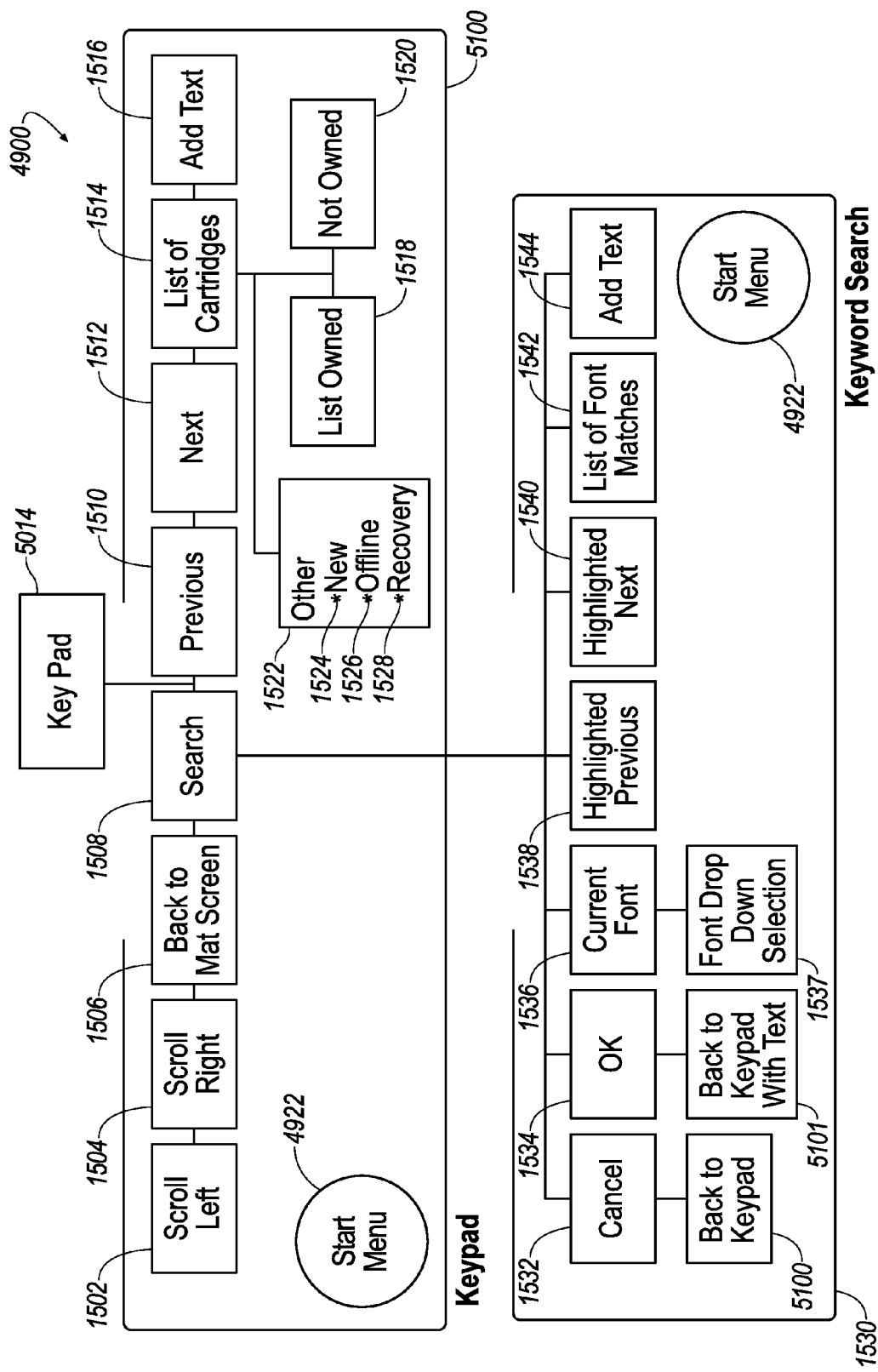
FIG. 51 is a schematic view of an exemplary feature tree for the keypad screen.

Referring to FIG. 51, upon selecting the keypad operation 5014 in the mat design screen 5000, the design software application 4900 provides a keypad screen 5100, which allows the selection of the following operations: scroll left 5102, scroll right 5104, back-to-mat screen 5106, search 1508, previous 1510, next 1512, list cartridges 1514, add text 1516, and the start menu 4922. Other operations may be included as well. Upon selecting the list cartridges operation 1514, the user may select a list owned cartridges operation 1518, list non-owned cartridges operation 1520 (e.g., to view other available cartridges 510 for purchase, for example), or an "other" operation 1522, which may include operations such as listing new cartridges 1524, listing offline cartridges 1526, or recovering cartridges 1528. Upon selecting the search operation 1058, a keyword search screen 1530 is provided that includes operations for searching cartridges 510 and/or content on cartridges 510. The operations of the keyword search screen 1530 may include cancel 1532 (to cancel a search operation and return to the keypad screen 5100), OK 1534 (to confirm or execute a search operation and return to the key pay screen with returned text 1501), current font 1536 (to set a text font from a list of fonts 1537, such as a drop down list), highlighted previous 1538 (to move to a previous highlighted item), highlighted next 1540 (to move to a next highlighted item), list font matches 1542, add text 1544, and the start menu 4922

Figure 52:
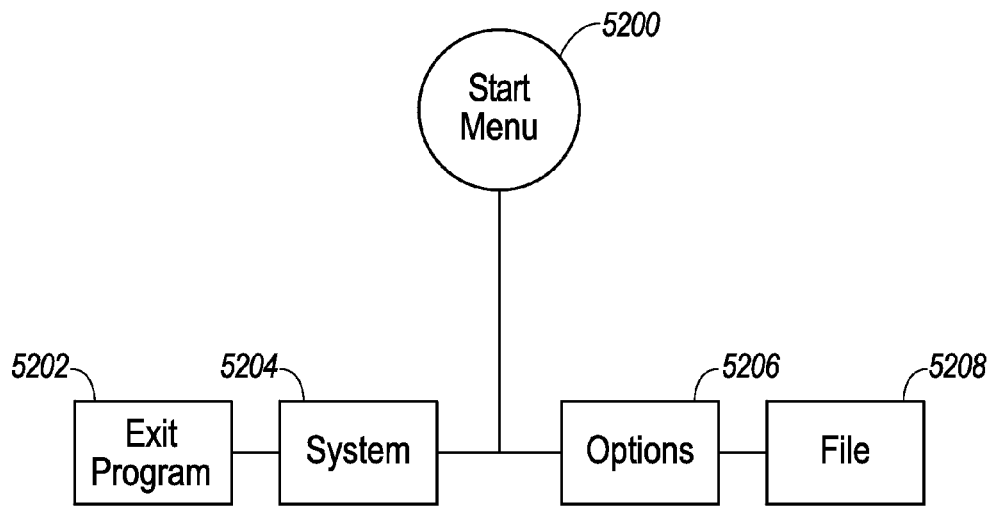
FIG. 52 is a schematic view of an exemplary feature tree for a start menu.

FIG. 52 provides a schematic view of the start menu 5200. The start menu 5200 may be a drop down list, dialog box, etc., that allows the user to select operations including exit program 5202 (to exit the design software application), system 5204 (e.g., to alter system settings), options 5206 (e.g., to alter attributes of the design software application, such as look and feel), and/or file 5308 (e.g., to open, close, save, create new, find, etc. a design).

Figure 53:
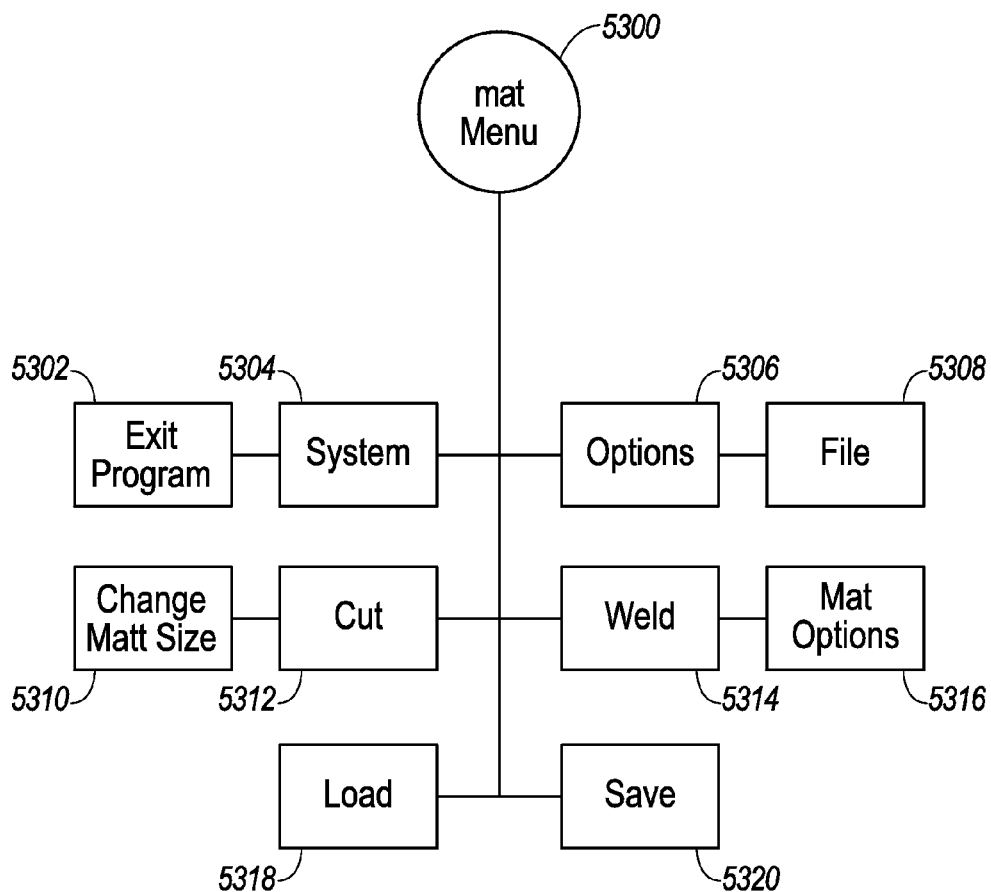
FIG. 53 is a schematic view of an exemplary feature tree for a mat menu.

FIG. 53 provides a schematic view of the mat menu 5300. The mat menu 5300 may be a drop down list, dialog box, etc., that allows the user to select operations including exit program 5302 (to exit the design software application), system 5304 (e.g., to alter system settings), options 5306 (e.g., to alter attributes of the design software application, such as look and feel), and/or file 5308 (e.g., to open, close, save, create new, find, etc. a design). The mat menu 5300 may also include operations such as change mat size 5310 (to change the size of the virtual and/or actual mat size), cut 5312 (e.g., to perform a cutting operation on an electronic cutting machine 610), weld 5314 (e.g., to perform a welding operation to merge multiple images together so has to have a single outer cut path), and mat options 5316 (e.g., to alter attributes of the virtual mat 2800). The mat menu 5300 may also include a load operation 5318 for loading a saved design or a save operation 5320 for saving a design (e.g., on the virtual mat 2800) or cut operation.

Figure 54:
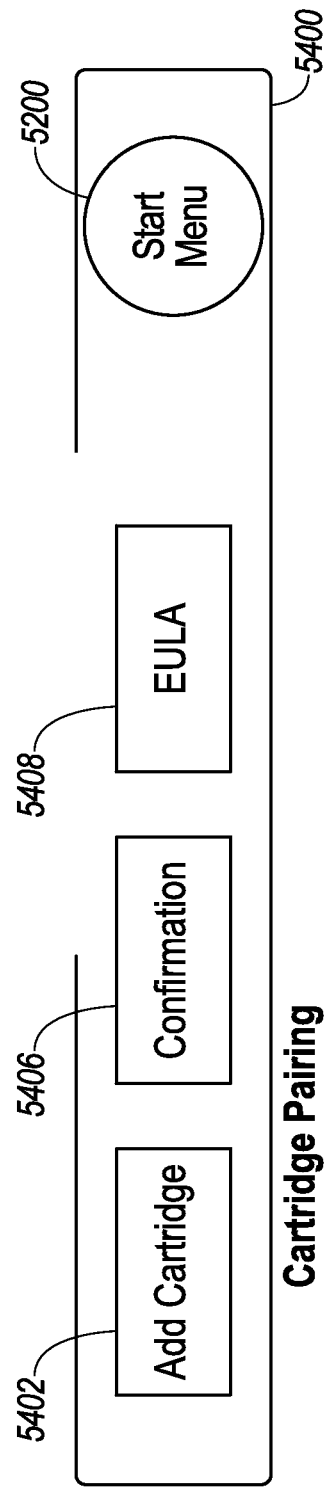
FIG. 54 is a schematic view of an exemplary feature tree for pairing cartridges with a controller device.

FIG. 54 provides a schematic view of a cartridge pairing screen 5400 of the design software application 4900 for pairing or marrying a cartridge 510 with the controller device 200. The cartridge pairing screen 5400 allows the user to select operations including adding 5402 a cartridge 510 (to be paired with the controller device 200), confirming 5406 the pairing (e.g., confirming the cartridge selection and/or providing a confirmation of the pairing operation (success or failure)), and viewing 5408 any licenses (e.g., any licenses associated with the selected or paired cartridge(s) 510). The user may also select the start menu 5200.

A number of implementations have been described. Nevertheless, it will be understood that various modifications may be made without departing from the spirit and scope of the disclosure. Accordingly, other implementations are within the scope of the following claims.

What is claimed is:

1. A method of operating a controller device of an electronic cutting machine, the method comprising:
    writing a controller device identifier to memory of a cartridge storing content used in connection with the electronic cutting machine, the controller device identifier uniquely identifying the controller device from other controller devices;
    writing a cartridge identifier to memory of the controller device, the cartridge identifier uniquely identifying the cartridge from other cartridges; and
    permitting communication between the controller device and the cartridge;
    initiating a cutting operation on the controller device for cutting a design on the electronic cutting machine, the design including content associated with at least one cartridge;
    allowing execution of the cutting operation after verifying cartridge ownership, wherein verifying cartridge ownership includes:
        identifying each cartridge associated with the content of the design;
        obtaining the cartridge identifier for each identified cartridge; and
        searching the memory of the controller device for the cartridge identifier of each identified cartridge; and
    wherein execution of the cutting operation is allowed after each cartridge identifier of each identified cartridge is located in the memory of the controller device and after selling a usage right for each identified cartridge having a cartridge identifier absent from the memory of the controller device.

2. The method of claim 1, further comprising accessing the memory of the controller device for installation of the content associated with the cartridge and storing to the controller device memory any uninstalled content associated with the cartridge.

3. The method of claim 1, wherein the memory of the cartridge is configured to store no more than one controller device identifier.

4. The method of claim 1, further comprising:
    accessing content from at least one of memory of a cartridge in communication with the controller device or content memory of the controller device;
    accessing security information stored in crypto memory of the controller device, the crypto memory configured as write-once and read-many;
    decrypting a license file stored in license memory of the controller device using the security information, the license file comprising at least one cartridge identifier; and
    permitting usage of accessed content having an associated cartridge identifier in the license file.

5. The method of claim 4, further comprising comparing each cartridge identifier associated with the accessed content with each cartridge identifier of the license file.

6. The method of claim 4, further comprising accessing a content usage right from the license file associated with the permitted content.

7. The method of claim 1, wherein the content associated with the at least one cartridge comprises at least one glyph.

8. The method of claim 1, wherein identifying each cartridge associated with the content of the design comprises using content metadata of the design, the content metadata providing a cartridge identifier for each corresponding portion of the design.

9. The method of claim 1, wherein the cartridge identifier is obtained from memory of the controller device.

10. The method of claim 1, wherein the cartridge identifier is obtained from an external source in communication with the controller device.

11. The method of claim 1, further comprising offering purchase of a usage right of each identified cartridge having a cartridge identifier absent from the memory of the controller device.

12. The method of claim 1, further comprising:
    removing the controller device identifier from the memory of the cartridge;
    and removing the cartridge identifier from the memory of the controller device.

13. A method of operating a controller device for an electronic cutting machine, the method comprising:
    prior to utilizing the electronic cutting machine for conducting an act of cutting, conducting steps of:
        writing a controller device identifier to memory of a cartridge, the controller device identifier uniquely identifying the controller device from other controller devices;
        writing a cartridge identifier to memory of the controller device, the cartridge identifier uniquely identifying the cartridge from other cartridges;
    initiating a cutting operation on the controller device for cutting a design on the electronic cutting machine, the design including content associated with at least one cartridge;
    identifying each cartridge associated with the content of the design;
    obtaining the cartridge identifier for each identified cartridge;
    searching the memory of the controller device for the cartridge identifier of each identified cartridge; and
    allowing execution of the cutting operation after each cartridge identifier of each identified cartridge is located in the memory of the controller device and after selling a usage right for each identified cartridge having a cartridge identifier absent from the memory of the controller device.

14. The method of claim 13, wherein identifying each cartridge associated with the content of the design comprises using content metadata of the design, the content metadata providing a cartridge identifier for each corresponding portion of the design.

15. The method of claim 13, wherein the cartridge identifier is obtained from memory of the controller device.

16. The method of claim 13, wherein the cartridge identifier is obtained from an external source in communication with the controller device.

17. The method of claim 13, wherein the content associated with the cartridge comprises at least one glyph.

18. The method of claim 13, further comprising
offering purchase of a usage right of each identified cartridge having a cartridge identifier absent from the memory of the controller device.

* * * * *